US012261369B2

(12) United States Patent
Choi et al.

(10) Patent No.: US 12,261,369 B2
(45) Date of Patent: Mar. 25, 2025

(54) ELECTRONIC DEVICE HAVING ANTENNA

(71) Applicant: LG ELECTRONICS INC., Seoul (KR)

(72) Inventors: Woocheol Choi, Seoul (KR); Ilnam Cho, Seoul (KR); Kangjae Jung, Seoul (KR); Kukheon Choi, Seoul (KR); Byeongyong Park, Seoul (KR); Uisheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/292,853

(22) PCT Filed: Jul. 29, 2021

(86) PCT No.: PCT/KR2021/009936
§ 371 (c)(1),
(2) Date: Jan. 26, 2024

(87) PCT Pub. No.: WO2023/008619
PCT Pub. Date: Feb. 2, 2023

(65) Prior Publication Data
US 2024/0266756 A1 Aug. 8, 2024

(51) Int. Cl.
*H01Q 21/24* (2006.01)
*H01P 3/08* (2006.01)
(Continued)

(52) U.S. Cl.
CPC ............. *H01Q 21/24* (2013.01); *H01P 3/081* (2013.01); *H01Q 1/22* (2013.01); *H01Q 1/48* (2013.01);
(Continued)

(58) Field of Classification Search
CPC .... H01Q 9/285; H01Q 13/10; H01Q 21/0075; H01Q 1/48; H01Q 21/062; H01Q 21/24; H01Q 1/22; H01P 3/081
See application file for complete search history.

(56) References Cited

U.S. PATENT DOCUMENTS 11,658,420 B2 * 5/2023 Kim ........................ H01Q 19/22 343/700 R
2009/0174617 A1 * 7/2009 Chen ........................ H01Q 1/38 343/727
(Continued)

FOREIGN PATENT DOCUMENTS

CN 110085986 8/2019
EP 2403063 A1 * 1/2012 .............. H01P 3/081
(Continued)

OTHER PUBLICATIONS

PCT International Application No. PCT/KR2021/009936, International Search Report dated Apr. 25, 2022, 2 pages.

*Primary Examiner* — Ricardo I Magallanes
(74) *Attorney, Agent, or Firm* — LEE, HONG, DEGERMAN, KANG & WAIMEY

(57) ABSTRACT

An antenna assembly according to an embodiment is provided. The antenna assembly may comprise: a first dipole antenna and a second dipole antenna that have conductive patterns formed on both sides thereof on a surface of a dielectric substrate; a slot antenna having a slot area formed inside a ground pattern disposed between the first dipole antenna and the second dipole antenna; a first feeding unit having a first co-planar wave guide (CPW) feeding line and a second CPW feeding line that are electrically connected to the first dipole antenna and the second dipole antenna on the same plane; and a second feeding unit electrically connected
(Continued)

to the slot area on the same plane and disposed between the first CPW feeding line and the second CPW feeding line.

20 Claims, 25 Drawing Sheets

(51) Int. Cl.

| | |
|---|---|
| ***H01Q 1/22*** | (2006.01) |
| ***H01Q 1/48*** | (2006.01) |
| ***H01Q 9/28*** | (2006.01) |
| ***H01Q 13/10*** | (2006.01) |
| ***H01Q 21/00*** | (2006.01) |

(52) U.S. Cl.
CPC ............. *H01Q 9/285* (2013.01); *H01Q 13/10* (2013.01); *H01Q 21/0075* (2013.01)

(56) References Cited

U.S. PATENT DOCUMENTS

| | | | | |
|---|---|---|---|---|
| 2010/0302115 | A1* | 12/2010 | Chen .................... | H01Q 21/062 343/727 |
| 2015/0372377 | A1* | 12/2015 | Lewis ...................... | H01Q 1/48 343/816 |
| 2017/0215273 | A1* | 7/2017 | Kim ..................... | H04B 1/3888 |
| 2019/0190137 | A1* | 6/2019 | Martinez Ortigosa ...................... | H01Q 19/10 |
| 2021/0184369 | A1* | 6/2021 | Choi ...................... | H01Q 21/08 |
| 2022/0109238 | A1* | 4/2022 | Varnoosfaderani .... | H01Q 21/24 |
| 2023/0059332 | A1* | 2/2023 | Zhang .................. | H01Q 9/0421 |
| 2023/0094098 | A1* | 3/2023 | Kim ......................... | H01Q 1/48 343/713 |
| 2023/0163450 | A1* | 5/2023 | Lee ........................ | H01Q 5/378 343/702 |
| 2023/0223708 | A1* | 7/2023 | Lee ...................... | H01Q 13/085 343/702 |
| 2023/0268669 | A1* | 8/2023 | Park ......................... | H04B 1/48 455/566 |
| 2023/0327341 | A1* | 10/2023 | Shao ....................... | H01P 3/081 343/803 |

FOREIGN PATENT DOCUMENTS

| | | | | | |
|---|---|---|---|---|---|
| EP | 2760080 | A1 * | 7/2014 | ............. | H01Q 1/523 |
| KR | 1020060035588 | | 4/2006 | | |
| KR | 1020130090770 | | 8/2013 | | |
| KR | 1020190019802 | | 2/2019 | | |
| KR | 2197412 | B1 * | 12/2020 | ............... | H01Q 1/38 |
| KR | 102197412 | | 12/2020 | | |
| WO | WO-2012001367 | A1 * | 1/2012 | .............. | H01P 3/026 |
| WO | WO-2014114932 | A1 * | 7/2014 | ............... | H01Q 1/48 |
| WO | WO-2023068581 | A1 * | 4/2023 | ........... | H01Q 1/1271 |
| WO | WO-2024090603 | A1 * | 5/2024 | ........... | H01Q 1/1271 |

* cited by examiner (a)

(b)

(a) REFLECTION COEFFICIENT (b) ISOLATION (a) REFLECTION COEFFICIENT (b) ISOLATION (a)

*FIG. 14*

| TYPE A (2nd ANT STRUCTURE, FIG. 11B) | SLOT ANTENNA ARRAY (4X1) | DIPOLE ANTENNA ARRAY (4X1) |
|---|---|---|
| PEAK GAIN (dBi) | 6.5 | 6.8 |
| Δ GAIN @ PHI/THEATA (dB) | ≥ 30 | ≥ 40 |
| BEAM SCAN ANGLE (°) | ≥ 45 | ≥ 45 |

(a)

| TYPE B (3rd ANT STRUCTURE, FIG. 11C) | SLOT ANTENNA ARRAY (4X1) | DIPOLE ANTENNA ARRAY (4X1) |
|---|---|---|
| PEAK GAIN (dBi) | 6.5 | 6.8 |
| Δ GAIN @ PHI/THEATA (dB) | ≥ 30 | ≥ 40 |
| BEAM SCAN ANGLE (°) | ≥ 45 | ≥ 45 |

(b)

(a)

(b)

(a)

(b)

ELECTRONIC DEVICE HAVING ANTENNA

CROSS-REFERENCE TO RELATED APPLICATION(S)

This application is the National Stage filing under 35 U.S.C. 371 of International Application No. PCT/KR2021/009936, filed on Jul. 29, 2021, the contents of which are all incorporated by reference herein in its entirety.

TECHNICAL FIELD

The present disclosure relates to an electronic device having antennas. One particular implementation relates to an antenna module realized in a multi-layered circuit board and an electronic device having the same.

BACKGROUND ART

As functions of electronic devices diversify, the electronic devices can be implemented as image display devices such as multimedia players having complex functions, for example, playing music or video files, playing games, receiving broadcasts, and the like.

An image display device is a device for reproducing (playing) image contents. Image display devices receive images (videos) from various sources and reproduce the received images. Image display devices are implemented as various devices such as PCs (Personal Computers), smart phones, tablet PCs, laptop computers, TV sets, and the like. An image display device such as a smart TV may provide an application for providing web contents, such as web browsers.

The electronic device such as the image display device may include a communication module having antennas to perform communications with neighboring electronic devices. Meanwhile, as a display area (region) of an image display device is expanded recently, a disposition space of a communication module including antennas is reduced. This causes an increase in necessity of disposing antennas inside a multi-layered circuit board on which the communication module is implemented.

A WiFi radio interface may be considered as an interface for a communication service between electronic devices. When using such a WiFi radio interface, a millimeter wave (mmWave) band may be used for high-speed data transmission between the electronic devices. In particular, the high-speed data transmission between the electronic devices is achieved using a radio interface such as 802.11ay.

In this regard, an array antenna that can operate in a millimeter wave (mmWave) band may be implemented on a display of an electronic device. Meanwhile, frequency band expansion and communication module design technologies for supporting ultra-high speed and large capacity communication are rapidly evolved together with rapid development of Wi-Fi using 5G mobile communication and mmWave band. An application of such technologies to various industrial groups such as TV, robot, vehicle, terminal, etc. is taken into account. In addition, the demand for development of a thinner and lighter full-screen display to which design factors are reflected is greatly increasing.

To implement high-quality communication services, an application of a communication module that is capable of radiating radio waves in all directions in addition to a side direction of an electronic device is required. However, the design of antenna module and RF front-end using display bezels and adjacent structures has a very narrow space limitation and limits the design factors.

DISCLOSURE OF INVENTION

Technical Problem

The present disclosure is directed to solving the aforementioned problems and other drawbacks. Another aspect of the present disclosure is to provide an antenna module disposed on a display operating in a millimeter wave (mm-wave) band and an electronic device including a configuration controlling the same.

Still another aspect of the present disclosure is to provide an antenna module capable of communicating with another device located in a front direction by implementing an antenna module operating in an mmWave band in a display.

Still another aspect of the present disclosure is to provide an antenna configuration capable of improving visibility of an antenna disposed in a display while improving an electrical characteristic of the antenna.

Still another aspect of the present disclosure is to provide an antenna module implementing dual polarization characteristics within a limited region.

Still another aspect of the present disclosure is to provide an antenna module implemented in a display, capable of minimizing a signal loss characteristic in an mmWave band.

Solution to Problem

To achieve those aspects and other advantages of the present disclosure, an antenna assembly according to an embodiment is provided. The antenna assembly may include a first dipole antenna and a second dipole antenna having conductive patterns at both sides on a surface of a dielectric substrate; a slot antenna having a slot region defined inside a ground pattern disposed between the first dipole antenna and the second dipole antenna; a first feeding unit having a first co-planar wave guide (CPW) feeding line and a second CPW feeding line electrically connected on the same plane to the first dipole antenna and the second dipole antenna; and a second feeding unit electrically connected to the slot region on the same plane, and disposed between the first CPW feeding line and the second CPW feeding line.

According to an embodiment, first ground patterns may be disposed at one side and another side of the first CPW feeding line, and second ground patterns may be disposed at one side and another side of the second CPW feeding line. The second feeding unit may be disposed between the first ground pattern disposed at the another side of the first CPW feeding line and the second ground pattern disposed at the one side of the second CPW feeding line.

According to an embodiment, the antenna assembly may further include a dummy metal mesh pattern formed between the first dipole antenna and the second dipole antenna on a top of the ground pattern having the slot region.

According to an embodiment, the slot antenna may include a plurality of slot antennas. The slot antenna may include a plurality of slot antennas, and the antenna assembly further comprises a dummy dipole disposed adjacent to an outermost slot antenna of the plurality of slot antennas, and the dummy dipole may have a conductive pattern formed at one side.

According to an embodiment, the first dipole antenna may include a ground arm pattern connected to the first ground, and a signal arm pattern connected to the first CPW feeding line. The second dipole antenna may include a ground arm pattern connected to the second ground pattern, and a signal arm pattern connected to the second CPW feeding line.

According to an embodiment, the ground arm pattern and the signal arm pattern of each of the first dipole antenna and the second dipole antenna may include: a first sub arm configured as a first metal pattern formed in a first axial direction on a surface of the dielectric substrate; and a second sub arm configured as a second metal pattern formed in a second axial direction, different from the first axial direction, on the surface of the dielectric substrate.

According to an embodiment, the first and second dipole antennas and the slot antenna may be disposed in an antenna region formed inside the display having a multi-layered structure. Each of the first feeding unit and the second feeding unit may include: a transition region having a CPW structure, in which the first and second ground patterns are disposed between a feeding line of the first feeding unit and a feeding line of the second feeding unit, to perform impedance matching between an antenna and the feeding lines; and a signal line region in which the feeding line of the first feeding unit and the feeding line of the second feeding unit are disposed by predetermined lengths in the first axial direction, and the feeding lines disposed in the signal line region may be disposed on a flexible printed circuit board (FPCB). The second feeding unit may be implemented as a CPW feeding line for feeding the slot antenna.

According to an embodiment, the slot region may be formed in a first axial direction such that the slot antenna operates as a vertically polarized antenna in the first axial direction, and the first dipole antenna and the second dipole antenna are spaced apart from each other by a predetermined distance in a second axial direction, to operate as horizontally polarized antennas in the second axial direction.

According to an embodiment, the ground pattern may include: a first region defined from one end portion of the ground pattern to one end portion of the slot region; a second region defined from one end portion of the slot region to an end portion of a second metal pattern of the first dipole antenna; a third region defined from the end portion of the second metal pattern of the first dipole antenna to an end portion of a second metal pattern of the second dipole antenna; a fourth region defined from the end portion of the second metal pattern of the second dipole antenna to the another end portion of the slot region; and a fifth region defined from the another end portion of the slot region to another end portion of the ground pattern.

According to an embodiment, the second metal pattern of the first dipole antenna may overlap in parallel the slot region by a predetermined length in the second axial direction in the second region, and the second metal pattern of the second dipole antenna may overlap in parallel the slot region by a predetermined length in the second axial direction in the fourth region.

According to an embodiment, the slot region may be spaced apart from the second metal pattern of the first dipole antenna by a preset distance in the first axial direction in the second region, and may be spaced apart from the second metal pattern of the second dipole antenna by a predetermined distance in the first axial direction in the fourth region, such that a first interference level with the first dipole antenna and a second interference level with the second dipole antenna are equal to or lower than a threshold level.

According to an embodiment, the first metal pattern of each of the first and second dipole antennas may include a first sub pattern and a second sub pattern spaced apart from each other by a predetermined distance to be in parallel in the first axial direction. The second metal pattern of each of the first and second dipole antennas may include a third sub pattern and a fourth sub pattern extending in different directions on the second axis from end portions of the first sub pattern and the second sub pattern.

According to an embodiment, any one of the first and second sub patterns of the first metal pattern may be connected to a metal pattern having a different width in the transition region so as to perform impedance matching between the antenna region and the signal line region, and another one of the first and second sub patterns of the first metal pattern may be connected to a lower ground through a via pattern to operate as a ground.

According to an embodiment, the dummy metal mesh pattern may include: a first dummy pattern disposed between an upper region of the ground pattern of the slot antenna and a lower region of the first and second dipole antennas; and a second dummy pattern coupled to the first dummy pattern and disposed between the first dipole antenna and the second dipole antenna.

According to an embodiment, the first metal pattern and the second metal pattern of the dipole antenna and the ground pattern of the slot antenna may be configured in a closed mesh structure in which metal mesh patterns formed in different axial directions are connected. The dummy pattern may be formed in an open mesh structure in which connection points of the metal mesh patterns formed on the different axial directions are disconnected, so as to improve transparency of the antenna region.

According to an embodiment, the dipole antenna including the first and second dipole antennas may be configured as a first array antenna by further including a third dipole antenna and a fourth dipole antenna spaced apart from each other by a predetermined distance in a second axial direction. The slot antenna may be configured as a slot array antenna by including: a first slot antenna disposed in one side region of the first dipole antenna; a second slot antenna disposed between the first dipole antenna and the second dipole antenna; a third slot antenna disposed between the second dipole antenna and the third dipole antenna; and a fourth slot antenna disposed between the third dipole antenna and one side region of the fourth dipole antenna.

According to an embodiment, the dipole antenna may further include a dummy dipole configured as a first metal pattern and a second metal pattern on one side region of the first slot antenna or another side region of the fourth slot antenna. The first to fourth dipole antennas may include the second metal patterns extending from the first metal pattern in different directions on the second axis, the dummy dipole may include a second metal pattern extending from the first metal pattern in one direction on the second axis, and the first metal pattern of the dummy radiator may be electrically connected to a lower ground through a via pattern.

According to an embodiment, the first sub patterns of the first dipole antenna and the third dipole antenna may be connected to a lower ground through via patterns to operate as a ground, and the second sub patterns of the second dipole antenna and the fourth dipole antenna are connected to a lower ground through via patterns to operate as a ground, so as to lower an interference level between adjacent dipole antennas of the first to fourth dipole antennas and an interference level between adjacent slot antennas of the first to fourth slot antennas.

According to an embodiment, the slot antenna may further include a fifth slot antenna disposed on another side region of the fourth dipole antenna, such that performance of the fourth dipole antenna coincides with performances of the first to third dipole antennas. A feeding line of the second feeding unit that is electrically connected the ground pattern through an inside of a ground pattern of the fifth slot antenna may not be electrically connected to the transceiver circuit, and an end portion of the feeding line may be connected to a ground of an FPCB through a resistor element.

According to an embodiment, the second metal pattern of the dipole antenna may include: a first radiation portion perpendicularly connected to the first metal pattern at a first point; and a second radiation portion bent by a predetermined angle with respect to the first metal pattern at the first point, and disposed in parallel to the first radiation portion from a second point in an upper region of the first radiation portion, such that the dipole antenna operates as a broadband antenna.

According to an embodiment, the second radiation portion may have a length shorter than a length of the first radiation portion. A slot region of the slot antenna may be configured such that corner regions, facing each other, of rectangular slot regions formed in different directions on the second axis from an end of the second feeding unit are formed in a triangular shape. The slot region may be configured as a multi-slot region formed based on the corner regions having the triangular shape, such that the slot antenna operates as a broadband antenna.

According to an embodiment, first to fourth feeding lines of the first feeding unit and first to fourth feeding lines of the second feeding unit disposed on the FPCB may be configured in a microstrip line structure. The first to fourth feeding lines of the first feeding unit and the second feeding unit may be disposed on a transition region for transition from the microstrip line structure to a CPW structure. The transition region may be formed as an ACF bonding region for transition from the multi-layered structure of the FPCB to a single-layered structure of the antenna region of the display, and the antenna region may be formed as a metal pattern on an OCA layer beneath a cover glass.

According to another aspect of the present disclosure, there is provided an electronic device having an antenna assembly disposed in a display. The electronic device may include the display having a multi-layered structure and having a cover glass; and an antenna assembly formed as a metal mesh pattern on a dielectric substrate disposed inside the display to radiate a wireless signal through the cover glass.

According to an embodiment, the antenna assembly may include: a dielectric substrate; a first dipole antenna and a second dipole antenna having conductive patterns at both sides on a surface of the dielectric substrate; a slot antenna having a slot region defined inside a ground pattern disposed between the first dipole antenna and the second dipole antenna; a first feeding unit having a first co-planar wave guide (CPW) feeding line and a second CPW feeding line electrically connected on the same plane to the first dipole antenna and the second dipole antenna; and a second feeding unit electrically connected to the slot region on the same plane, and disposed between the first CPW feeding line and the second CPW feeding line.

According to an embodiment, first ground patterns may be disposed at one side and another side of the first CPW feeding line, second ground patterns are disposed at one side and another side of the second CPW feeding line, and the second feeding unit may be disposed between the first ground pattern disposed at the another side of the first CPW feeding line and the second ground pattern disposed at the one side of the second CPW feeding line.

Advantageous Effects of Invention

Hereinafter, technical effects of an antenna module disposed in a display operating in a millimeter wave (mmwave) band and an electronic device including a configuration for controlling the same will be described.

According to an embodiment, an antenna element operating in an mmWave band may be implemented in a metal mesh structure within a display, to communicate with another device in a front direction.

According to another aspect of the present disclosure, an antenna configuration capable of improving visibility of an antenna disposed in a display by using a dummy pattern while improving an electrical characteristic of the antenna can be provided.

According to another aspect of the present disclosure, an antenna module, in which a slot antenna is disposed in an empty region between dipole antennas to implement a dual polarization characteristic within such limited region, can be provided.

According to another aspect of the present disclosure, an antenna module implemented in a display, capable of minimizing a spacing between antennas and minimizing a signal loss characteristic in an mmWave band through impedance matching in a transition region between a transparent antenna and a feeding line, can be provided.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF DRAWINGS

FIG. 14 compares antenna characteristics in the second antenna structure and the third antenna structure.

MODE FOR THE INVENTION

Figure 1:
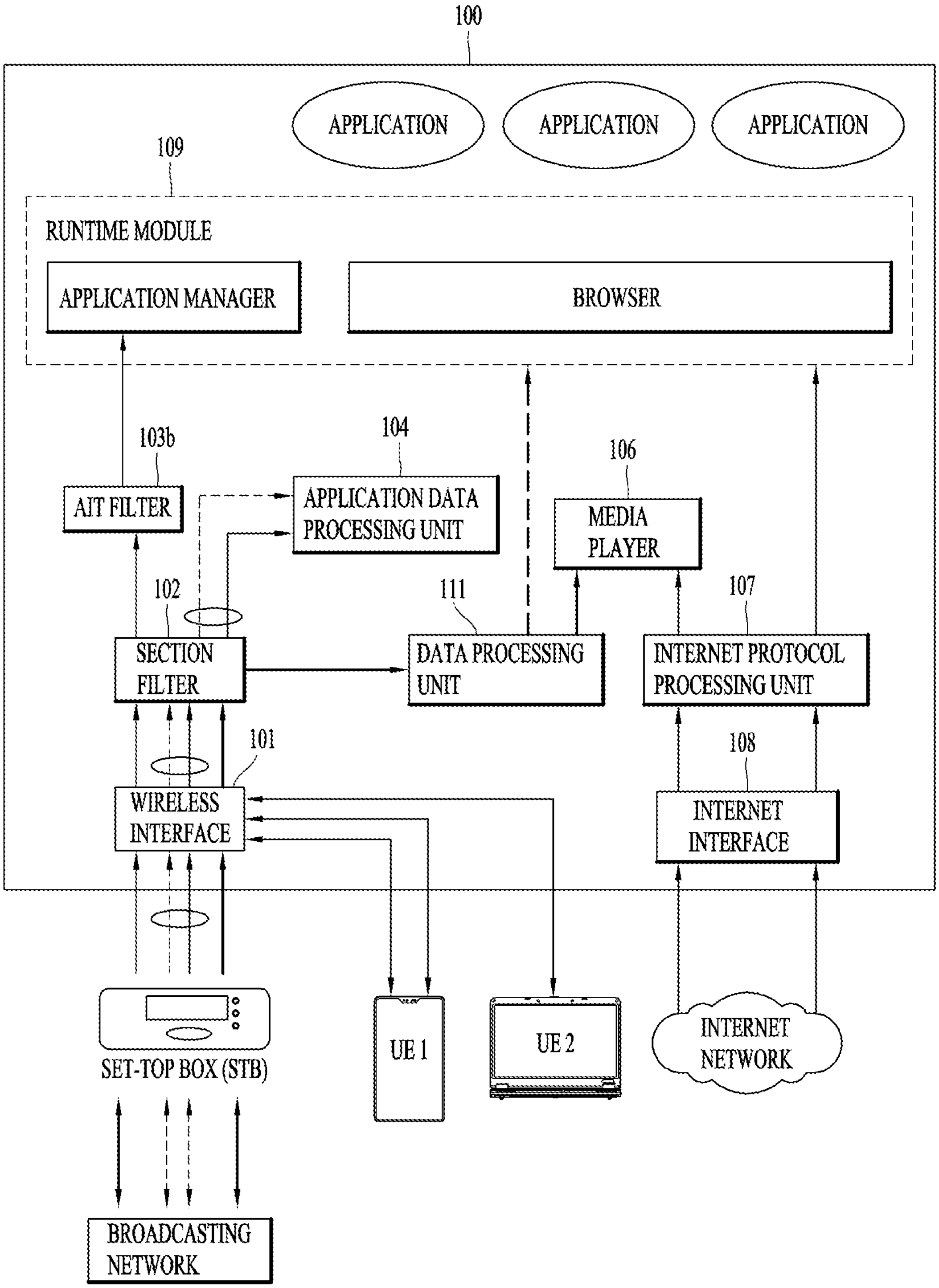
FIG. 1 is a diagram schematically illustrating an example of an entire wireless AV system including an image display device according to one embodiment of the present disclosure.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

FIG. 1 is a diagram schematically illustrating an example of an entire wireless AV system including an image display device according to one embodiment of the present disclosure.

As illustrated in FIG. 1, an image display device 100 according to one embodiment of the present disclosure is connected to the wireless AV system (or a broadcasting network) and an Internet network. The image display device 100 may be, for example, a network TV, a smart TV, a hybrid broadcast broadband TV (HBBTV), or the like.

The image display device 100 may be wirelessly connected to the wireless AV system (or the broadcasting network) via a wireless interface or wirelessly or wiredly connected to the Internet network via an Internet interface. In relation to this, the image display device 100 may be configured to be connected to a server or another electronic device via a wireless communication system. As an example, the image display device 100 needs to provide an 802.11ay communication service operating in a millimeter wave (mmWave) band to transmit or receive large-capacity data at a high speed.

The mmWave band may be any frequency band in a range of 10 GHz to 300 GHz. In this disclosure, the mmWave band may include an 802.11ay band of a 60 GHz band. In addition, the mmWave band may include a 5G frequency band of a 28 GHz band or the 802.11ay band of the 60 GHz band. The 5G frequency band may be set to about 24 to 43 GHz band and the 802.11ay band may be set to 57 to 70 GHz or 57 to 63 GHz band, but are not limited thereto.

The image display device 100 may wirelessly transmit or receive data to/from an electronic device in a periphery of the image display device 100, e.g., a set-top box or another electronic device via the wireless interface. As an example, the image display device 100 may transmit or receive wireless AV data to/from a set-top box or another electronic device, e.g., a mobile terminal arranged in front of or below the image display device 100.

The image display device 100 includes, for example, a wireless interface 101*b*, a section filter 102*b*, an application information table (AIT) filter 103*b*, an application data processing unit 104*b*, a data processing unit 111*b*, a media player 106*b*, an Internet protocol processing unit 107*b*, an Internet interface 108*b*, and a runtime module 109*b*.

Through a broadcast interface that is the wireless interface 101*b*, AIT data, real-time broadcast content, application data, and a stream event are received. The real-time broadcast content may be referred to as linear audio/video (A/V) content.

The section filter 102*b* performs section filtering on four types of data received through the wireless interface 101*b* to transmit the AIT data to the AIT filter 103*b*, the linear A/V content to the data processing unit 111*b*, and the stream events and the application data to the application data processing unit 104*b*.

Non-linear A/V content and the application data are received through the Internet interface 108*b*. The non-linear A/V content may be, for example, a content on demand (COD) application. The non-linear A/V content is transmitted to the media player 106*b*, and the application data is transmitted to the runtime module 109*b*.

Further, the runtime module 109*b* includes, for example, an application manager and a browser as illustrated in FIG. 1. The application manager controls a life cycle of an interactive application using, for example, the AIT data. In addition, the browser performs, for example, a function of displaying and processing the interactive application.

Hereinafter, a communication module having an antenna for providing a wireless interface in an electronic device such as the above-described image display device will be described in detail. In relation to this, the wireless interface for communication between electronic devices may be a WiFi wireless interface, but is not limited thereto. As an example, a wireless interface supporting the 802.11ay standard may be provided for high-speed data transmission between electronic devices.

The 802.11ay standard is a successor standard for raising a throughput for the 802.11ad standard to 20 Gbps or greater. An electronic device supporting an 802.11ay wireless interface may be configured to use a frequency band of about 57 to 64 GHz. The 802.11ay wireless interface may be configured to provide backward compatibility for an 802.11ad wireless interface. The electronic device providing the 802.11ay wireless interface may be configured to provide coexistence with a legacy device using the same band.

In relation to a wireless environment for the 802.11ay standard, it may be configured to provide a coverage of 10 meters or longer in an indoor environment, and 100 meters or longer in an outdoor environment with a line of sight (LOS) channel condition.

The electronic device supporting the 802.11ay wireless interface may be configured to provide visual reality (VR) headset connectivity, support server backups, and support cloud applications that require low latency.

An ultra-short range (USR) communication scenario, i.e., a near field communication scenario which is a use case of the 802.11ay wireless interface, is a model for fast large-capacity data exchange between two terminals. The USR communication scenario may be configured to require low power consumption of less than 400 mW, while providing a fast link setup within 100 msec, transaction time within 1 second, and a 10 Gbps data rate at a very close distance of less than 10 cm.

As the use case of the 802.11ay wireless interface, the 8K UHD Wireless Transfer at Smart Home Usage Model may be taken into account. In the Smart Home Usage Model, a wireless interface between a source device and a sync device may be taken into consideration to stream 8K UHD content at home. In relation to this, the source device may be one of a set-top box, a Blue-ray player, a tablet PC, and a smart phone and the sink device may be one of a smart TV and a display device, but are not limited thereto. In relation to this, the wireless interface may be configured to transmit uncompressed 8K UHD streaming data (60 fps, 24 bits per pixel, at least 4:2:2) with a coverage of less than 5 m between the source device and the sink device. To do so, the wireless interface may be configured such that data is transmitted between electronic devices at a speed of at least 28 Gbps.

In order to provide such a wireless interface, embodiments related to an array antenna operating in a mmWave band and an electronic device including the array antenna will be described with reference to the accompanying drawings. It will be apparent to those skilled in the art that the present disclosure may be embodied in other specific forms without departing from the spirit or essential characteristics thereof.

Figure 2:
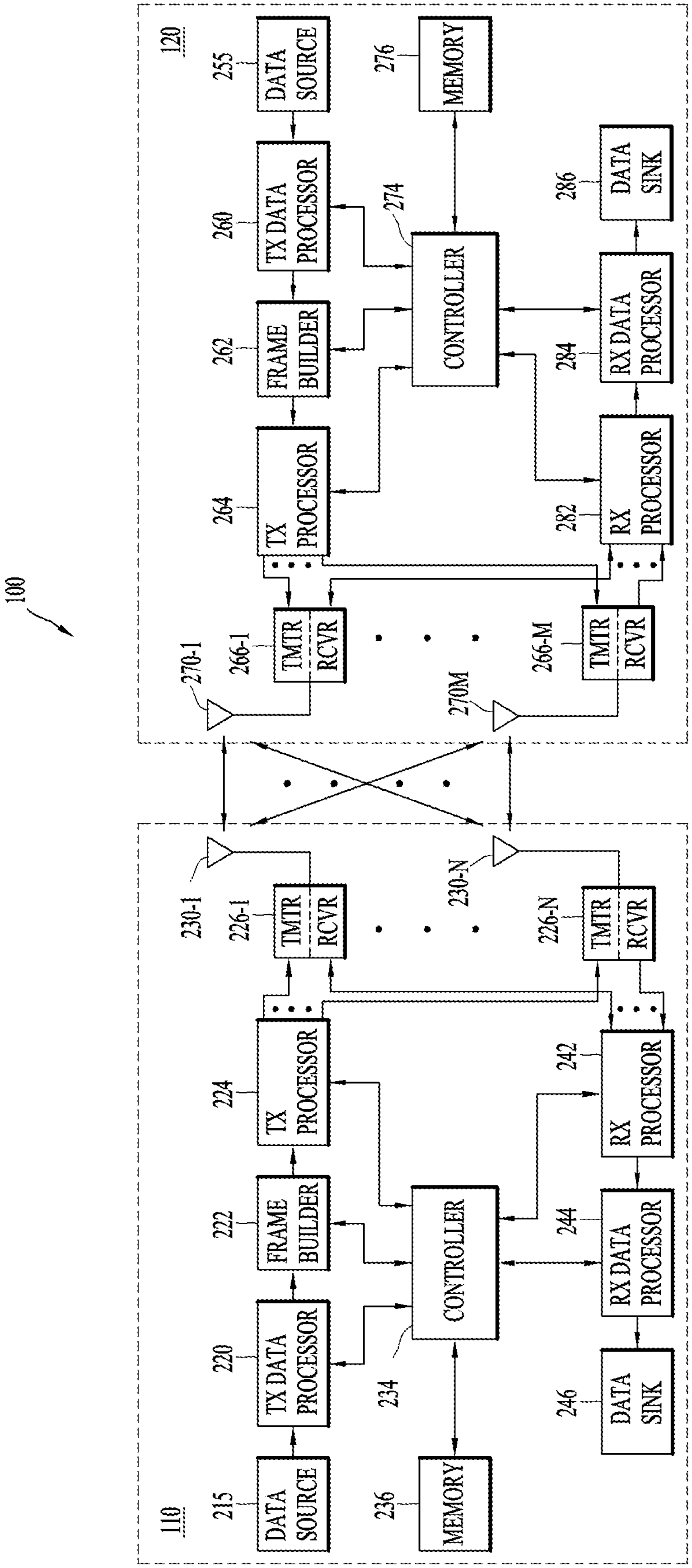
FIG. 2 illustrates a detailed configuration of electronic devices configured to support wireless interfaces according to the present disclosure.

FIG. 2 illustrates a detailed configuration of electronic devices configured to support wireless interfaces according to the present disclosure. FIG. 2 illustrates a block diagram of an access point 110 (generally, a first wireless node) and an access terminal 120 (generally, a second wireless node) in a wireless communication system. The access point 110 is a transmitting entity for downlink transmission and a receiving entity for uplink transmission. The access terminal 120 is a transmitting entity for uplink transmission and a receiving entity for downlink transmission. As used herein, the "transmitting entity" is an independently operating apparatus or device capable of transmitting data through a wireless channel, and the "receiving entity" is an independently operating apparatus or device capable of receiving data through a wireless channel.

Referring to FIGS. 1 and 2, the set-top box (STB) of FIG. 1 may be the access point 110, and an electronic device, that is, the image display device 100 of FIG. 1 may be the access terminal 120, but are not limited thereto. Accordingly, it should be understood that the access point 110 may alternatively be an access terminal, and the access terminal 120 may alternatively be an access point.

To transmit data, the access point 110 includes a transmission (TX) data processor 220, a frame builder 222, a TX processor 224, a plurality of transceivers 226-1 to 226-N, and a plurality of antennas 230-1 to 230-N. The access point 110 also includes a controller 234 configured to control operations of the access point 110.

To transmit data, the access point 110 includes a transmission (TX) data processor 220, a frame builder 222, a TX processor 224, a plurality of transceivers 226-1 to 226-N, and a plurality of antennas 230-1 to 230-N. The access point 110 also includes a controller 234 configured to control operations of the access point 110.

During operation, the TX data processor 220 receives data (e.g., data bits) from a data source 215, and processes the data for transmission. For example, the TX data processor 220 may encode data (e.g., data bits) into encoded data, and modulate the encoded data into data symbols. The TX data processor 220 may support different modulation and coding schemes (MCSs). For example, the TX data processor 220 may encode data at any one of a plurality of different coding rates (e.g., using low-density parity check (LDPC) encoding). In addition, the TX data processor 220 may modulate the encoded data using any one of a plurality of different modulation schemes including, but not limited to, BPSK, QPSK, 16QAM, 64QAM, 64APSK, 128APSK, 256QAM, and 256APSK.

The controller 234 may transmit, to the TX data processor 220, a command for specifying an MCS to be used (e.g., based on channel conditions for downlink transmission). The TX data processor 220 may encode and modulate the data received from the data source 215 according to the specified MCS. It needs to be recognized that the TX data processor 220 may perform additional processing on the data, such as data scrambling and/or other processing. The TX data processor 220 outputs the data symbols to the frame builder 222.

The frame builder 222 constructs a frame (also referred to as a packet) and inserts the data symbols into a data payload of the frame. The frame may include a preamble, a header, and a data payload. The preamble may include a short training field (STF) sequence and a channel estimation (CE) sequence to assist the access terminal 120 in receiving the frame. The header may include information regarding data in a payload, such as a length of the data and an MCS used to encode and modulate the data. Based on this information, the access terminal 120 may demodulate and decode the data. The data in the payload may be partitioned among a plurality of blocks, and each block may contain a part of the data and a guard interval (GI) to assist the receiver in phase tracking. The frame builder 222 outputs the frame to the TX processor 224.

The TX processor 224 processes the frame for transmission on downlink. For example, the TX processor 224 may support different transmission modes, e.g., an orthogonal frequency-division multiplexing (OFDM) transmission mode and a single-carrier (SC) transmission mode. In this example, the controller 234 may transmit, to the TX processor 224, a command for specifying a transmission mode to be used, and the TX processor 224 may process the frame for transmission according to the specified transmission mode. The TX processor 224 may apply a spectrum mask to the frame so that a frequency configuration of a downlink signal complies with particular spectrum requirements.

The TX processor 224 may support multiple-input-multiple-output (MIMO) transmission. In these aspects, the access point 110 may include a plurality of antennas 230-1 to 230-N and a plurality of transceivers 226-1 to 226-N (e.g., one for each antenna). The TX processor 224 may perform spatial processing on incoming frames and provide a plurality of transmission frame streams to a plurality of antennas. The transceivers 226-1 to 226-N receive and process (e.g., convert to analog, amplify, filter, and frequency up-convert) each of the transmission frame streams to generate transmission signals for transmission through the antennas 230-1 to 230-N.

To transmit data, the access terminal 120 includes a TX data processor 260, a frame builder 262, a TX processor 264, a plurality of transceivers 266-1 to 266-M, and a plurality of antennas 270-1 to 270-M (e.g., one antenna per transceiver). The access terminal 120 may transmit data to the access point 110 on uplink and/or transmit the data to another access terminal (e.g., for peer-to-peer communication). The access terminal 120 also includes a controller 274 configured to control operations of the access terminal 120.

The transceivers 266-1 to 266-M receive and process (e.g., convert to analog, amplify, filter, and frequency up-convert) an output from the TX processor 264 for transmission via one or more of the antennas 270-1 to 270-M. For example, the transceiver 266-1 may up-convert the output from the TX processor 264 into a transmission signal having a frequency in a 60 GHz band. Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 270-1 to 270-M and the transceivers 266-1 to 266-M may be implemented in an integrated form on a multi-layer circuit substrate. To do so, among the antennas 270-1 to 270-M, an antenna configured to operate with vertical polarization may be vertically arranged inside the multi-layer circuit substrate.

To receive data, the access point 110 includes a reception (RX) processor 242 and an RX data processor 244. During operation, the transceivers 226-1 to 226-N receive a signal (e.g., from the access terminal 120) and spatially process (e.g., frequency down-convert, amplify, filter, and digitally convert) the received signal.

The RX processor 242 receives outputs from the transceivers 226-1 through 226-N and processes the outputs to recover data symbols. For example, the access point 110 may receive data from a frame (e.g., from the access terminal 120). In this example, the RX processor 242 may detect a start of the frame using a short training field (STF) sequence in a preamble of the frame. The RX processor 242 may also use the STF for automatic gain control (AGC) adjustment. The RX processor 242 may also perform channel estimation (e.g., using a channel estimation (CE) sequence in the preamble of the frame), and perform channel equalization on the received signal based on the channel estimation.

The RX data processor 244 receives data symbols from the RX processor 242 and an indication of a corresponding MSC scheme from the controller 234. The RX data processor 244 demodulates and decodes the data symbols, recovers the data according to the indicated MSC scheme, and stores and/or outputs the recovered data (e.g., data bits) to a data sink 246 for additional processing.

The access terminal 120 may transmit the data using an orthogonal frequency-division multiplexing (OFDM) transmission mode or a single-carrier (SC) transmission mode. In this case, the RX processor 242 may process the received signal according to a selected transmission mode. In addition, as described above, the TX processor 264 may support MIMO transmission. In this case, the access point 110 includes the antennas 230-1 to 230-N and the transceivers 226-1 to 226-N (e.g., one for each antenna). Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 230-1 to 230-M and the transceivers 226-1 to 226-M may be implemented in an integrated form on a multi-layer circuit substrate. To do so, among the antennas 230-1 to 230-M, an antenna configured to operate with vertical polarization may be vertically arranged inside the multi-layer circuit substrate.

Meanwhile, each transceiver receives and processes (e.g., frequency down-converts, amplifies, filters, and digitally converts) a signal from each antenna. The RX processor 242 may perform spatial processing on the outputs from the transceivers 226-1 to 226-N to recover the data symbols.

The access point 110 also includes a memory 236 coupled to the controller 234. The memory 236 may store commands that, when executed by the controller 234, cause the controller 234 to perform one or more of the operations described herein. Similarly, the access terminal 120 also includes a memory 276 coupled to the controller 274. The memory 276 may store commands that, when executed by the controller 274, cause the controller 274 to perform one or more of the operations described herein.

Figure 3A:
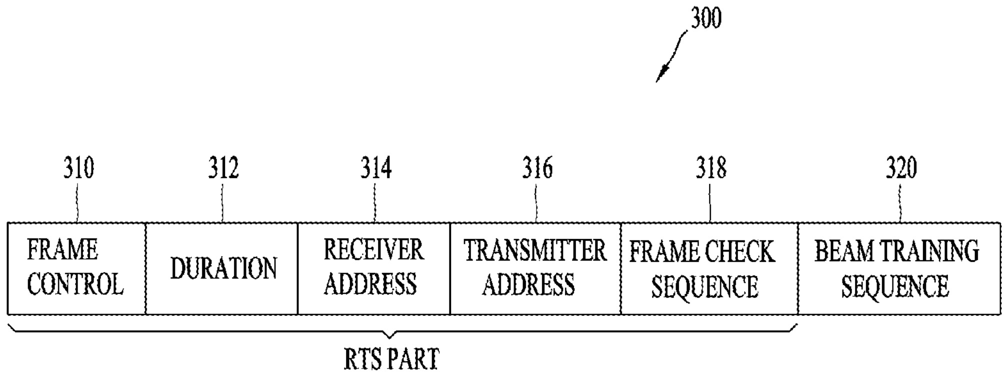
FIG. 3A illustrates a request to send (RTS) and a clear to send (CTS) according to the present disclosure.

Meanwhile, an electronic device supporting 802.11ay wireless interface according to the present disclosure determines whether or not a communication medium is available to communicate with other electronic devices. To this end, the electronic device transmits a Request to Send (RTS)-TRN frame including an RTS part and a first beam training sequence. In this regard, FIG. 3A illustrates a Request to Send (RTS) and a Clear to Send (CTS) according to the present disclosure. A transmitting device may use an RTS frame to determine whether a communication medium is available to transmit one or more data frames to a destination device. In response to the reception of the RTS frame, the destination device transmits a CTS frame to the transmitting device when the communication medium is available. In response to the reception of the CTS frame, the transmitting device transmits the one or more data frames to the destination device. In response to the successful reception of the one or more data frames, the destination device transmits one or more acknowledgment ("ACK") frames to the transmitting device.

Referring to (a) of FIG. 3A, a frame 300 includes an RTS part including a frame control field 310, a duration field 312, a receiver address field 314, a transmitter address field 316, and a frame check sequence field 318. For the purpose of improved communication and interference reduction, the frame 300 further includes a beam training sequence field 320 to configure antennas of a destination device and one or more neighboring devices, respectively.

Referring to (b) of FIG. 3A, a CTS frame 350 includes a CTS part including a frame control field 360, a duration field 362, a receiver address field 314, and a frame check sequence field 366. For the purpose of improved communication and interference reduction, the frame 350 further includes a beam training sequence field 368 to configure antennas of a transmitting device and one or more neighboring devices, respectively.

The beam training sequence fields 320 and 368 may comply with the training (TRN) sequence in accordance with IEEE 802.11ad or 802.11ay. The transmitting device may use the beam training sequence field 368 to configure its antenna for directional transmission to the destination device. On the other hand, the transmitting devices may use the beam training sequence field to configure their own antennas to reduce transmission interference at the destination device. In this case, the transmitting devices may use the beam training sequence field to configure their own antennas to generate antenna radiation patterns with nulls aimed at the destination device.

Therefore, electronic devices supporting 802.11 ay wireless interface may form initial beams to have a low interference level therebetween using beamforming patterns determined according to the beam training sequence. In this regard, FIG. 3B is a block diagram illustrating a communication system 400 according to an example of the present disclosure. As illustrated in FIG. 3B, first and second devices 410 and 420 may improve communication performance by matching directions of main beams. On the other hand, the first and second devices 410 and 420 may form signal-null having weak signal intensity in a specific direction, in order to reduce interference with a third device 430.

In relation to the formation of the main beam and the signal-null, a plurality of electronic devices according to the present disclosure may perform beamforming through array antennas. Referring to FIG. 3B, some of the plurality of electronic devices may alternatively be configured to perform communication with an array antenna of another electronic device through a single antenna. In this regard, when performing communication through the single antenna, a beam pattern is formed as an omnidirectional pattern.

Referring to FIG. 3B, the first to third devices 410 to 430 perform beamforming but a fourth device 440 does not perform beamforming, but the present disclosure is not limited thereto. Therefore, it may alternatively be configured such that three of the first to fourth devices 410 to 440 perform beamforming and the other may not perform beamforming.

As another example, it may be configured such that any one of the first to fourth devices 410 to 440 performs beamforming and the remaining three devices do not perform beamforming. As still another example, it may be configured such that two of the first to fourth devices 410 to 440 perform beamforming and the remaining two devices do not perform beamforming. As still another example, all the first to fourth devices 410 to 440 may be configured to perform beamforming.

Referring to FIGS. 3A and 3B, the first device 410 determines that it is an intended receiving device of the CTS-TRN frame 350 on the basis of an address displayed on the receiver address field 364 of the CTS-TRN frame 350. In response to the determination as the intended receiving device of the CTS-TRN frame 350, the first device 410 may use the beam training sequence of the beam training sequence field 368 of the received CTS-TRN 350 to configure its own antenna for a directional transmission substantially and selectively aimed at the second device 420. That is, the antenna of the first device 410 is configured to generate a primary lobe (e.g., highest gain lobe) substantially aimed at the second device 420, and an antenna radiation pattern with non-primary lobes aimed at other directions.

The second device 420 already knows the direction toward the first device 410 based on the beam training sequence of the beam training sequence field 320 of the previously-received RTS-TRN frame 300. Therefore, the second device 420 may configure its own antenna for a directional reception (e.g., primary antenna radiation lobe) selectively aimed at the first device 410. Therefore, while the antenna of the first device 410 is configured for the directional transmission toward the second device 420 and the antenna of the second device 420 is configured for the directional reception from the first device 410, the first device 410 transmits one or more data frames to the second device 420. Accordingly, the first and second devices 410 and 420 perform directional transmission/reception (DIR-TX/RX) of the one or more data frames through the primary lobe (main beam).

On the other hand, the first and second devices 410 and 420 may partially modify the beam pattern of the third device 430 to reduce interference with the third device 430 due to an antenna radiation pattern with the non-primary lobes.

In this regard, the third device 430 determines that it is not an intended receiving device of the CTS-TRN frame 350 on the basis of an address indicated in the receiver address field 364 of the CTS-TRN frame 350. In response to the determination that it is not the intended receiving device of the CTS-TRN frame 350, the third device 430 uses the beam training sequence of the beam training sequence field 368 of the received CTS-TRN 350 and the sequence of the beam training sequence field 320 of the previously-received RTS-TRN frame 300, in order to configure its antenna to generate antenna radiation patterns each with nulls substantially aimed at the second device 420 and the first device 410. The nulls may be based on estimated arrival angles of the previously-received TRS-TRN frame 300 and CTS-TRN frame 350. In general, the third device 430 generates antenna radiation patterns with desired signal power, refusals, or gains aimed at the first device 410 and the second device 420 such that estimated interferences at the devices 410 and 420 are equal to or lower than a defined threshold value (e.g., to achieve a desired bit error rate (BER), signal-to-noise ratio (SNR), signal-to-interference ratio (SINR), and/or other one or more communication attributes).

The third device 430 may configure its antenna transmission radiation pattern by estimating antenna gains in directions toward the first and second devices 410 and 420, estimating antenna mutuality differences (e.g., transmitting antenna gain–receiving antenna gain) between the third device 430 and the first and second devices 410 and 420, and calculating those values over one or more sectors for determining corresponding estimated interferences at the first and second devices 410 and 420.

The third device 430 transmits the RTS-TRN frame 300 intended for the fourth device 440, which the fourth device 440 receives. The third device 430 maintains an antenna configuration with nulls aimed at the first and second devices 410 and 420 as long as the first device 410 and the second device 420 are communicating based on durations displayed on the duration fields 312 and 362 of the RTS-TRN frame 300 and the CTS-TRN frame 350, respectively. As the antenna of the third device 430 is configured to produce the nulls aimed at the first device 410 and the second device 420, the transmission of the RTS-TRN frame 300 by the third device 430 may produce reduced interferences at the first device 410 and the second device 420.

Therefore, electronic devices supporting the 802.11ay wireless interface disclosed herein can form a signal-null to a specific direction for interference reduction while matching a main beam direction therebetween using array antennas. To this end, the plurality of electronic devices may form an initial beam direction through a beam training sequence, and change the beam direction through the periodically updated beam training sequence.

As aforementioned, the beam directions should be matched between the electronic devices for high-speed data communication between the electronic devices. Also, the loss of wireless signals transmitted to an antenna element should be minimized for the high-speed data communication. To this end, the array antenna should be disposed inside a multi-layered substrate on which an RFIC is disposed. Also, the array antenna is necessarily disposed adjacent to a side area inside the multi-layered substrate for radiation efficiency.

In addition, the beam training sequence should be updated to adapt to the change of a wireless environment. To update the beam training sequence, the RFIC should periodically transmit and receive signals to and from a processor such as a modem. Therefore, control signal transmission and reception between the RFIC and the modem should also be carried out within fast time to minimize an update delay time. To this end, a physical length of a connection path between the RFIC and the modem should be reduced. To this end, the modem may be disposed on the multi-layered substrate on which the array antenna and the RFIC are disposed. Or, in the structure that the array antenna and the RFIC are disposed on the multi-layered substrate and the modem is disposed on a main substrate, the connection length between the RFIC and the modem may be minimized.

Figure 4:
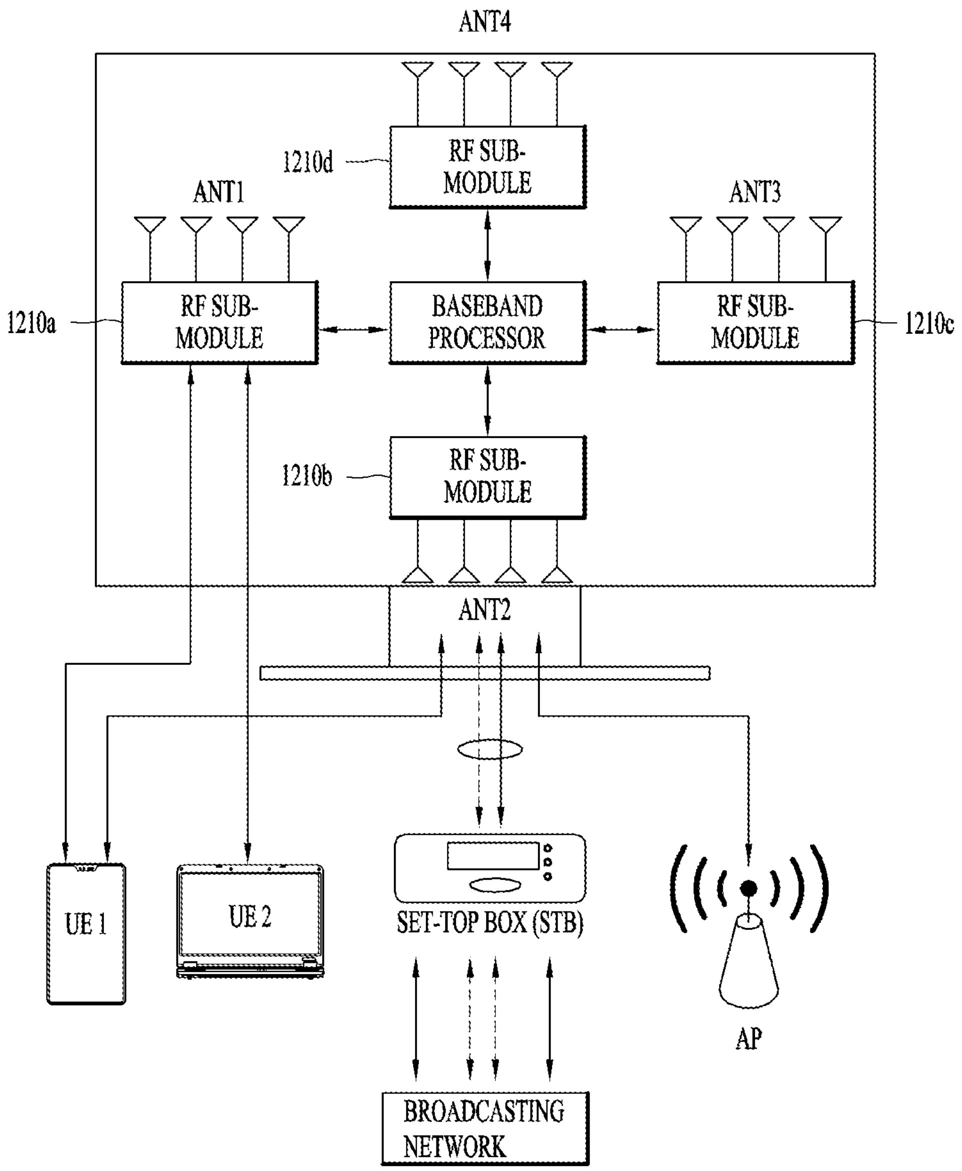
FIG. 4 is a diagram illustrating an electronic device including a plurality of antenna modules and a plurality of transceiver circuit modules in accordance with one embodiment.

Hereinafter, an electronic device having an array antenna that can operate in a mmWave band will be described. In this regard, FIG. 4 is a diagram illustrating an electronic device including a plurality of antenna modules and a plurality of transceiver circuit modules in accordance with one embodiment. Referring to FIG. 4, a home appliance in which a plurality of antenna modules and a plurality of transceiver circuit modules are disposed may be a television, but is not limited thereto. Therefore, the home appliance having the plurality of antenna modules and the plurality of transceiver circuit modules disclosed herein may include an arbitrary home appliance or display device that supports a communication service in a millimeter wave band.

Referring to FIG. 4, the electronic device 1000 includes a plurality of antenna modules ANT1 to ANT4 and a plurality of transceiver circuit modules 1210*a* to 1210*d*. In this regard, the plurality of transceiver circuit modules 1210*a* to 1210*d* may correspond to the aforementioned transceiver circuit 1250. Or, the plurality of transceiver circuit modules 1210*a* to 1210*d* may be a partial configuration of the transceiver circuit 1250 or a partial configuration of a front end module disposed between the antenna module and the transceiver circuit 1250.

The plurality of antenna modules ANT1 to ANT4 may be configured as array antennas with a plurality of antenna elements. The number of elements of each antenna module ANT1 to ANT4 may be two, three, four, and the like as aforementioned, but it not limited thereto. For example, the number of antenna modules ANT1 to ANT4 may be expanded to two, four, eight, sixteen, and the like. Also, the elements of the antenna modules ANT1 to ANT4 may be selected by the same number or different numbers. The plurality of antenna modules ANT1 to ANT4 may be disposed on different areas of the display or on a bottom or side surface of the electronic device. The plurality of antenna modules ANT1 to ANT4 may be disposed on top, left, bottom, and right sides of the display, but the present disclosure is not limited thereto. As another example, the plurality of antenna modules ANT1 to ANT4 may alternatively be disposed on a left top portion, a right top portion, a left bottom portion, and a right bottom portion of the display.

The antenna modules ANT1 to ANT4 may be configured to transmit and receive signals at an arbitrary frequency band in a specific direction. For example, the antenna modules ANT1 to ANT4 may operate at one of 20 GHz band, 39 GHz band, and 64 GHz band.

The electronic device may maintain a connection state with different entities through two or more of the antenna modules ANT1 to ANT4 or perform data transmission or reception therefor. In this regard, the electronic device corresponding to the display device may transmit or receive data to or from a first entity through the first antenna module ANT1. The electronic device may transmit or receive data to or from a second entity through the second antenna module ANT2. As one example, the electronic device may transmit or receive data to or from a mobile terminal (User Equipment (UE)) through the first antenna module ANT1. The electronic device may transmit or receive data to or from a control device such as a set-top box or access point (AP) through the second antenna module ANT2.

The electronic device may transmit or receive data to or from other entities through the other antenna modules, for example, the third antenna module ANT3 and the fourth antenna module ANT4. As another example, the electronic device may perform dual connectivity or MIMO with at least one of previously-connected first and second entities through the third antenna module ANT3 and the fourth antenna module ANT4.

The mobile terminals UE1 and UE2 may be disposed on a front area of the electronic device to communicate with the first antenna module ANT1. On the other hand, the set-top box STB or the AP may be disposed on a bottom area of the electronic device to communicate with the second antenna module ANT2 but is not limited thereto. As another example, the second antenna module ANT2 may include a first antenna radiating a signal to the bottom area, and a second antenna radiating a signal to a front area. Therefore, the second antenna module ANT2 may perform communication with the set-top box STB or the AP through the first antenna, and perform communication with one of the mobile terminals UE1 and UE2 through the second antenna.

Meanwhile, one of the mobile terminals UE1 and UE2 may be configured to perform MIMO with the electronic device. As one example, the UE1 may be configured to perform MIMO while performing beamforming with the electronic device. As aforementioned, the electronic device corresponding to the image display device may perform high-speed communication with another electronic device or set-top box through a WiFi wireless interface. As one example, the electronic device may perform high-speed communication with another electronic device or set-top box at 60 GHz through 802.11ay wireless interface.

In the meantime, the transceiver circuit modules 1210*a* to 1210*d* may operate to process transmission signals and reception signals at RF frequency bands. Here, the RF frequency bands, as aforementioned, may be arbitrary mmWave frequency bands, such as 28 GHz, 39 GHz, and 64 GHz. The transceiver circuit modules 1210*a* to 1210*d* may be referred to as RF sub-modules 1210*a* to 1210*d*. At this time, the number of RF sub-modules 1210*a* to 1210*d* may not be limited to four, but may vary to an arbitrary number more than two depending on an application.

Also, the RF sub-modules 1210*a* to 1210*d* may include an up-conversion module and a down-conversion module that convert a signal of an RF frequency band into a signal of an IF frequency band or a signal of an IF frequency band into a signal of an RF frequency band. To this end, the up-conversion module and the down-conversion module may include a local oscillator (LO) that can perform up-frequency conversion and down-frequency conversion.

The plurality of RF sub-modules 1210*a* to 1210*d* may be configured such that a signal is transmitted from one of the plurality of transceiver circuit modules to an adjacent transceiver circuit module. Accordingly, the transmitted signal can be transmitted at least one time to all of the plurality of transceiver circuit modules 1210*a* to 1210*d*.

To this end, a data transfer path in a loop structure may be additionally provided. In this regard, the adjacent RF sub-modules 1210*b* and 1210*c* may be allowed to perform a bi-directional signal transfer through a transfer path P2 with the loop structure.

Or, a data transfer path in a feedback structure may be additionally provided. In this regard, at least one RF sub-module 1210*c* is allowed to perform a uni-directional signal transfer to the other RF sub-modules 1210*a*, 1210*b*, and 1210*c* through the data transfer path with the feedback structure.

The plurality of RF sub-modules may include a first RF sub-module to a fourth RF sub-module 1210*a* to 1210*d*. In this regard, a signal may be transferred from the first RF sub-module 1210*a* to the adjacent second RF sub-module 1210B and fourth RF sub-module 1210*d*. Also, the second RF sub-module 1210*b* and the fourth RF sub-module 1210*d* may transfer the signal to the third RF sub-module 1210*c*. At this time, when the second RF sub-module 1210*b* and the third RF sub-module 1210*c* are available to transmit signals bidirectionally, it may be referred to as the loop structure. On the other hand, when the second RF sub-module 1210*b* and the third RF sub-module 1210*c* are available to merely transmit signals unidirectionally, it may be referred to as the feedback structure. In the feedback structure, at least two signals may be transferred to the third RF sub-module 1210*c*.

However, with no limit to this, the baseband module may be disposed in a specific module of the first to fourth RF sub-modules 1210*a* to 1210*d* depending on applications. Or, depending on applications, the baseband module may not be disposed in the first to fourth RF sub-modules 1210*a* to 1210*d*, but may be configured as a separate controller, namely, a baseband processor 1400. For example, a control signal transfer may alternatively be carried out only by the separate controller, namely, the baseband processor 1400.

Figure 3A:
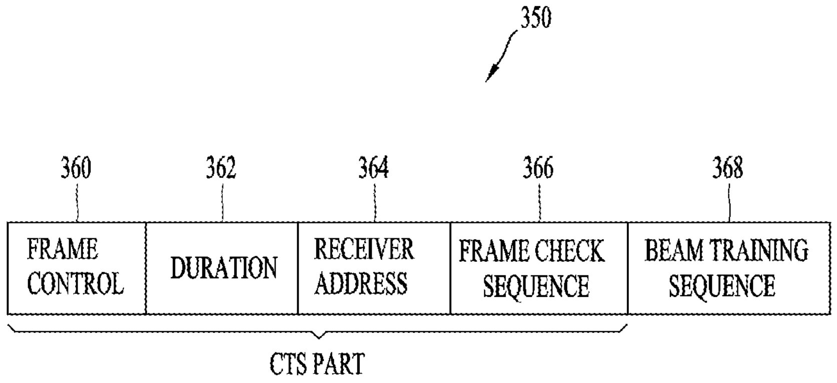
Figure 3B:
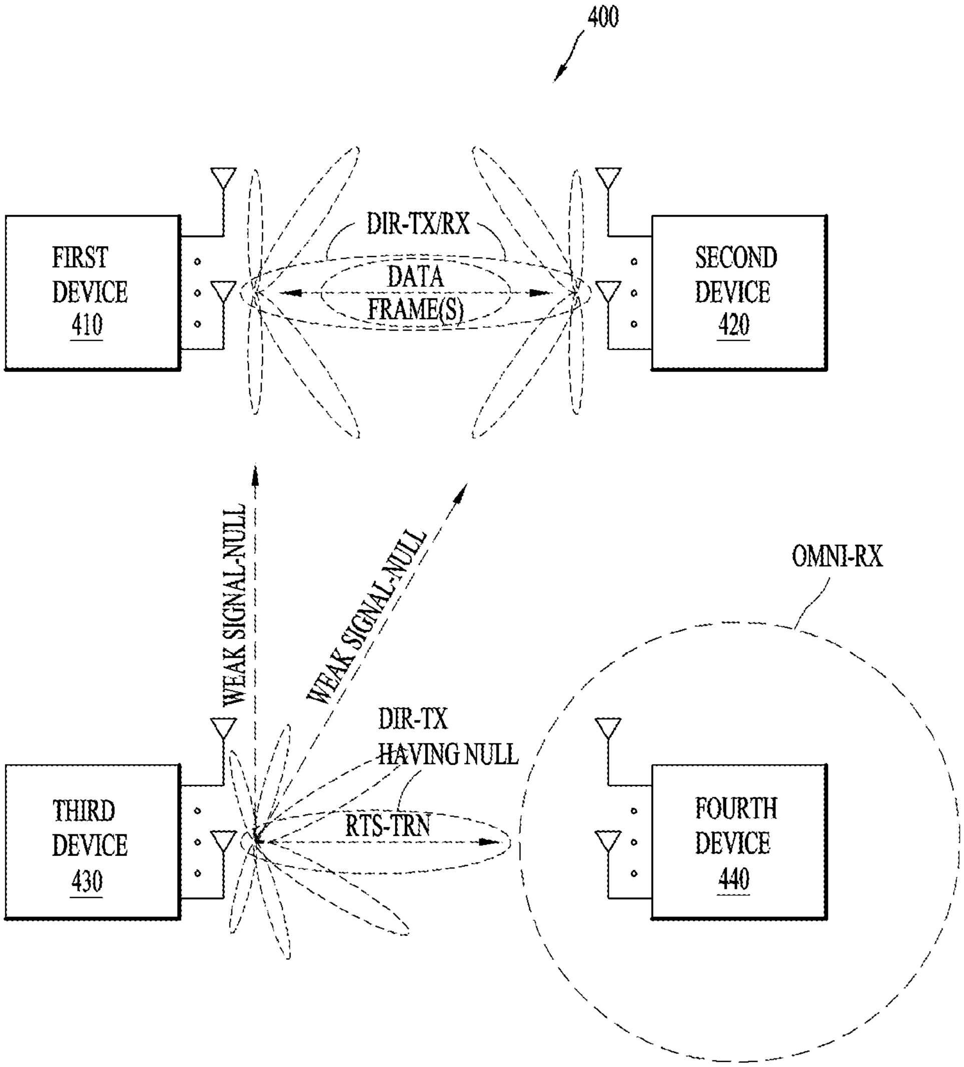
FIG. 3B is a block diagram illustrating a communication system 400 according to an example of the present disclosure.

Hereinafter, a description will be given of detailed configuration and functions of the electronic device having antennas that may be disposed inside or on side surfaces of the multi-transceiver system as illustrated in FIG. 3 and the electronic device of FIG. 4, in the electronic device as illustrated in FIGS. 1 to 2.

The electronic device such as the image display device may include a communication module having antennas to perform communications with neighboring electronic devices. Meanwhile, as a display area (region) of an image display device is expanded recently, a disposition space of a communication module including antennas is reduced. This causes an increase in necessity of disposing antennas inside a multi-layered circuit board on which the communication module is implemented.

A WiFi radio interface may be considered as an interface for a communication service between electronic devices. When using such a WiFi radio interface, a millimeter wave (mmWave) band may be used for high-speed data transmission between the electronic devices. In particular, the high-speed data transmission between the electronic devices is achieved using a radio interface such as 802.11ay.

Hereinafter, a description will be given of detailed configuration and functions of the electronic device as illustrated in FIG. 1, having wireless interfaces as illustrated in FIG. 2. Electronic devices are needed to transmit or receive data therebetween using communication services at an mmWave band. In this regard, wireless audio-video (AV) service and/or high-speed data transmission may be provided by using 802.11ay wireless interface as the mmWave wireless interface. In this case, the mmWave wireless interface is not limited to the 802.11ay wireless interface, but an arbitrary wireless interface of 60 GHz may be applied. In this regard, a 5G or 6G wireless interface that uses 28 GHz band or 60 GHz band may alternatively be used for high-speed data transmission between electronic devices.

There is no detailed solution to antenna and radio frequency integrated chip (RFIC) providing a wireless interface in an electronic device such as an image display device for transferring images with resolution over 4K. Specifically, considering a situation that the electronic device such as the image display device is disposed on a wall of a building or a table, the electronic device is needed to transmit or receive wireless AV data to or from another electronic device. To this end, a detailed configuration and antenna structure for determining an area of the image display device to dispose the antenna and RFIC should be proposed.

Figure 5A:
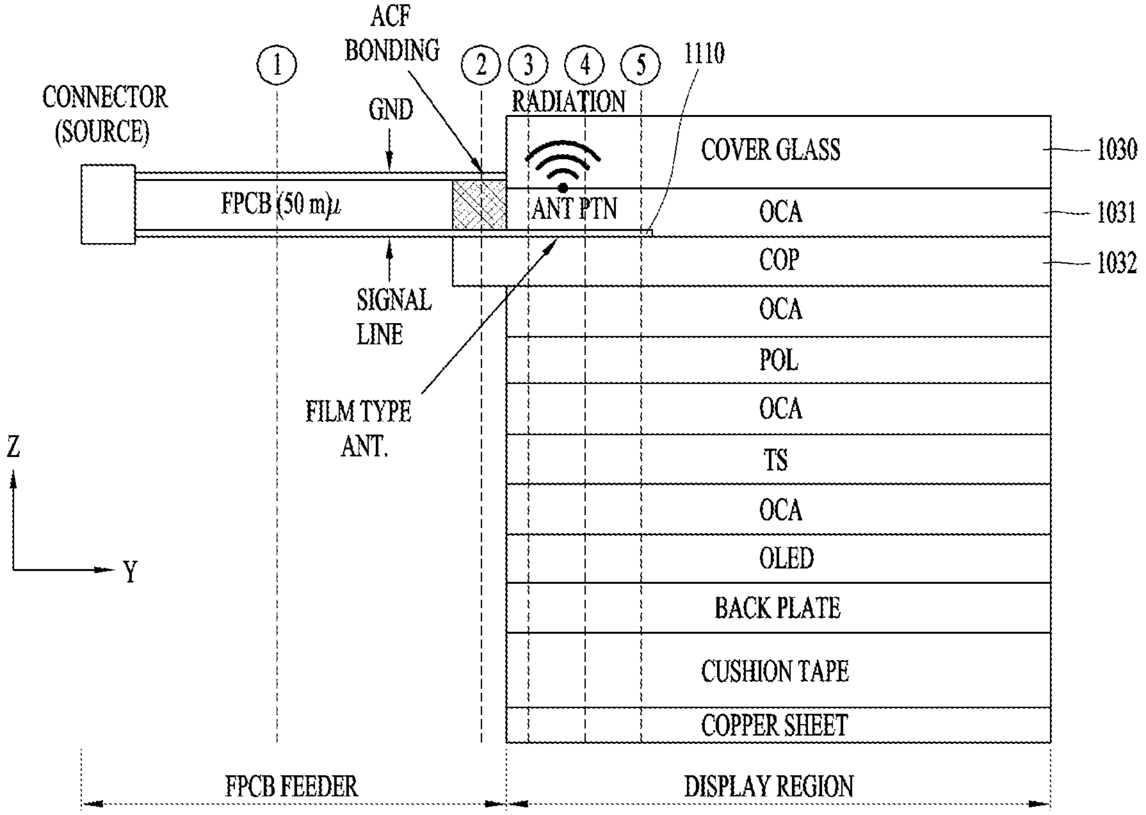
FIG. 5A is a configuration view illustrating that an in-display antenna is connected to an FPCB in accordance with one embodiment. Also.
Figure 5B:
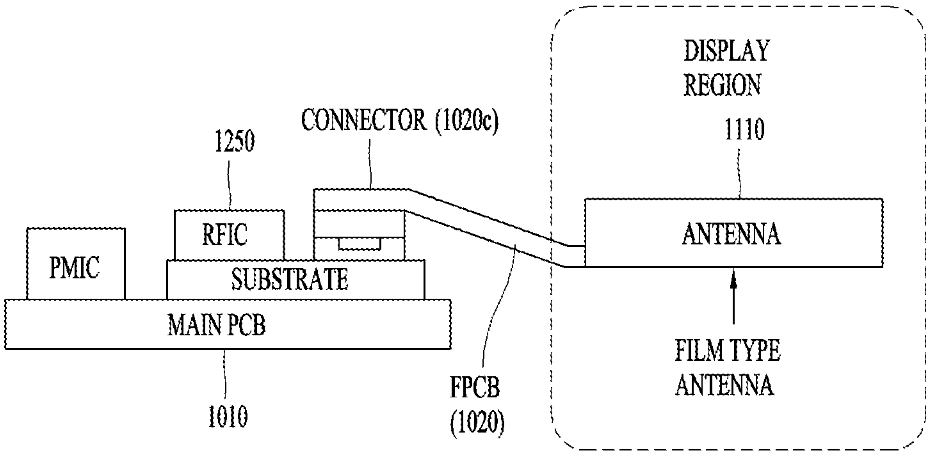
FIG. 5B is a configuration view illustrating that the FPCB connected to the in-display antenna is connected to a main PCB in accordance with one embodiment.

In this regard, FIG. 5A is a configuration view illustrating that an in-display antenna is connected to an FPCB in accordance with one embodiment. Also, FIG. 5B is a configuration view illustrating that the FPCB connected to the in-display antenna is connected to a main PCB in accordance with one embodiment.

Referring to FIG. 5A, an in-display antenna 1110 may be formed as a thin film between an optically clear adhesive (OCA) layer 1031 and a cyclo olefine polymer (COP) layer 1032 disposed beneath a cover glass 1030 of the display 151. Meanwhile, a copper sheet on a lower end of the display 151 is a copper on a lower end of an OLED panel and may operate as a ground plane of the in-display antenna 1110.

Hereinafter, a display structure having transparent antennas therein will be described. Referring to FIG. 5A, a COP layer may be disposed on an OLED display panel and an OCA inside the display. Here, a dielectric in the form of a film, such as the COP layer, may be used as a dielectric substrate of a transparent antenna. In addition, an antenna layer may be disposed on the dielectric in the form of the film. Here, the antenna layer may be made of alloy (Ag alloy), copper, aluminum, or the like. In some examples, the in-display antenna 1110 and a transmission line may be disposed on the antenna layer.

In relation to the in-display antenna 1110 according to one embodiment, a metal pattern of a feeding unit may be bonded to CPW feeding unit 1121 through an anisotropic conductive film (ACF) in a CPW area. Here, since the ACF bonding is performed in the CPW area, it is advantageous that an electrical loss at a disconnected point can be reduced by the ground (GND) pattern in the CPW area.

Also, the ACF bonding point may be selected as a point 2) among points 1) to 5). Accordingly, as the ACF bonding point is selected as the point 2) that is a boundary between a transparent area and an opaque area of the display, the CPW feeding unit 1121 such as a feeding line may be disposed on the opaque area. On the other hand, a transparent film radiator, such as the in-display antenna 1110, may be disposed on the transparent area.

Referring to FIG. 5B, the in-display antenna 1110 may be connected to a main PCB through an FPCB. In this regard, the in-display antenna 1110 may be connected to the main PCB through a connector that is connected to an end portion of the FPCB. In this case, the connector may be electrically connected to a substrate disposed on the main PCB. Accordingly, the in-display antenna 1110 may be connected to a transceiver circuit 1250 disposed on the main PCB through the FPCB. Also, a power management integrated circuit (PMIC) may be disposed on the main PCB to supply power to the transceiver circuit 1250 or the baseband processor 1400 and control/manage the supplied power.

In short, to supply a signal to a film-type antenna designed on a single layer according to the present disclosure, a feeding line transition step to be explained hereinafter may be performed. The feeding line transition step may be carried out through the connector (in contact with the Main PCB)→(Microstrip line)→ACF bonding (CPW-G; Coplanar Waveguide having a ground plane)→film-type antenna (1 layer).

Meanwhile, in relation to the in-display antenna of the film-type antenna structure according to the present disclosure, the copper foil on the lower end of the OLED panel plays a role of a ground plane of a film-type patch antenna, which may result in securing high directionality toward the front surface of the display.

Also, the in-display antenna proposed in the present disclosure can steer beams through a phase delay circuit, and may operate in a vertical/horizontal polarization mode according to a feeding line configuration.

Hereinafter, 1) a signal line as an FPCB feeding line in an external area of a display will be described with reference to FIGS. 5A and 5B. In this regard, the FPCB feeding line is a microstrip line-based signal line and may transfer a signal applied from a source to the antenna. As one example, a top surface of the FPCB is a ground plane, a bottom surface is a signal line, and an electric field distribution of a cross-section may be the same as or similar to an electric field distribution of a microstrip line. As another example, a bottom surface of the FPCB is a ground plane, a top surface is a signal line, and an electric field distribution of a cross-section may be the same as or similar to an electric field distribution of a microstrip line.

Hereinafter, 2) a bonding portion between the FPCB and the COP, which corresponds to a connection portion between a FPCB feeding line and the in-display antenna will be described. In this regard, the FPCB signal line and a film-type antenna may be bonded to each other through ACF bonding. For the ACF bonding, it has a co-planar waveguide with ground (CPW-G) type structure and is similar to an electric field distribution of a microstrip line. Also, the CPW-G is insensitive to the changes of characteristic impedance due to external factors such as structural changes, coupling, process errors, etc., compared to the microstrip line or CPW structure. Therefore, the CPW-G structure has a stable transition characteristic at the bonding portion between the signal line and the antenna.

Meanwhile, the display antenna disclosed herein may be configured to operate in an mmWave band. In this regard, the display antenna disclosed herein may be configured to operate at 60 GHz as well as 28 GHz. Therefore, the display antenna disclosed herein may alternatively be configured to perform wireless communication between devices using the band of 60 GHz in IPTV.

The present disclosure proposes an idea related to designing a transparent display antenna capable of being applied to a full-screen display. Therefore, the present disclosure is to propose a technology of designing a dual polarization array antenna capable of reinforcing directionality toward a front surface of a display while maintaining a product design.

To this end, an antenna is implemented on a thin film in an etching manner into a single-layered coplanar metal mesh shape, and accordingly an ultra-thin transparent antenna capable of being inserted into a display can be designed. Also, an array antenna supporting a dual polarization mode can be implemented within a very small space, thereby shortening a signal path between a feeding line and a driving circuit and remarkably reducing a propagation path loss.

The transparent display antenna proposed in the present disclosure can implement dual polarization characteristics by alternately disposing slot/dipole antennas having vertical/horizontal polarization characteristics. To improve isolation between antennas and equalize radiation patterns of unit elements, a dummy element and a dummy port may be configured.

Figure 6A:
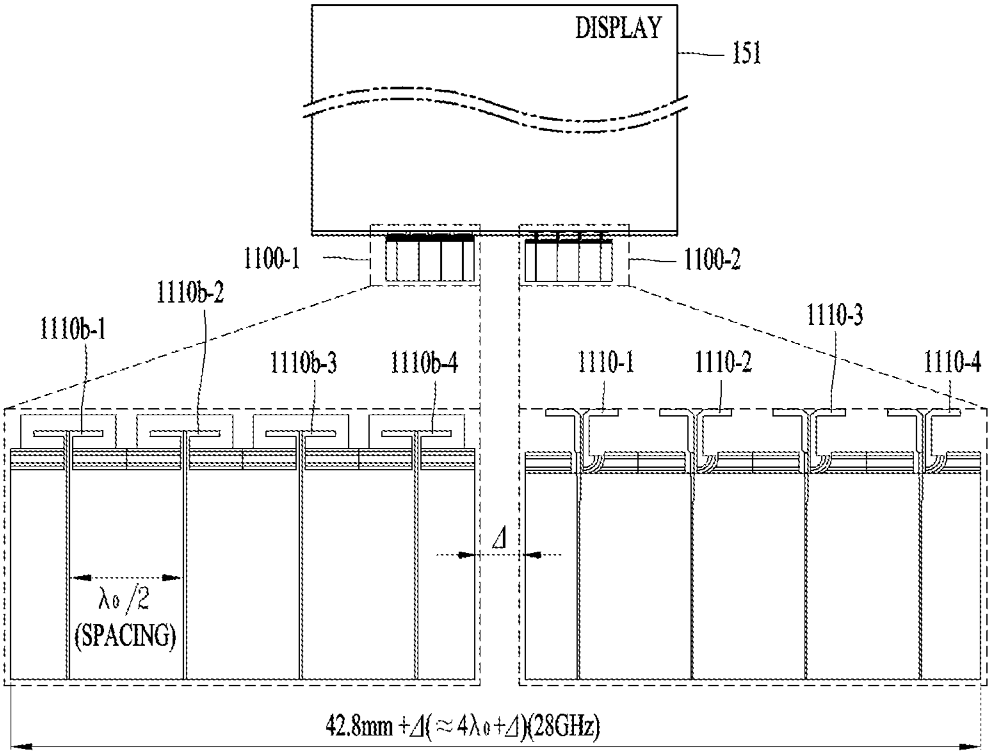
FIG. 6A is a configuration view illustrating that a first type antenna and a second type antenna are disposed as different modules on an electronic device in accordance with one embodiment.

FIG. 6A is a configuration view illustrating that a first type antenna and a second type antenna are disposed as different modules on an electronic device in accordance with one embodiment. On the other hand, FIG. 6B is a configuration view illustrating that the first type antenna and the second type antenna are disposed as the same module on an electronic device in accordance with one embodiment.

Referring to FIG. 6A, a first antenna module 1100-1 and a second antenna module 1100-2 may be disposed at different positions on a lower region of an electronic device. As one example, first to fourth dipole antennas 1110-1 to 1110-4 may configure the first antenna module 1100-1. On the other hand, first to fourth slot antennas 1110*b*-1 to 1110*b*-4 may configure the second antenna module 1100-1.

As illustrated in FIG. 6A, when the first antenna module 1100-1 and the second antenna module 1100-2 are disposed in separate regions, an area occupied by the antenna module increases. With regard to this, if a spacing between adjacent antennas is a half wavelength, an entire size of an antenna is four wavelengths or more. As one example, an entire size of an antenna at 28 GHz may be about 42.8 mm.

Figure 6B:
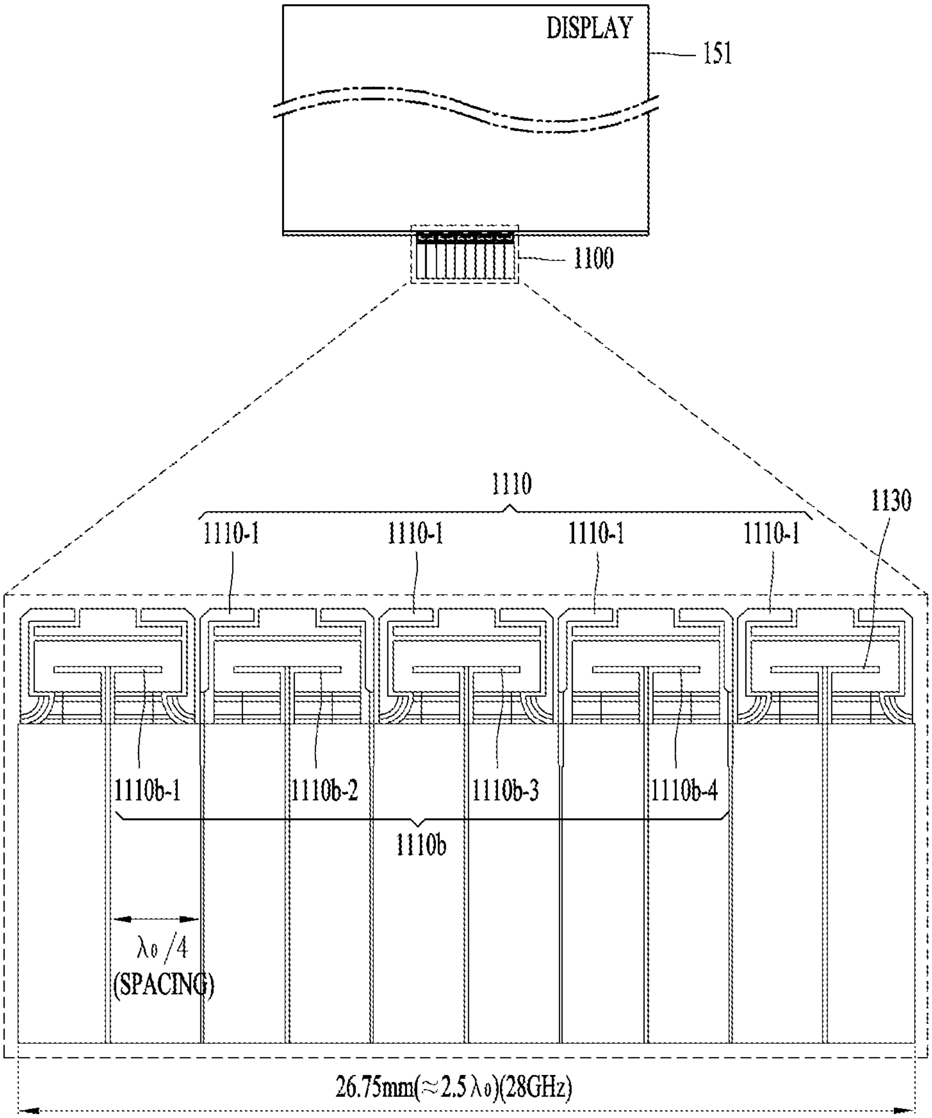
FIG. 6B is a configuration view illustrating that a first type antenna and a second type antenna are disposed as the same module on an electronic device in accordance with one embodiment.

Referring to FIG. 6B, an antenna module 1100 may be one module at a specific position on a lower region of the electronic device. As one example, first to fourth dipole antennas 1110-1 to 1110-4 may be disposed at a specific region within the antenna module 1100. On the other hand, first to fourth slot antennas 1110*b*-1 to 1110*b*-4 may be disposed at another region within the antenna module 1100. In this regard, the number of dipole antennas and slot antennas is not limited to four (4), but may be changed to 2, 3, 5, 6, 7, 8, etc. depending on applications.

As illustrated in FIG. 6B, when the first to fourth dipole antennas 1110-1 to 1110-4 and the first to fourth slot antennas 1110*b*-1 to 1110*b*-4 are disposed within one antenna module 1100, an area occupied by the antenna module is minimized. In this regard, the fourth slot antenna 1110*b*-4 may be disposed at one side of the fourth dipole antenna 1110-4 and a dummy pattern 1130 may be disposed at another side of the fourth dipole antenna 1110-4. The performance of the fourth dipole antenna 1110-4 can be maintained by the dummy pattern 1130 to be same as the performance of other dipole antennas. On the other hand, when a spacing between adjacent antennas is a half wavelength, an entire size of the antenna including the dummy pattern 1130 is about 2.5 wavelength. As one example, an entire size of an antenna at 28 GHz may be reduced to about 26.75 mm.

Referring to FIG. 6B, vertically polarized antennas and horizontally polarized antennas that are orthogonal to each other may be disposed in an alternating manner, to minimize interference between the vertically polarized antenna and the horizontally polarized antenna and form independent radiation patterns. The vertically polarized antenna and the horizontally polarized antenna may be the slot antenna and the dipole antenna, respectively, but are not limited thereto. Also, a design of an array antenna in a very small space (reduction of design space by about ½) can be implemented and all antennas can be realized on a single-layer film, which enables a design of an ultra-thin antenna. An antenna pattern can be formed on a single-layer form through a single layer metallization.

Compared to the disposition, as illustrated in FIG. 6A, of adjacent vertical and horizontal antennas which are independent of each other, the alternating disposition of antennas as illustrated in FIG. 6B shortens a length between feeding lines. This can reduce a spacing between adjacent elements in an array antenna, which can facilitate circuit integration of multiple feeding lines. As one example, a spacing between adjacent antennas of FIG. 6A is $\lambda 0/2$, and a spacing between adjacent antennas of FIG. 6B is reduced to $\lambda 0/4$. Therefore, a simple and short feeding path can be implemented through the alternating disposition as illustrated in FIG. 6B, and a propagation path loss due to a shortened signal path of feeding line-driving circuit (RFIC, etc.) can be remarkably reduced.

Figure 7:
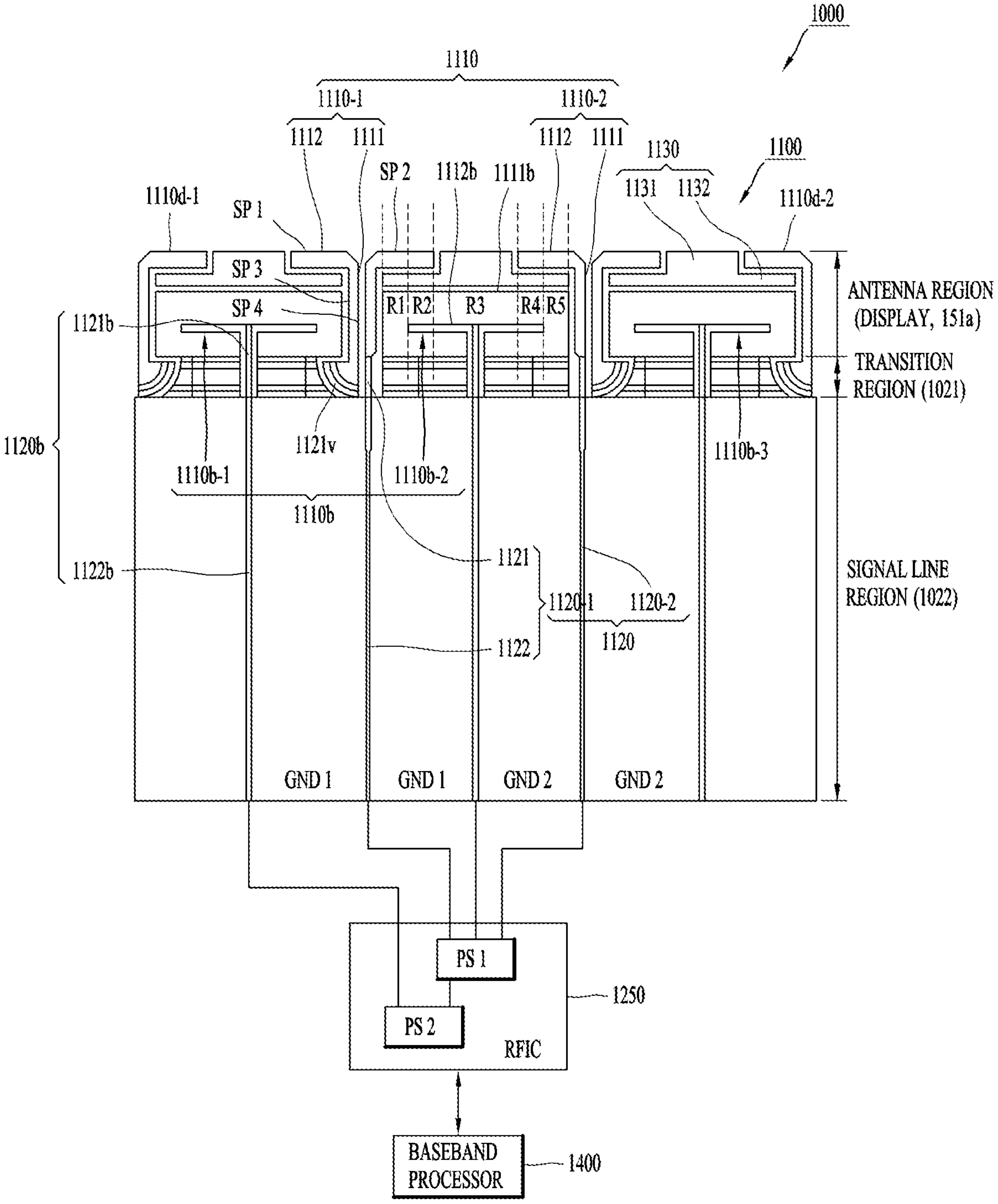
FIG. 7 illustrates a detailed structure of a single element disposed in in an alternating arrayed dual polarization display according to the present disclosure and a 2×1 array antenna configured by the elements.

Hereinafter, an alternating arrayed dual polarization antenna structure disclosed in the present disclosure will be described in detail. In this regard, FIG. 7 illustrates a detailed structure of a single element disposed in an alternating arrayed dual polarization display according to the present disclosure and a 2×1 array antenna configured by the elements. Referring to FIG. 7, a single element antenna may be configured by a dipole antenna 1110 and a slot antenna 1110*b*.

Figure 8:
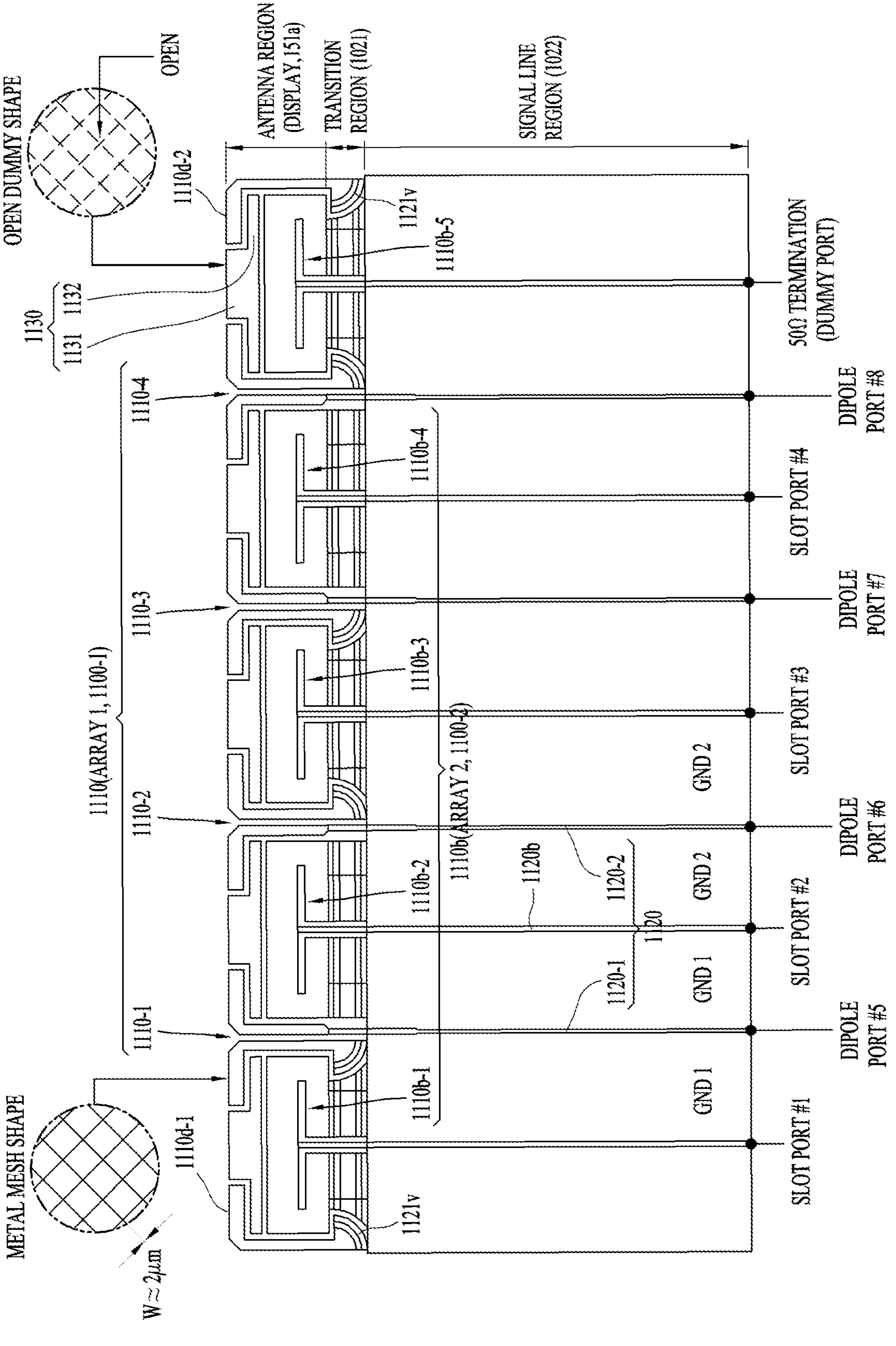
FIG. 8 illustrates a detailed structure in which the alternating arrayed dual polarization display antenna disclosed in FIG. 7 is configured as a 4×1 array antenna or by more antenna elements.

On the other hand, FIG. 8 illustrates a detailed structure in which the alternating arrayed dual polarization display antenna disclosed in FIG. 7 is configured as a 4×1 array antenna or by more antenna elements.

Referring to FIGS. 5A, 5B, 6B, and 7, an electronic device 1000 including an antenna module 1100 is disclosed. The electronic device 1000 may include a display 151, an antenna module 1100, and a main PCB 1010 on which a transceiver circuit 1250 is disposed.

With regard to this, the antenna module 1100 may be disposed in the display 151, as illustrated in FIG. 5A, which is formed in a structure having a plurality of layers. The antenna module 1100 may have a configuration in which a plurality of metal mesh patterns disposed on a dielectric substrate 1032 are combined in cover glass 1030, and may also be referred to as an antenna assembly 110.

According to one aspect of the present disclosure, an electronic device 1000 including an antenna assembly 1110 disposed in the display 151 may be proposed. In this regard, the display 151 may be configured to include the cover glass 1030. The antenna assembly 1100 may be configured as a metal mesh pattern on a dielectric substrate 1032 formed inside the display 151. Therefore, the antenna assembly 1100 may be configured to radiate a wireless signal through the cover glass 1030 in an external direction, for example, a forward (front) direction of the display 151.

On the other hand, the antenna assembly 1100 according to another aspect of the present disclosure may include a dipole antenna 1110 and a slot antenna 1110*b*. The dipole antenna 1110 may include a first dipole antenna 1110-1 and a second dipole antenna 1110-2 formed by conductive patterns on both sides of a surface of the dielectric substrate 1032. The slot antenna 1110*b* may have a slot region (or slot area) 1112*b* formed inside a ground pattern 1111*b* disposed between the first dipole antenna 1110-1 and the second dipole antenna 1110-2.

The dipole antenna 1110 may include a first metal pattern 1111 disposed in the display in a first axial direction, and a second metal pattern 1112 rotated by a predetermined angle from the first metal pattern 1111 to be disposed in a second axial direction. In this regard, the first axis and the second axis may be perpendicular to each other. As one example, the first axis and the second axis may be a y-axis and an x-axis, respectively.

The slot antenna 1110*b* may have a slot region 1112*b* formed in a ground pattern 1111*b* that is spaced a predetermined distance apart from an outer region of the first metal pattern 1111 and a lower region of the second metal pattern 1112. The slot region 1112*b* may overlap the second metal pattern 1111 by a predetermined length in the second axial direction. The slot region 1112*b* may be disposed to be spaced apart from the second metal pattern 1111 by a preset distance in the first axial direction.

The first feeding unit 1120 may be electrically connected to the first metal pattern 1111 of the dipole antenna 1110 to apply a first signal to the dipole antenna 1110. On the other hand, the second feeding unit 1120*b* may be electrically connected to the ground pattern 1111*b* through an inside of the slot region 1112*b* of the slot antenna 1110*b*, to apply a second signal to the slot antenna 1110*b*.

The first feeding unit 1120 may include a first CPW feeding line 1120-1 and a second CPW feeding line 1120-2. The first feeding unit 1120 includes a first CPW feeding line 1120-1 and a second CPW feeding line 1120-2 electrically connected to the first dipole antenna 1110-1 and the second dipole antenna 1110-2 on the same plane. The second feeding unit 1120*b* may be electrically connected to the slot region 1111*b* on the same plane. The CPW slot feeding line 1120*b* may be disposed between the first CPW feeding line 1120-1 and the second CPW feeding line 1120-2. The second feeding unit 1120*b* is a CPW feeding line through which the slot antenna 1110*b* feeds. Accordingly, the second feeding unit 1120*b* may be referred to as a CPW slot feeding line 1120*b*.

First ground patterns GND1 may be disposed on one side and another side of the first CPW feeding line 1120-1, and second ground patterns GND2 may be disposed on one side and another side of the second CPW feeding line 1120-2. The CPW slot feeding line 1120*b* may be disposed between the first ground pattern GND1 disposed on the another side of the first CPW feeding line 1120-1, and the second ground pattern GND2 disposed on the one side of the second CPW feeding line 1120-2.

Referring to FIGS. 5A, 5B, and 6B to 8, a dummy metal mesh pattern 1130 may be disposed between the dipole antenna 1120 and the slot antenna 1120*b*. The dummy metal mesh pattern 1130 may also be referred to as a dummy pattern 1130 for the sake of explanation. The dummy metal mesh pattern 1130 may be disposed between the first dipole antenna 1110-1 and the second dipole antenna 1110-2 on a top of the ground pattern 1111*b* where the slot region 1112*b* is formed.

Dummy dipoles 1110*d*-1 and 1110*d*-2 may be disposed as dummy radiators on the outermost sides of the slot antenna 1120. In this regard, the slot antenna 1110*b* may include a plurality of slot antennas. The antenna assembly 1100 may further include dummy dipoles 1110*d*-1 and 1110*d*-2 that are disposed adjacent to slot antennas located at the outermost sides among the plurality of slot antennas. Each of the dummy dipoles 1110*d*-1 and 1110*d*-2 may have a conductive pattern on one side thereof.

The first dipole antenna 1110-1 may include a ground arm pattern SP1, SP3 connected to the first ground pattern GND1, and a signal arm pattern SP2, SP4 connected to the first feeding line 1120-1. Likewise, the second dipole antenna 1110-2 may include a ground arm pattern connected to the second ground pattern GND2, and a signal arm pattern connected to the second feeding line 1120-2.

In this regard, the ground arm patterns and the signal arm patterns of the first and second dipole antennas 1110-1 and 1110-2 may be implemented as first and second sub arms, respectively. Specifically, the ground arm pattern and the signal arm pattern of each of the first and second dipole antennas 1110-1 and 1110-2 may include a first sub arm 1111 and a second sub arm 1112. The first sub arm 1111 may be configured as the first metal pattern 1111 formed on a surface of the dielectric substrate in the first axial direction. The second sub arm 1112 may be configured as the second metal pattern 1112 formed on a surface of the dielectric substrate in the second axial direction different from the first axial direction.

The transceiver circuit 1250 may be electrically connected to the antenna module 1100 to apply the first signal and the second signal to the dipole antenna 1110 and the slot antenna 1110*b* through the first feeding unit 1120 and the second feeding unit 1120*b*. The transceiver circuit 1250 may be referred to as a radio frequency integrated chip (RFIC) 1250.

The dipole antenna 1110 and the slot antenna 1110*b* may be disposed on an antenna region 151*a* formed in a side surface of the display 151, to be implemented as a display antenna. Specifically, the first and second dipole antennas 1110-1 and 1110-2 and the slot antenna 1110*b* may be disposed on the antenna region 151*a* defined inside the display 151 which has a multi-layered structure. The display antenna may be implemented as a metal mesh structure. As one example, a line width of the metal mesh line may be about 2 mm, but is not limited thereto.

Similarly to the structure that the dipole antenna 1110 and the slot antenna 1110*b* are disposed in the alternating manner, the first feeding unit 1120 and the second feeding unit 1120*b* may be disposed in an alternating manner. A region where the first feeding unit 1120 and the second feeding unit 1120*b* are disposed may include a transition region 1021 and a signal line region 1022. The transition region 1021 may be a transition region between the feeding unit and the antenna region. The transition region 1021 may be configured as a MS-to-CPW transition for transitioning a microstrip line structure into a coplanar waveguide structure, and may be implemented through ACF bonding. The signal line region 1022 may be configured in a microstrip line structure but is not limited thereto, and may alternatively be configured in a strip line or CPW structure. The transition region 1021 and the signal line region 1022 may be formed on a flexible printed circuit board (FPCB) 1020.

The transition region 1021 may be formed in a coplanar structure in which a ground region is disposed between the feeding line 1121 of the first feeding unit 1120 and the feeding line 1121*b* of the second feeding unit 1120*b*. Accordingly, the feeding line 1121 of the first feeding unit 1120 and the feeding line 1121*b* of the second feeding unit 1120*b* may be referred to as a CPW feeding unit 1121. The transition region 1021 may be configured to perform impedance matching between the antenna 1110, 1110*b* and the feeding line 1121, 1121*b*.

The signal line region 1022 may be configured such that the feeding line 1122 of the first feeding unit 1120 and the feeding line 1122*b* of the second feeding unit 1120*b* are disposed by a predetermined length in the first axial direction. The feeding lines 1122 and 1122*b* disposed on the signal line region 1022 may be formed on the FPCB.

The slot antenna 1110*b* operating as a vertically polarized antenna may be disposed between the dipole antennas 1110 operating as horizontally polarized antennas, to maintain a predetermined interference level or less while reducing a disposition space.

In this regard, the dipole antennas 1110 may be spaced apart from each other by a predetermined distance in the second axial direction. The dipole antennas 1110 may include a first dipole antenna 1110-1 and a second dipole antenna 1110-2 that operate as the horizontally polarized antennas. In other words, the first dipole antenna 1110-1 and the second dipole antenna 1110-2 may be spaced apart from each other by the predetermined distance in the second axial direction, to operate as the horizontally polarized antennas in the second axial direction.

The ground pattern 1111*b* and the slot region 1112*b* of the slot antenna 1110*b* may be disposed in a region between the first dipole antenna 1110-1 and the second dipole antenna 1110-2. The slot antenna 1110*b* may operate as a vertically polarized antenna to correspond to a direction that a signal is applied from the second feeding unit 1120*b*. In other words, the slot region 1112*b* may be formed in the first axial direction and the slot antenna 1110*b* may operate as the vertically polarized antenna in the first axial direction.

The ground pattern 1111*b* of the slot antenna 1110*b* may be configured by a plurality of regions. As one example, the ground pattern 1111*b* may include a first region R1 to a fifth region R5. The first region R1 may be defined from one end portion of the ground pattern 1111*b* to one end portion of the slot region 1112*b*. The second region R2 may be defined from one end portion of the first region R1 to an end portion of the second metal pattern 1112-1 of the first dipole antenna 1110-1. The third region R3 may be defined from an end portion of the second metal pattern 1112-1 of the first dipole antenna 1110-1 to an end portion of the second metal pattern 1112-2 of the second dipole antenna 1110-2. The fourth region R4 may be defined from an end portion of the second metal pattern 1112-2 of the second dipole antenna 1110-2 to another end portion of the slot region 1112*b*. The fifth region R5 may be defined from another end portion of the slot region 1112*b* to another end portion of the ground pattern 1111*b*.

Accordingly, the first region R1 and the fifth region R5 may be defined as regions where the first dipole antenna 1110-1 and the second dipole antenna 1110-2 are disposed, respectively. The second region R2 and the fourth region R4 may be defined as regions where the first dipole antenna 1110-1 and the second dipole antenna 1110-2 are disposed to overlap the slot region 1112*b* on the second axis. On the other hand, the third region R3 may be defined as a slot region that does not overlap the first dipole antenna 1110-1 and the second dipole antenna 1110-2.

Therefore, the second metal pattern 1112-1 of the first dipole antenna 1110-1 may overlap the slot region 1112*b* in parallel by a predetermined length in the second axial direction within the second region R2. Also, the second metal pattern 1112-2 of the second dipole antenna 1110-2 may overlap the slot region 1112*b* in parallel by a predetermined length in the second axial direction within the fourth region R4.

On the other hand, the slot region 1112*b* may be spaced apart from the first and second dipole antennas 1110-1 and 1110-2 by a preset distance on the first axis, to secure isolation between antennas. Therefore, the slot region 1112*b* may be spaced apart from the second metal pattern 1112-1 of the first dipole antenna 1110-1 by a preset distance or more in the first axial direction in the second region R2. Also, the slot region 1112*b* may be spaced apart from the second metal pattern 1112-2 of the second dipole antenna 1110-2 by a preset distance or more in the first axial direction in the fourth region R4. Accordingly, the slot region 1112*b* may be configured such that a first interference level with the first dipole antenna 1110-1 and a second interference level with the second dipole antenna 1110-2 are less than a threshold level. To this end, the slot region 1112*b* having predetermined length and width may be spaced apart from the first and second dipole antennas 1110-1 and 1110-2 by the preset distances.

Each sub pattern of the dipole antenna 1110 disclosed in the present disclosure may be connected to a signal line and a ground. In this regard, the first metal pattern 1111 of the dipole antenna 1110 may include a first sub pattern SP1 and a second sub pattern SP2 that are spaced apart from each other by a predetermined distance and disposed in parallel in the first axial direction. On the other hand, the second metal pattern 1112 of the dipole antenna 1110 may include a third sub pattern SP3 and a fourth sub pattern SP4 that extend from end portions of the first sub pattern SP1 and the second sub pattern SP2 in different directions on the second axis.

One of the first sub pattern SP1 and the second sub pattern SP2 of the first metal pattern 1111 may be connected to a metal pattern corresponding to a signal line and another one may be connected to a via pattern. One of the first sub pattern SP1 and the second sub pattern SP2 of the first metal pattern 1111 may be connected to a metal pattern 1121 having a different width in the transition region 1021. As one example, the metal pattern 1121 having the different width in the transition region 1021 may correspond to the feeding line 1121. Accordingly, impedance matching may be performed between the antenna region 151*a* and the signal line region 1022. On the other hand, another one of the first sub pattern SP1 and the second sub pattern SP2 of the first metal pattern 1111 may be connected to a lower ground through a via pattern 1121*v*, to operate as a ground.

Meanwhile, the alternating arrayed dual polarization antenna structure disclosed in the present disclosure may be configured as an array antenna. In this regard, the number of antenna elements of the alternating arrayed dual polarization antenna may be two or more, namely, any one of two to eight. Referring to FIGS. 5A, 5B, 6B, 7, and 8, the antenna module 1100 may include a dipole antenna 1110 and a slot antenna 1120. The antenna module 1100 may include a first array antenna 1100-1 and a second array antenna 1100-2.

The dipole antenna 1110 may be configured as the first array antenna 1100-1. The first array antenna 1100-1 may include a first dipole antenna 1110-1 and a second dipole antenna 1110-2 that are spaced apart from each other by a predetermined distance in the second axial direction. The first array antenna 1100-1 may further include a third dipole antenna 1110-1 and a fourth dipole antenna 1110-4 that are spaced apart from each other by a predetermined distance in the second axial direction.

The slot antenna 1110*b* may be configured as the second array antenna 1100-2. The second array antenna 1100-2 may include a first slot antenna 1110*b*-1 and a second slot antenna 1110*b*-2 that are spaced apart from each other by a predetermined distance in the second axial direction. Referring to FIG. 7, a third slot antenna 1110*b*-3 disposed at one side of the second slot antenna 1110*b*-2 may be configured as a dummy slot antenna. The second array antenna 1100-2 may further include the third slot antenna 1110*b*-3 and a fourth slot antenna 1110*b*-4 that are spaced apart from each other by a predetermined distance in the second axial direction. Referring to FIG. 8, a fifth slot antenna 1110*b*-5 disposed at one side of the fourth slot antenna 1110*b*-4 may be configured as a dummy slot antenna.

The first slot antenna 1110*b*-1 may be disposed in a region at one side of the first dipole antenna 1110-1. The second slot antenna 1110*b*-2 may be disposed between the first dipole antenna 1110-1 and the second dipole antenna 1110-2. The third slot antenna 1110*b*-3 may be disposed between the second dipole antenna 1110-2 and the third dipole antenna 1110-3. The fourth slot antenna 1110*b*-4 may be disposed between the third dipole antenna 1110-3 and the fourth dipole antenna 1110-4.

Meanwhile, the alternating array antenna structure according to the present disclosure may use a dummy radiator for improving symmetry and transparency. The slot antenna 1110*b* may further include a fifth slot antenna 1110*b*-5 for maintaining performance of the fourth dipole antenna 1110-4. The fifth slot antenna 1110*b*-5 may be disposed in a region at another side of the fourth dipole antenna 1100-4 such that the performance of the fourth dipole antenna 1100-4 coincides with the performances of the first to third dipole antennas 1100-1 to 1100-3.

The feeding line of the second feeding unit **1120*b* that is electrically connected to the ground pattern through the inside of the ground pattern of the fifth slot antenna 1110*b*-5 may not be electrically connected to the transceiver circuit 1250. In this regard, the feeding line of the second feeding unit 1120*b* may be connected to the ground of the FPCB 1020 through a resistor element. In this case, a resistance value of the resistor element may be set to 50 ohm to be the same as characteristic impedance of the feeding line of the second feeding unit 1120*b***, but is not limited thereto.

On the other hand, the display antenna according to the present disclosure may include the dummy pattern 1130 disposed between the dipole antenna 1110 and the ground pattern **1111*b* forming the slot antenna 1110*b***, to improve transparency.

The dummy pattern 1130 may include a first dummy pattern 1131 and a second dummy pattern 1132. The first dummy pattern 1131 may be disposed in an upper region of the ground pattern **1111*b* of the slot antenna and a lower region of the second metal pattern 1112. The second dummy pattern 1132 may be coupled to the first dummy pattern 1131. The second dummy pattern 1132 may be disposed between the second metal patterns 1112 of the first dipole antenna 1110-1 and the second dipole antenna 1110-2**.

In this regard, the antenna element 1110, **1110*b* and the feeding unit 1120, 1120*b* may be configured in a metal mesh structure in which they are connected to transmit signals each other. On the other hand, the dummy pattern 1130 may be formed in an open mesh structure in which a signal transmission is not allowed and a connection is not made to improve visibility and transparency. For example, the first and second metal patterns 1111 and 1112 of the dipole antenna 1110 and the ground pattern 1111*b* of the slot antenna may be formed in a closed mesh structure in which metal mesh patterns formed in different axial directions are connected. On the other hand, the dummy pattern 1130 may be formed in an open mesh structure in which metal mesh patterns formed in different axial directions are disconnected at a connection point. Therefore, transparency of the antenna region 151*a* inside the display 151** can be improved.

The metal pattern and the via pattern connection structure may be alternately formed differently, to improve isolation and radiation pattern symmetry. For an 1×4 array antenna structure, as an example, the first sub patterns **1111*a* of the first dipole antenna 1110-1 and the third dipole antenna 1110-3 may be connected to a lower ground. That is, the first sub pattern SP1 may be connected to the lower ground through the via pattern, to operate as a ground. In this instance, the second sub patterns SP2 of the second dipole antenna 1110-2 and the fourth dipole antenna 1110-4 may be connected to the lower ground through the via patterns, to operate as a ground. Accordingly, an interference level between adjacent dipole antennas of the first to fourth dipole antennas 1110-1 to 1110-4 can be reduced. Also, an interference level between adjacent slot antennas of the first to fourth slot antennas 1110*b*-1 to 1110*b*-4** can be reduced.

Meanwhile, the alternating array antenna structure according to the present disclosure may use a dummy radiator for improving transparency. The dummy radiator may be configured as a dummy dipole, similarly to other dipole antennas. The dummy dipole may be disposed only in one side region or another side region of the slot antenna, differently from other dipole antennas. As one example, a dummy radiator may be disposed in one side region of the outermost of an array antenna. A dummy radiator **1110*d*-1 may be disposed in one side region of the first slot antenna 1110*b*-1. As another example, a dummy radiator may be disposed in another side region of the outermost of the array antenna. The dummy radiator 1110*d*-1 may be disposed in another side region of the fourth slot antenna 1110*b*-4**.

The dipole antenna 1110 may further include a dummy radiator **1110*d*-1, 1110*d*-2 configured as the first metal pattern 1111 or the second metal pattern 1112 in the one side region of the first slot antenna 1110*b*-1 or the another side region of the fourth slot antenna 1110*b*-4**.

On the other hand, the first to fourth dipole antennas 1110-1 to 1110-4 include the second metal pattern 1112 extending from the first metal pattern 1111 in a different direction on the second axis. On the other hand, the dummy radiator **1110*d*-1, 1110*d*-2 may be electrically connected to the lower ground through the via pattern 1121*v* on the first metal pattern 1111 or the second metal pattern 1112**.

The first to fourth dipole antennas 1110-1 to 1110-4 may be disposed in a specific region within the antenna module 1100. On the other hand, the first to fourth slot antennas **1110*b*-1 to 1110*b*-4 may also be disposed at a different region within the antenna module 1100. In this regard, the number of dipole antennas and slot antennas is not limited to four (4), but may be changed to 2, 3, 5, 6, 7, 8, etc. depending on applications. As illustrated in FIG. 6B, when the first to fourth dipole antennas 1110-1 to 1110-4 and the first to fourth slot antennas 1110*b*-1 to 1110*b*-4 are disposed within one antenna module 1100**, an area occupied by the antenna module is minimized.

The antenna module 1100 may include the dipole antenna 1110 and the slot antenna 1120. In this regard, the antenna module 1100 may include a first array antenna 1100-1 and a second array antenna 1100-2.

In relation to the aforementioned structure, the antenna module 1100 according to the present disclosure may secure orthogonal polarization characteristics by alternately disposing horizontally polarized antennas and vertically polarized antennas to implement a dual-polarized array antenna. As one example, the horizontally polarized antenna and the vertically polarized antenna may be implemented as the dipole antenna 1110 and the slot antenna 1120, but they are not limited thereto.

To alternately dispose antennas, miniaturization and isolation improvement should be considered to suppress those antennas from overlapping each other. To this end, a dummy element and a dummy port may be configured such that active element patterns of the dipole antenna 1110 and the slot antenna 1120 have symmetry. Accordingly, the active element patterns can maintain symmetry by adjusting interference between adjacent elements, and antenna characteristics of the radiation patterns of the active elements can be maintained at an equivalent level. On the other hand, an open dummy structure may be additionally disposed to improve optical visibility upon disposing antennas alternately.

On the other hand, a radiation pattern is formed in a forward (front) direction of the electronic device through the antenna module 1100 configured as the alternating arrayed dual polarization antenna according to the present disclosure. Accordingly, a signal can be radiated to the front surface of the display in the electronic device such as an image display device, so as to allow communication with other electronic devices disposed on the front surface of the electronic device.

Figure 9A:
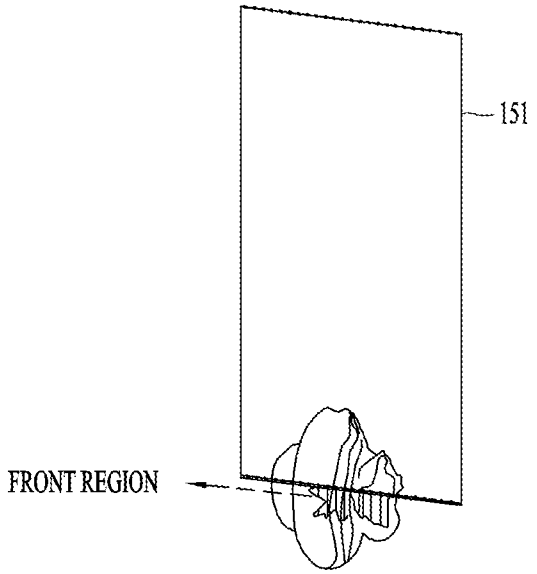
FIG. 9A illustrates a state in which a first radiation pattern of a 4×1 array antenna configured as a horizontally polarized antenna is formed on a front surface of a display. On the other hand.
Figure 9B:
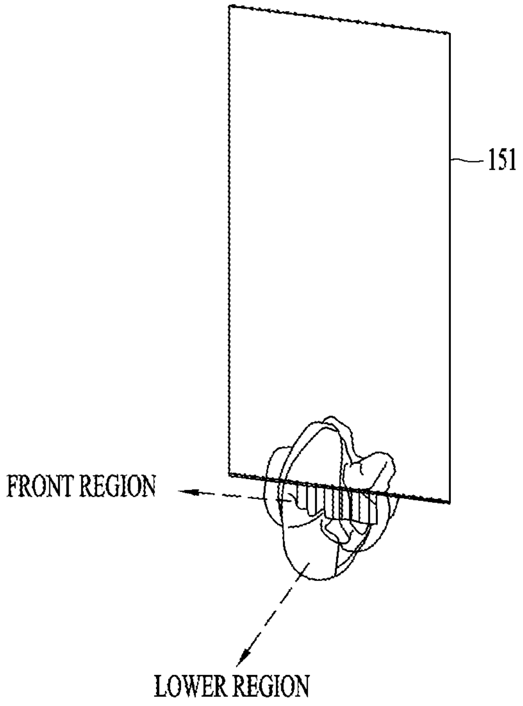
FIG. 9B illustrates a state in which a second radiation pattern of a 4×1 array antenna configured as a vertically polarized antenna is formed on the front surface of the display.

In this regard, FIG. 9A illustrates a state in which a first radiation pattern of a 4×1 array antenna configured as a horizontally polarized antenna is formed in a front direction of a display. On the other hand, FIG. 9B illustrates a state in which a second radiation pattern of a 4×1 array antenna configured as a vertically polarized antenna is formed in a front direction of the display. First and second radiation patterns of FIGS. 9A and 9B are radiation patterns formed by the first array antenna 1100-1 and the second array antenna 1100-2 of FIG. 8. The first array antenna 1100-1 and the second array antenna 1100-2 may be a slot array antenna and a dipole array antenna operating as a horizontally polarized antenna and a vertically polarized antenna, respectively.

Referring to FIGS. 9A and 9B, a main radiation region of the radiation pattern is formed in a front region of the display 151. Here, the main radiation region of the radiation pattern is alternatively formed in a lower region in addition to the front region of the display 151. Accordingly, the electronic device can communicate with other electronic devices that may be disposed in the lower region in addition to the front region.

On the other hand, four antenna elements are disposed in one axial direction as illustrated in FIG. 8, to form a radiation pattern having directivity in the one axial direction as illustrated in FIGS. 9A and 9B. Also, beamforming may be performed to change a beam peak of a radiation pattern in one axial direction by varying a phase difference of signals applied to four antenna elements.

Hereinafter, a reflection coefficient characteristic and an isolation characteristic of the alternating arrayed dual polarization antenna according to the present disclosure will be described. In this regard, FIGS. 10A and 10B illustrate reflection coefficient characteristic and isolation characteristic of first to fourth dipole antennas configuring a first array antenna.

Figure 10A:
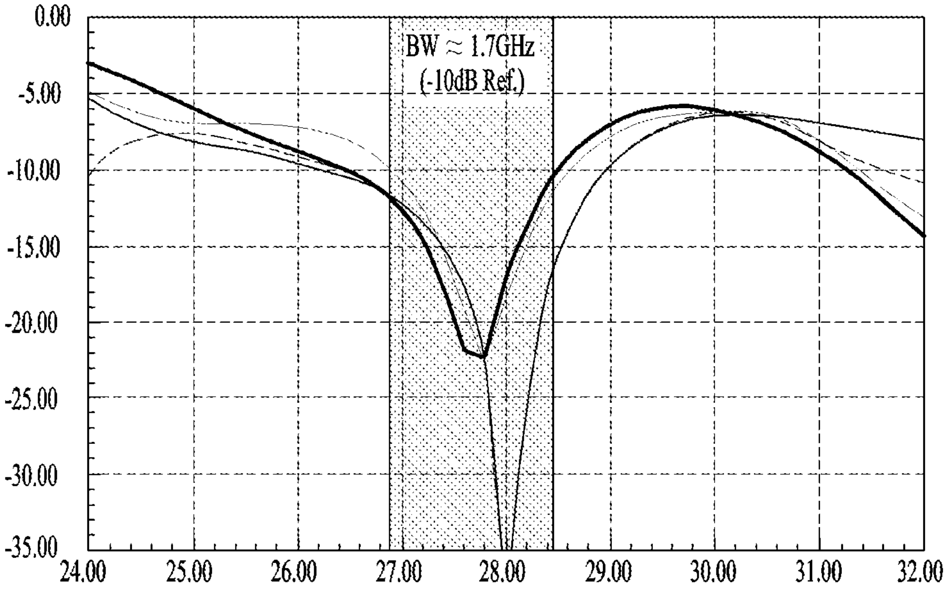
FIGS. 10A and 10*b* illustrate reflection coefficient characteristic and isolation characteristic of first to fourth dipole antennas configuring a first array antenna.
Figure 10A:
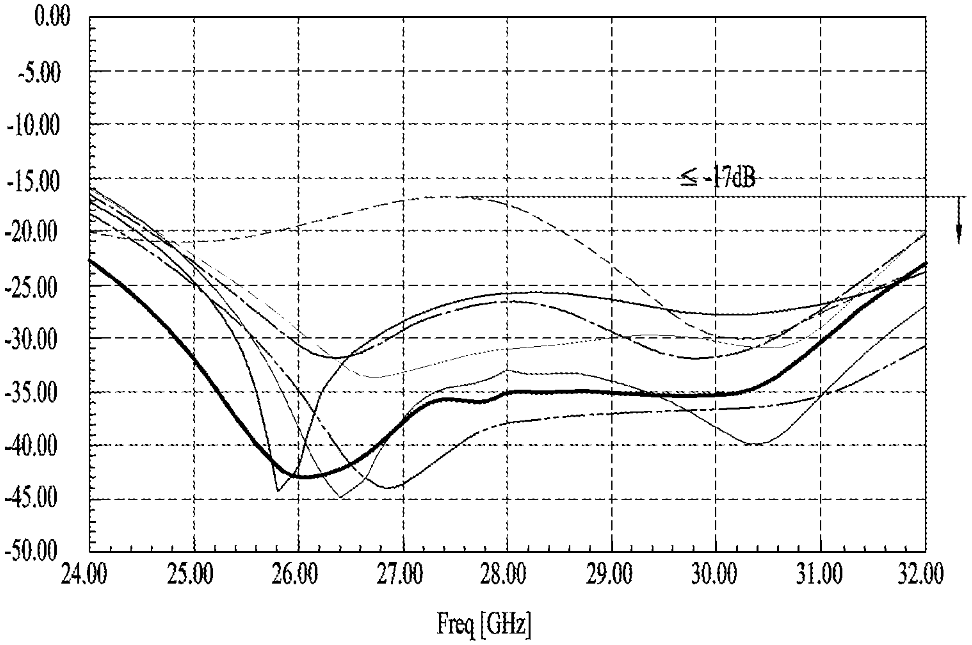

Referring to FIG. 8 and (a) of FIG. 10A, the reflection coefficient bandwidth characteristic of the first to fourth dipole antennas 1110-1 to 1110-4 configuring the first array antenna is about 1.7 GHz at a band of 28 GHz. Specifically, the reflection coefficient bandwidth characteristic of the first to fourth dipole antennas 1110-1 to 1110-4 is about 1.7 GHz at the band of 28 GHz based on a reflection coefficient of 10 dB.

Figure 10B:
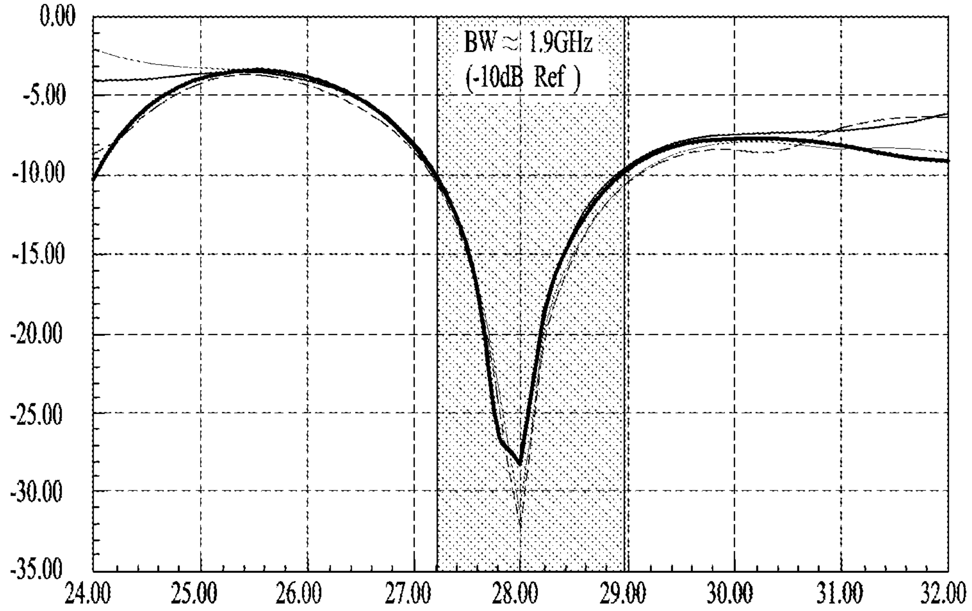
Figure 10B:
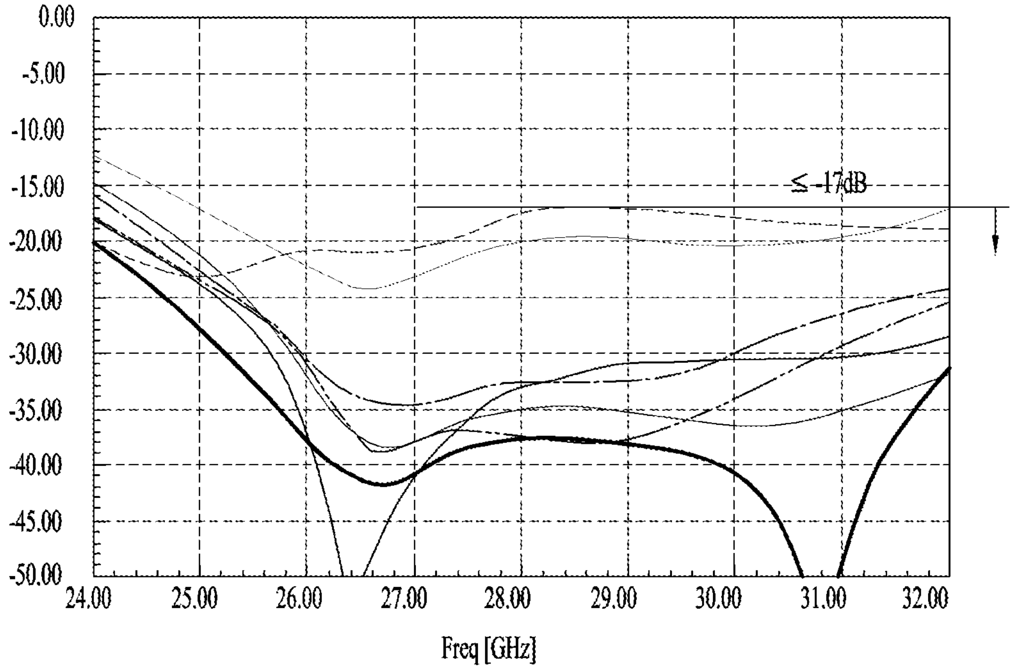

On the other hand, referring to (a) of FIG. 10B, the reflection coefficient bandwidth characteristic of the first to fourth slot antennas **1110*b*-1 to 1110*b*-4 configuring the second array antenna is about 1.9 GHz at a band of 28 GHz. Specifically, the reflection coefficient bandwidth characteristic of the first to fourth slot antennas 1110*b*-1 to 1110*b*-4** is about 1.9 GHz in the band of 28 GHz based on a reflection coefficient of 10 dB.

Referring to FIG. 8 and (b) of FIG. 10A, an isolation value between the first to fourth dipole antennas 1110-1 to 1110-4 is −17 dB or less. Therefore, an interference level between the first to fourth dipole antennas 1110-1 to 1110-4 is maintained to be a threshold level or less. Accordingly, the first to fourth dipole antennas 1110-1 to 1110-4 can operate without interference.

Referring to FIG. 8 and (b) of FIG. 10B, an isolation value between the first to fourth slot antennas **1110*b*-1 to 1110*b*-4 is −17 dB or less. Therefore, an interference level between the first to fourth slot antennas 1110*b*-1 to 1110*b*-4 is maintained to be a threshold level or less. Accordingly, the first to fourth slot antennas 1110*b*-1 to 1110*b*-4** can operate without interference.

In short, when the array antenna having the alternating arrayed dual polarization structure operates in a horizontal polarization mode and a vertical polarization mode, horizontally and vertically polarized antennas have directivity toward the front surface of the display and superior reflection coefficient characteristic at an operating frequency. Meanwhile, a maximum transfer coefficient (isolation) between antennas within an operating frequency is −17 dB, which causes less interference. Also, antenna elements can maintain independent radiation characteristics in spite of a spacing of about λ0/4 between adjacent antenna elements.

Meanwhile, referring to the alternating arrayed dual polarization antenna structure according to the present disclosure, the antenna characteristic may vary depending on a spacing between dipole antennas and slot antennas and whether or not a dummy pattern is disposed in the spacing. In this regard, FIGS. 11A to 11C illustrate first to third antenna structures in a case where a spacing between a dipole antenna and a slot antenna changes and according to whether a dummy pattern is disposed.

Figure 11A:
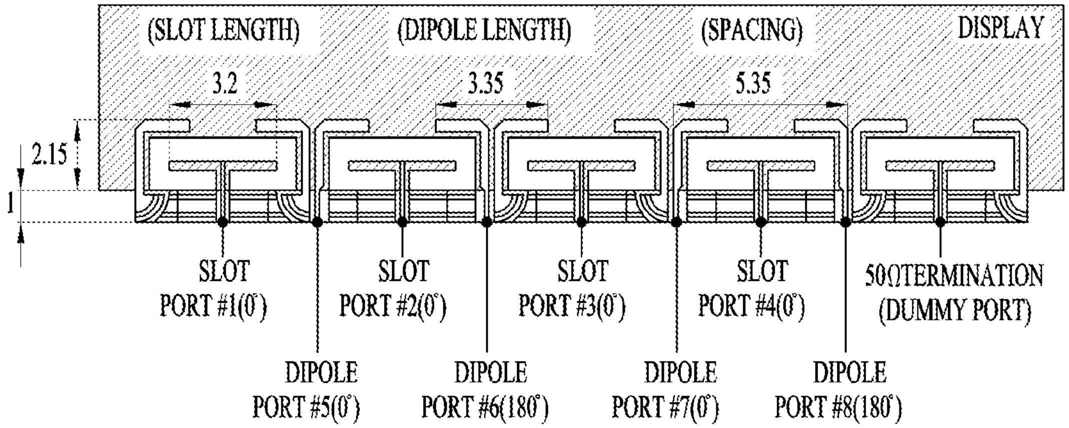
FIGS. 11A to 11C illustrate first to third antenna structures in a case where a spacing between a dipole antenna and a slot antenna changes and according to whether a dummy pattern is disposed.

Referring to FIGS. 7, 8, and 11A, a first antenna structure in which a length of the first metal pattern 1111 of the dipole antenna 1110 is 2.15 mm, and the dipole antenna 1110 and the slot antenna 1120 are disposed adjacent to each other at a first spacing is illustrated.

Figure 11B:
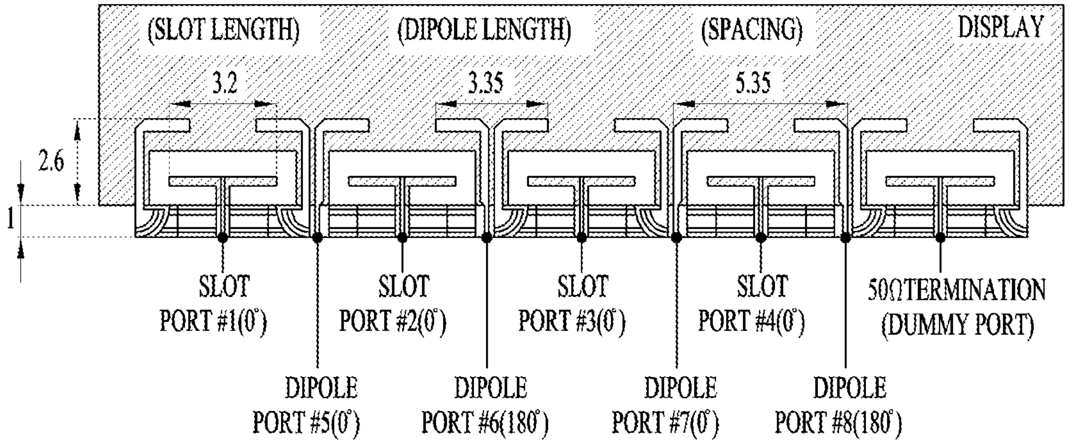

Referring to FIGS. 7, 8, and 11B, a second antenna structure in which a length of the first metal pattern 1111 of the dipole antenna 1110 is 2.6 mm, and the dipole antenna 1110 and the slot antenna 1120 are disposed to each other at a second spacing is illustrated. The second spacing of the second antenna structure may be set to a value greater than the first spacing of the first antenna structure. As one example, the second spacing may be set to a value greater than the first spacing by a length difference between the first metal patterns, for example, 0.45 mm.

Figure 11C:
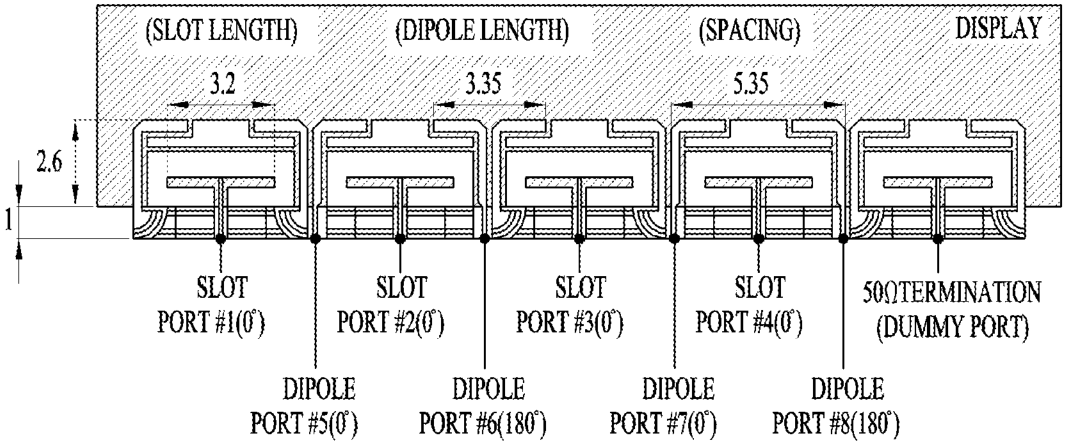

Referring to FIGS. 7, 8, and 11C, the dummy pattern 1130 may be disposed in a region between the dipole antenna 1110 and the slot antenna 1120. The dummy pattern 1130 may be disposed between the dipole antenna 1110 and the ground pattern **1111*b* forming the slot antenna 1110*b***, to improve transparency and visibility.

The dummy pattern 1130 may include a first dummy pattern 1131 and a second dummy pattern 1132. The first dummy pattern 1131 may be disposed in an upper region of the ground pattern **1111*b* of the slot antenna and a lower region of the second metal pattern 1112. The second dummy pattern 1132 may be coupled to the first dummy pattern 1131. The second dummy pattern 1132 may be disposed between the second metal patterns 1112 of the first dipole antenna 1110-1 and the second dipole antenna 1110-2**

Figure 12A:
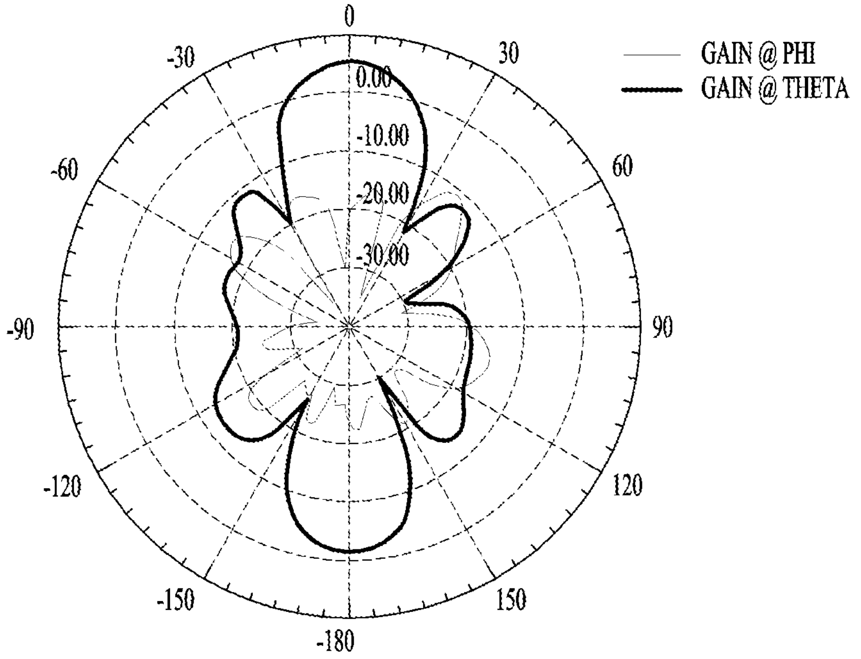
FIGS. 12A to 12C compare radiation patterns of a slot array antenna and a dipole array antenna in the first to third antenna structures. Also, FIGS. 13A to 13C compare reflection coefficients of the slot array antenna and the dipole array antenna in the first to third antenna structures.
Figure 12A:
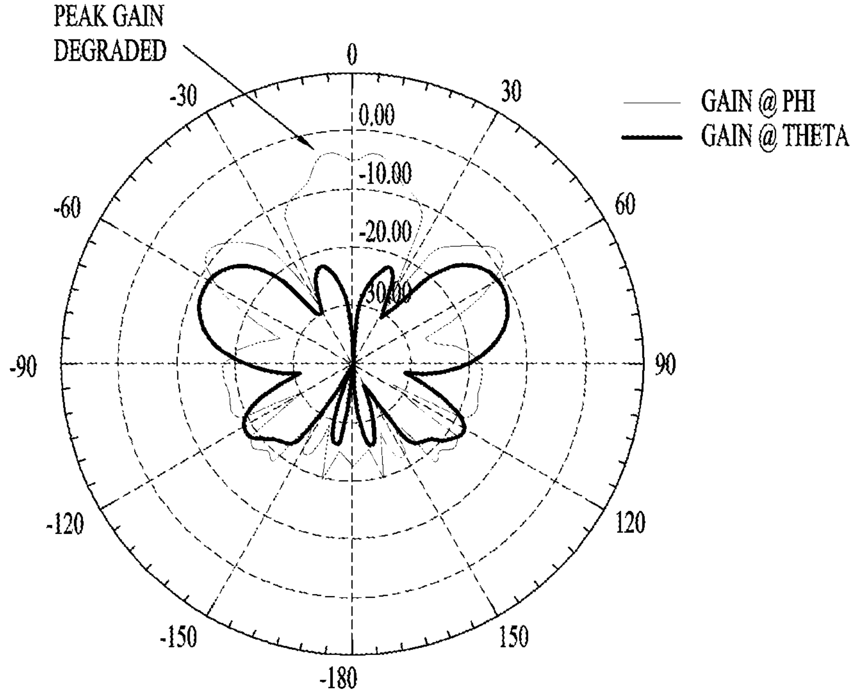
Figure 12B:
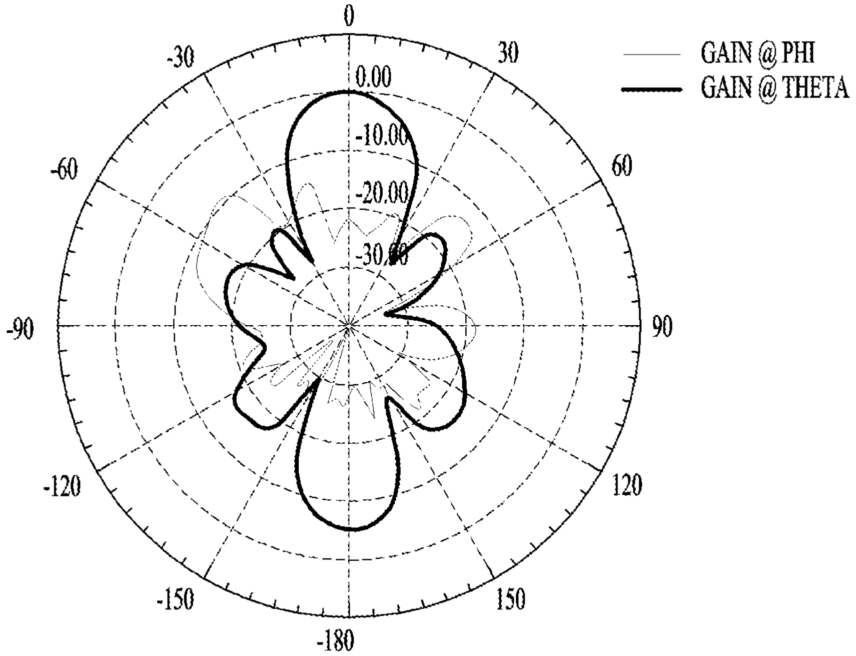
Figure 12B:
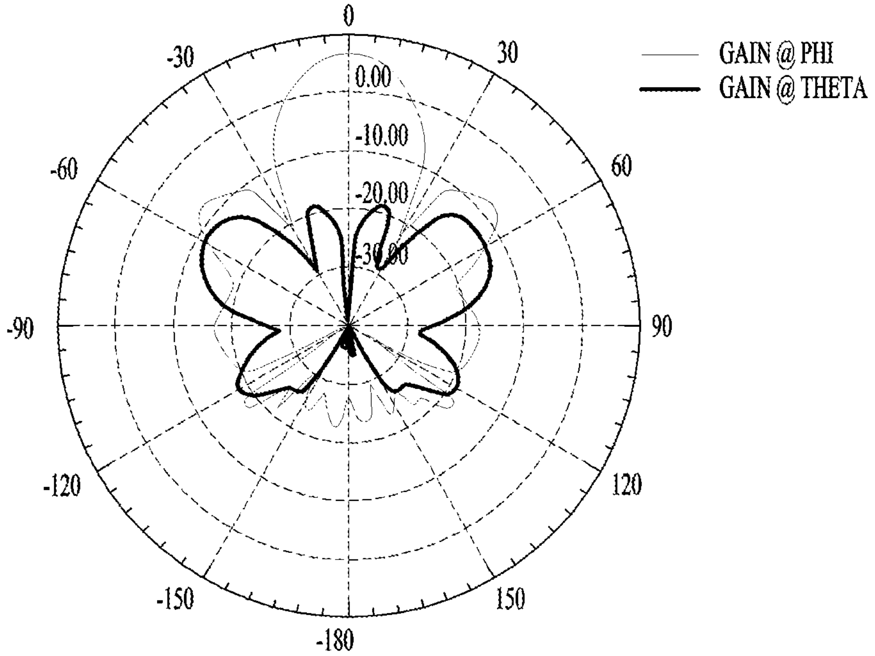
Figure 12C:
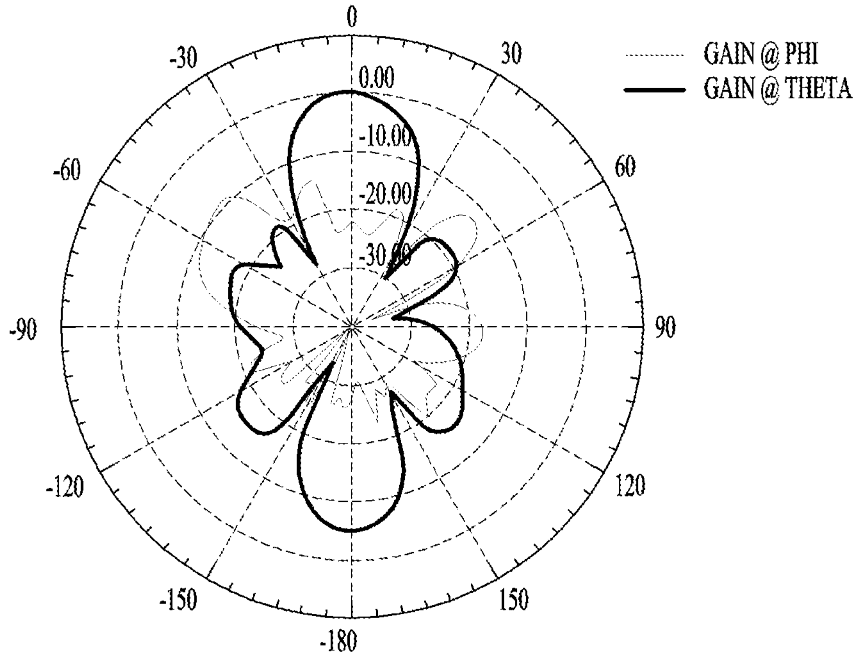
Figure 12C:
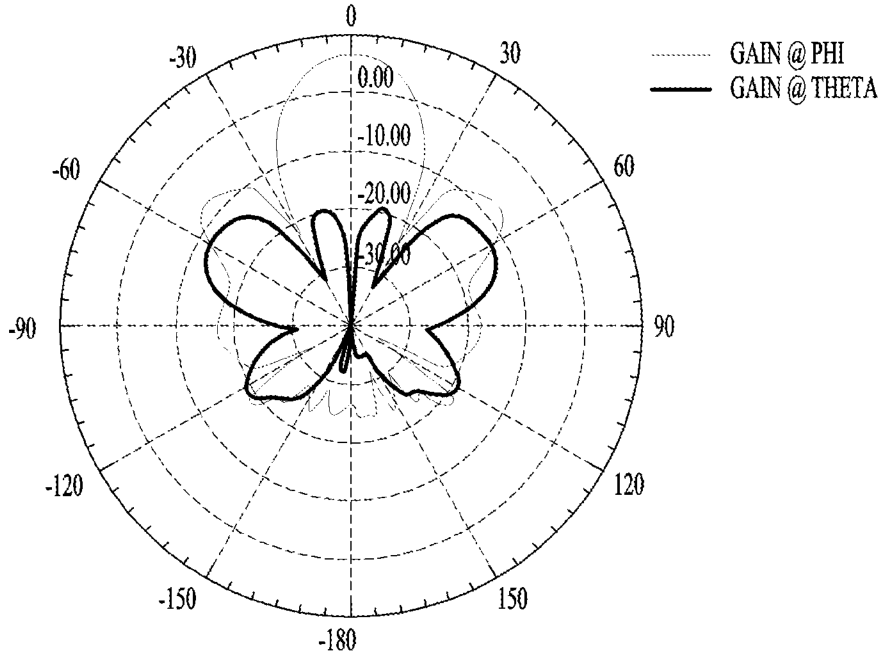

On the other hand, FIGS. 12A to 12C compare radiation patterns of a slot array antenna and a dipole array antenna in the first to third antenna structures. Also, FIG. 13 compares reflection coefficients of the slot array antenna and the dipole array antenna in the first to third antenna structures.

(a) of FIG. 12A to (a) of FIG. 12C illustrate a main radiation pattern and an orthogonal radiation pattern of a 4×1 slot array antenna for each of first to third antenna structures. Since the slot array antenna operates as a vertically polarized antenna, the main radiation pattern is formed in the first axial direction, namely, in a vertical axial direction. On the other hand, (b) of FIG. 12A to (b) of FIG. 12C illustrate a main radiation pattern and an orthogonal radiation pattern of a 4×1 dipole array antenna for each of first to third antenna structures. Since the dipole array antenna operates as a horizontally polarized antenna, the main radiation pattern is formed in the second axial direction, namely, in a horizontal axial direction.

Figure 13A:
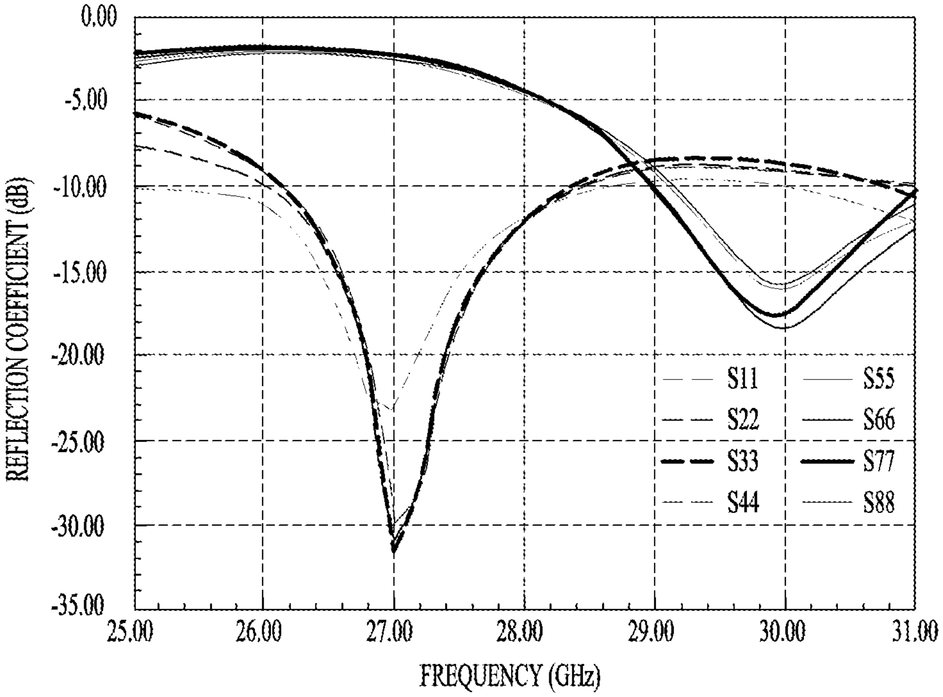
Figure 13B:
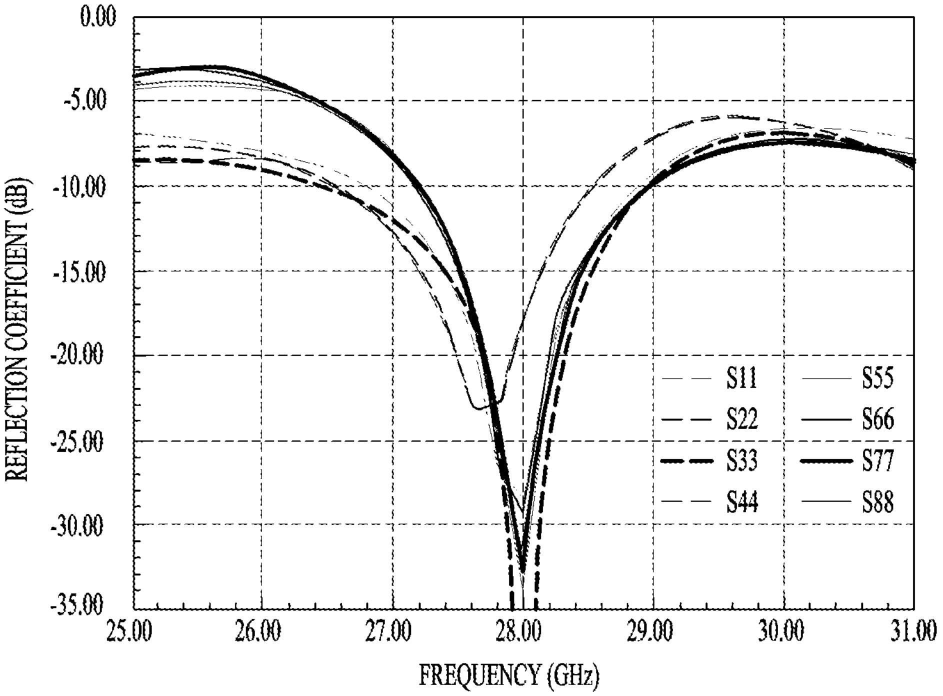
Figure 13C:
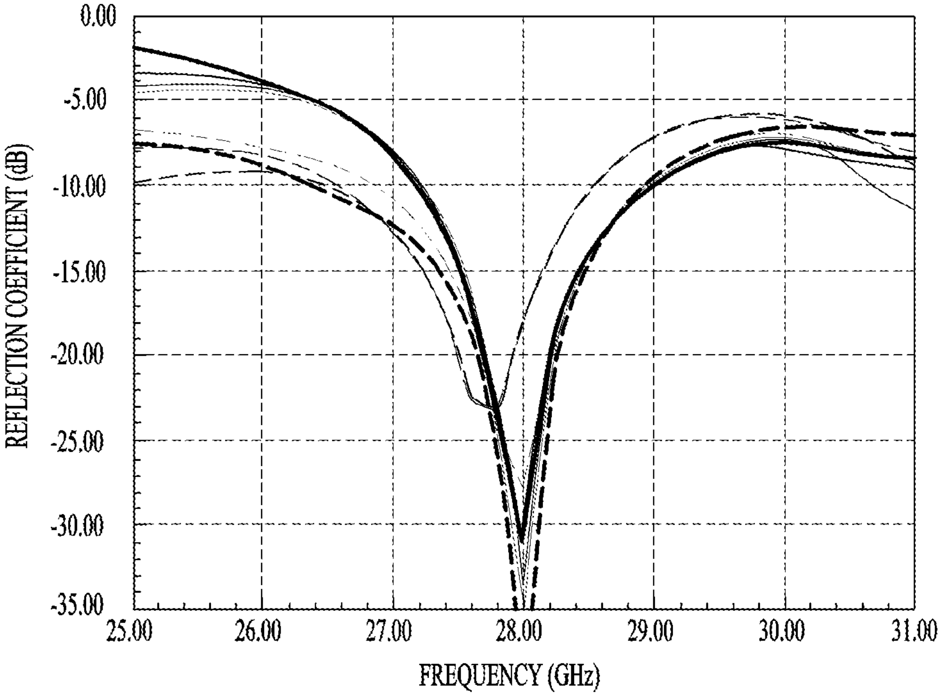

On the other hand, FIGS. 13A to 13C illustrate a reflection coefficient characteristic for each of the first to third antenna structures. In FIGS. 13A to 13C, S11 to S44 indicate a reflection coefficient characteristic of the slot array antenna, and S55 to S88 indicate a reflection coefficient characteristic of the dipole array antenna.

In the first antenna structure of FIG. 11A, when the slot antenna and the dipole antenna having orthogonal polarization characteristics are disposed adjacent to each other ($S \approx \lambda 0/4$), a coupling effect may occur to cause a shift of an operating frequency of each antenna element. Also, a radiation characteristic and a reflection coefficient characteristic of each antenna element may be distorted.

In the first antenna structure of FIG. 11A, a spacing between the slot antenna and the dipole antenna can be minimized, so as to minimize an antenna disposition region within the display. However, due to the coupling effect between the slot antenna and the dipole antenna, a peak gain of the dipole array antenna may be lowered as shown in (b) of FIG. 12A. In this regard, the peak gain of the slot array antenna of (a) of FIG. 12A is not lowered. With this regard, the characteristic of the slot antenna is decided by the ground pattern surrounding the slot region of the slot antenna. This is because a degree that the dipole antenna is adjacently disposed does not affect the characteristic of the slot antenna. On the other hand, the characteristic of the dipole array antenna is affected by a degree that the ground pattern is adjacently disposed.

On the other hand, referring to FIG. 13A, since the slot antenna and the dipole antenna are located at a short distance therebetween, coupling of a threshold level or more may occur, which may cause a shift of an operating frequency and a distortion of a reflection coefficient characteristic. In this regard, it can be seen that the operating frequency of the slot array antenna indicated by S11 to S44 is shifted from 28 GHz to a lower band by about 1 GHz. Referring to (a) of FIG. 12A, the peak gain of the radiation pattern of the slot array antenna is not reduced, but referring to FIG. 13A, the shift of the operating frequency occurs. On the other hand, referring to (b) of FIG. 12A, the peak gain of the radiation pattern of the dipole array antenna is reduced and the shift of the operating frequency occurs. It can be seen that the operating frequency of the dipole array antenna indicated by S55 to S88 is shifted from 28 GHz to a higher band by about 2 GHz.

Therefore, to reduce a coupling effect between antenna elements, a spacing between the slot antenna and the dipole antenna may increase as in the second antenna structure of FIG. 11B. Also, to improve optical visibility, the open dummy structure may be added as in the third antenna structure of FIG. 11C.

The second antenna structure of FIG. 11B is configured such that the slot antenna and the dipole antenna having the orthogonal polarization characteristic are disposed at a second spacing greater than the first spacing of FIG. 11A. Accordingly, the coupling effect can be reduced and the shift of the operating frequency of each antenna element and the reduction of the peak gain of the array antenna can be suppressed.

In the second antenna structure of FIG. 11B, as the spacing between the slot antenna and the dipole antenna can be slightly increased from the first spacing to the second spacing, the antenna disposition region within the display can be slightly increased. However, the coupling between the slot antenna and the dipole antenna is reduced. Therefore, the reduction of the peak gain of the dipole array antenna as shown in (b) of FIG. 12A does not occur, referring to (b) of FIG. 12B.

On the other hand, referring to FIG. 13B, since the distance between the slot antenna and the dipole antenna is increased from the first spacing to the second spacing, the coupling is reduced to a threshold level or less. Accordingly, the shift of the operating frequency and the distortion of the reflection coefficient characteristic do not occur. In this regard, the operating frequency of the slot array antenna indicated by S11 to S44 is 28 GHz and the shift of the operating frequency does not occur. In this regard, the operating frequency of the dipole array antenna indicated by S55 to S88 is also 28 GHz and the shift of the operating frequency does not occur.

In the second antenna structure, the interference level between the slot array antenna and the dipole array antenna is lowered to a threshold level or less, and thus the slot array antenna and the dipole array antenna operate normally. In this regard, FIG. 14 compares antenna characteristics in the second antenna structure and the third antenna structure. (a) of FIG. 14 illustrates a peak gain, a vertical/horizontal polarization gain difference, and a beam scan angle of the slot array antenna and the dipole array antenna in the second antenna structure (Type A). (b) of FIG. 14 illustrates a peak gain, a vertical/horizontal polarization gain difference, and a beam scan angle of the slot array antenna and the dipole array antenna in the third antenna structure (Type B).

In relation to (a) and (b) of FIG. 14, the antenna peak gain may include a signal line loss of 10 mm and a signal line transition loss. The vertical/horizontal polarization gain difference is a gain difference between a main beam and a cross beam in FIGS. 12B and 12C, namely, corresponds to a polarization isolation. Referring to FIGS. 12B, 12C, and 14, the vertical/horizontal polarization gain difference, namely, the polarization isolation between the slot array antenna and the dipole array antenna has values of 30 dB and 40 dB or more. The beam scan angle may be set based on a gain reduction of 3 dB with respect to the peak gain. The beam scan angle of 45 degrees or more is set with respect to both of the slot array antenna and the dipole array antenna. This can allow communication with other electronic devices through beamforming at a range of ±45 degrees or more from the front direction of the display to one axial direction.

There is no change in electrical characteristic of antennas in the second and third antenna structures of (a) and (b) of FIG. 14. Therefore, the electrical characteristics of the slot array antenna and the dipole array antenna do not change according to whether the dummy pattern 1130 of FIGS. 8 and 11 is disposed. Therefore, the dummy pattern 1130 having the open dummy structure implemented in the state where the connection point between the metal mesh grids is disconnected does not affect the antenna characteristic and allows improvement of optical transparency and visibility. In this regard, referring to the radiation patterns of FIGS. 12B and 12C, the characteristic change of the slot array antenna and the dipole array antenna does not occur due to whether the dummy pattern is disposed. Referring to the reflection coefficient characteristic of FIGS. 13B and 13C, the characteristic change of the slot array antenna and the dipole array antenna does not occur due to whether the dummy pattern is disposed.

Meanwhile, the alternating arrayed dual polarization antenna structure disclosed in the present disclosure may be configured in an operating bandwidth expansion structure. In this regard, FIG. 15 illustrates an antenna module configured as an alternating arrayed dual polarization antenna with an expanded operating bandwidth according to an embodiment.

Figure 15:
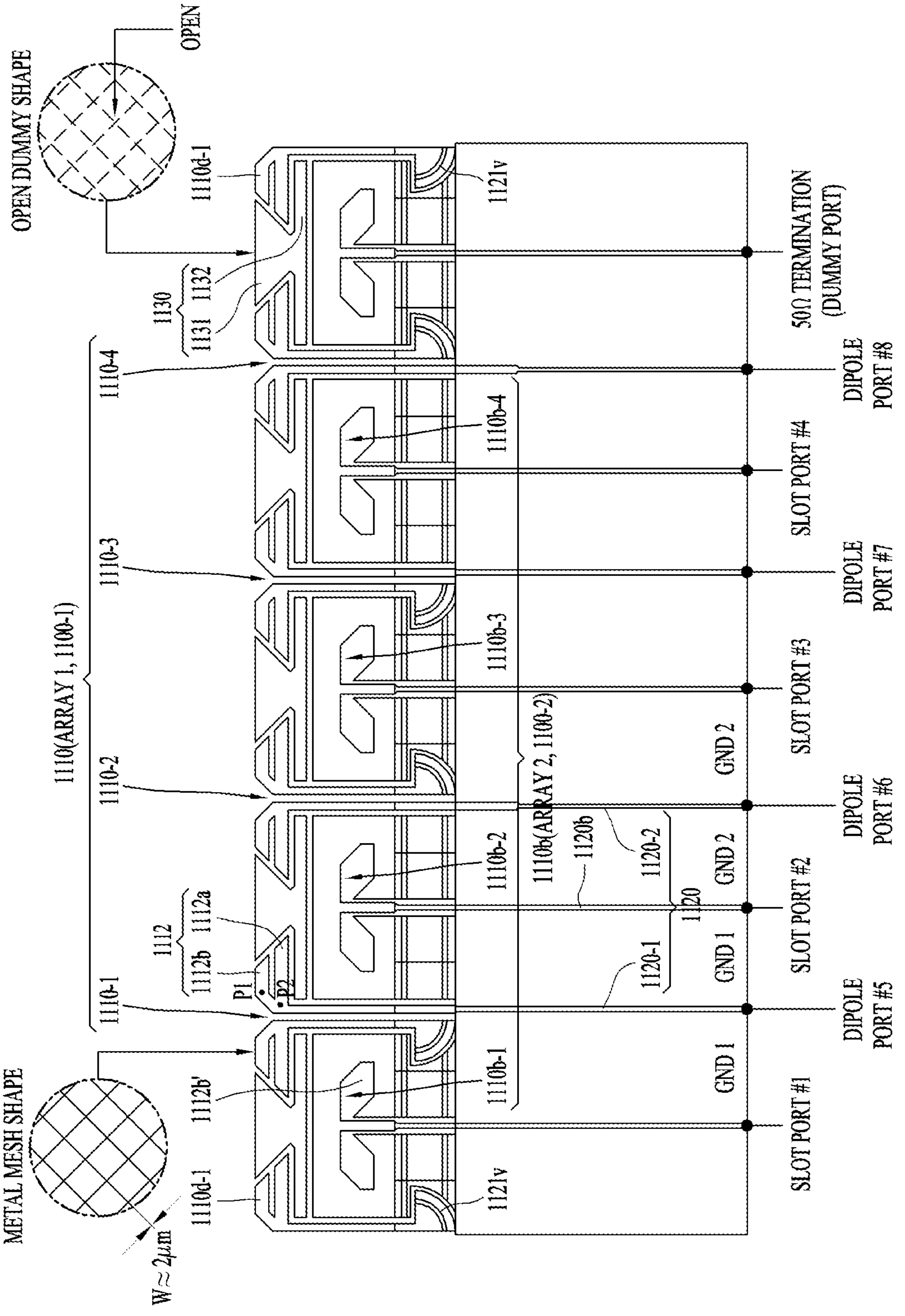
FIG. 15 illustrates an antenna module configured as an alternating arrayed dual polarization antenna with an expanded operating bandwidth according to an embodiment.

Referring to FIGS. 7, 8, and 15, the first and second dipole antennas 1110-1 and 1110-2 may include the first and second metal patterns 1111 and 1112 disposed in the first axial direction and the second axial direction, respectively. Referring to FIG. 15, the second metal pattern 1112 of the dipole antenna 1110 may include a plurality of radiation portions. The second metal pattern 1112 may include a first radiation portion 1112*a* and a second radiation portion 1112*b*. In some embodiments, the second metal pattern 1112 may alternatively include three or more radiation portions.

The first radiation portion 1112*a* and the second radiation portion 1112*b* operate as radiators of the antenna, and thus may be referred to as a first radiator 1112*a* and a second radiator 1112*b*. The first radiation portion 1112*a* may be perpendicularly connected to the first metal pattern 1111 at a first point P1. The second radiation portion 1112*b* may be bent by a predetermined angle from the first point P1 so as to be disposed in parallel to the first radiation portion 1112*a* from a second point P2. The second radiation portion 1112*b* may be disposed in parallel to the first radiation portion 1112*a* from the second point P2 on an upper region of the first radiation portion. Accordingly, by including the first radiation portion 1112*a* and the second radiation portion 1112*b*, the dipole antenna 1110 may operate as a broadband antenna. The second radiation portion 1112*b* may have a length that is shorter than a length of the first radiation portion 1112*a*.

The slot antenna 1110*b* may have a corner region such that a length of a slot varies in a widthwise direction, and thus can operate as a broadband antenna. In this regard, a slot region 1112*b*' of the slot antenna 1110*b* may be configured such that corner regions, facing each other, of rectangular slot regions formed in different directions on the second axis from the end of the second feeding unit are formed in a triangular shape. The slot region 1112*b*' may be configured as a multi-slot region formed based on the corner regions of the triangular shape, such that the slot antenna 1110*b* can operate as a broadband antenna.

In short, an antenna designed on a single layer inside a display can be easily deformed and a bandwidth of an operating frequency can be expanded through a partial deformation of the antenna. To this end, as a design change idea for improving the bandwidth of the operating frequency, a broadband array antenna structure having a plurality of dipole radiators and a slot structure including corners in a triangular shape is proposed.

Specifically, a frequency bandwidth can be expanded through deformation of a slot of a slot antenna having a vertical polarization, namely, a slot structure having corners in a triangular shape. Also, for a dipole antenna having a horizontal polarization, a frequency bandwidth can be expanded by changing a dipole shape, namely, by a structure having a plurality of dipole radiators disposed in parallel, to generate a dual resonating mode. For example, the size of the array antenna is slightly increased from 26.75 mm*2.6 mm of the second and third antenna structure of FIGS. 11B and 11C to 26.75 mm*3.4 mm of FIG. 15, but the array antenna can operate as a broadband antenna.

Figure 16A:
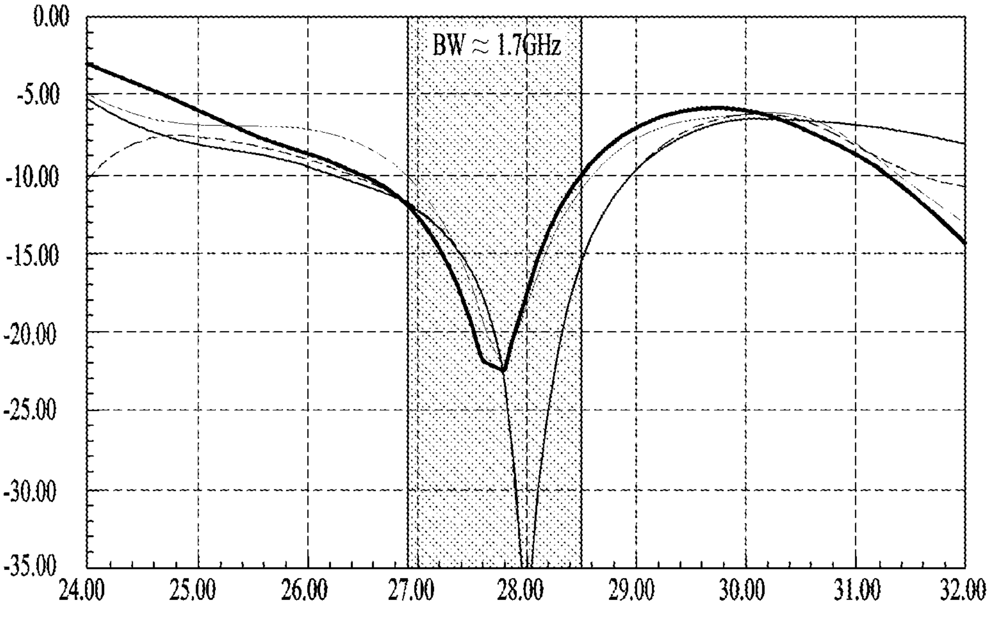
FIGS. 16A and 16B compare reflection coefficient characteristics of a slot array antenna and a dipole array antenna in the third antenna structure and a band expanded structure.
Figure 16A:
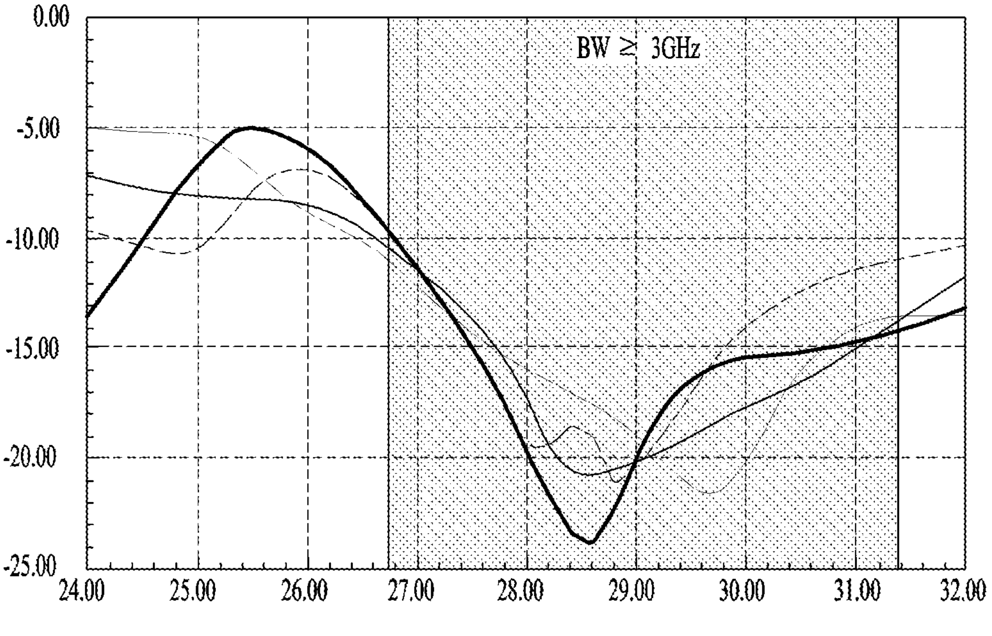
Figure 16B:
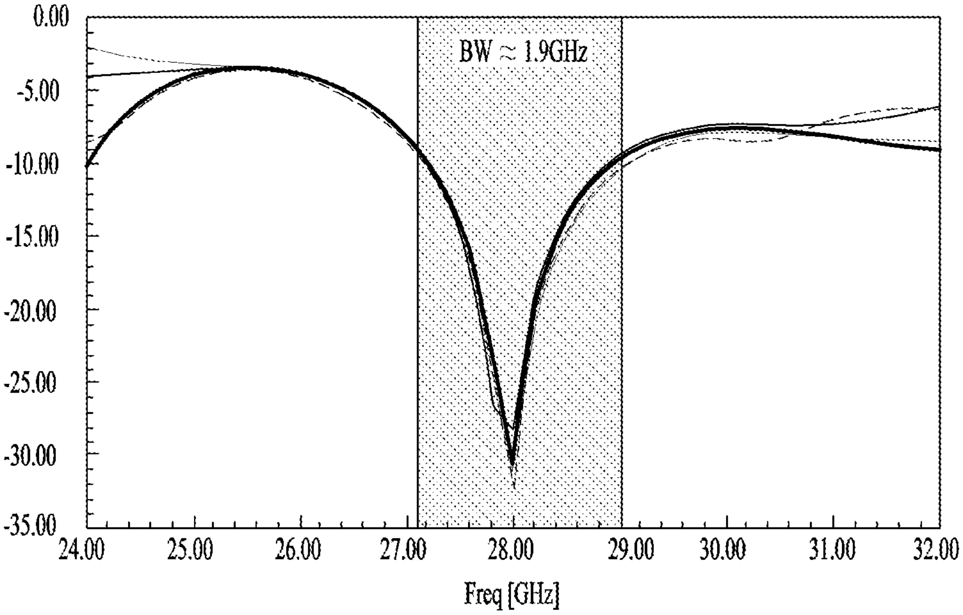
Figure 16B:
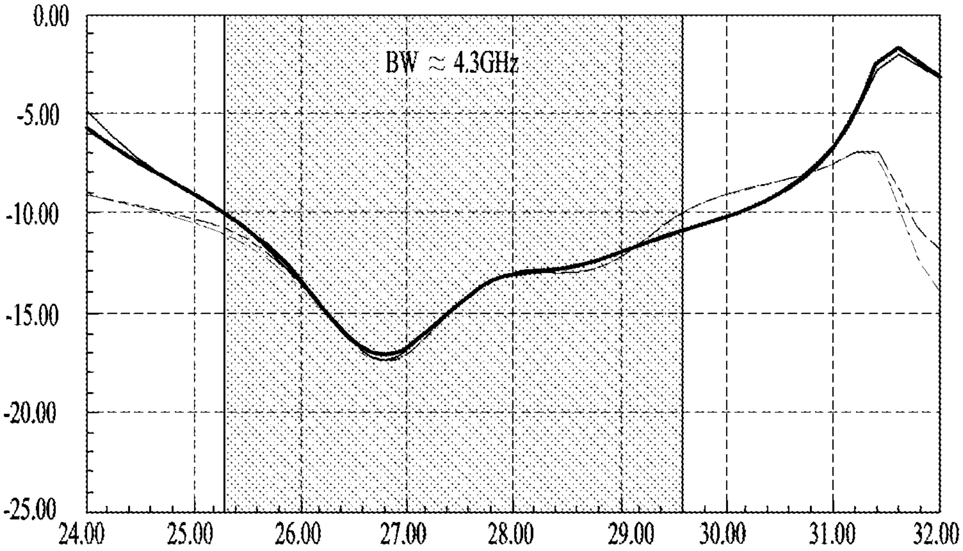

Hereinafter, a reflection coefficient characteristic of a band-expanded antenna structure according to the present disclosure will be described with reference to FIGS. 16A and 16B. FIGS. 16A and 16B compare reflection coefficient characteristics of a slot array antenna and a dipole array antenna in the third antenna structure and a band-expanded structure.

Referring to FIG. 11C and (a) of FIG. 16A, the dipole array antenna having the third antenna structure has a bandwidth of about 1.7 GHz. On the other hand, referring to FIG. 15 and (b) of FIG. 16A, the dipole array antenna having a band-expanded structure has a bandwidth expanded to 3 GHz or more. In this regard, the first radiation portion 1112*a* may operate in a first band (low band) of the bandwidth of 3 GHz or more. On the other hand, the second radiation portion 1112*b* which is shorter than the first radiation portion 1112*a* in view of length may operate in a second band (high band) of the bandwidth of 3 GHz or more.

Referring to FIG. 11C and (b) of FIG. 16A, the slot array antenna having the third antenna structure has a bandwidth of about 1.9 GHz. On the other hand, referring to FIG. 15 and (b) of FIG. 16A, the dipole array antenna having the band-expanded structure has a bandwidth expanded to 4.3 GHz or more. In this regard, a central region CR of the slot region 1112*b*' may operate in the first band (low band) of the bandwidth of 4.3 GHz or more. On the other hand, an upper region UR and a low region LR of the slot region 1112*b*' may operate in the second band (high band) of the bandwidth of 4.3 GHz or more. In this case, a slot length of the upper region UR and the lower region LR is shorter than a slot length of the central region CR.

Meanwhile, in the alternating arrayed dual polarization antenna structure according to the present disclosure, the antenna disposed in the display may be connected to the feeding unit through the FPCB and the FPCB may be connected to the main PCB through a connector structure.

In this regard, referring to FIGS. 5A, 7, 8, and 15, the electronic device 1000 may further include the main PCB 1010 that is disposed inside the electronic device and electrically connected to the FPCB 1020 through a connector 1020*c*. First to fourth feeding lines of the first feeding unit 1120 disposed at the end of the FPCB 1020 may be configured such that the first to fourth dipole antennas 1110-1 to 1110-4 are electrically connected to the transceiver circuit 1250 disposed on the main PCB 1010. Also, first to fourth feeding lines of the second feeding unit 1120*b* disposed at the end of the FPCB 1020 may be configured such that the first to fourth slot antennas 1110*b*-1 to 1110*b*-4 are electrically connected to the transceiver circuit 1250 disposed on the main PCB 1010.

The first to fourth feeding lines of the first feeding unit 1120 and the first to fourth feeding lines of the second feeding unit 1120*b* disposed on the FPCB 1010 may be configured in a microstrip line structure. Meanwhile, the first to fourth feeding lines of the first feeding unit 1120 and the second feeding unit 1120*b* may be disposed on the transition region 1021 for transition from the microstrip line structure to the coplanar line structure. The transition region 1021 may be configured as an ACF bonding region for transition from the multi-layered structure of the FPCB 1020 to the single-layered structure of the antenna region 151*a* of the display. The antenna region 151*a* may be defined as a metal pattern on an OCA layer beneath the cover glass.

Meanwhile, the transceiver circuit 1250 may include a first phase shifter PS1 that is connected to each of the dipole antenna elements 1110-1 to 1110-4 of the first array antenna 1100-1 to control a phase of a signal applied to each dipole antenna element. The transceiver circuit 1250 may further include a second phase shifter PS2 that is connected to each of the slot antenna elements 1110*b*-1 to 1110*b*-4 of the second array antenna 1100-1 to control a phase of a signal applied to each slot antenna element.

The baseband processor 1400 may be electrically connected to the transceiver circuit 1250. The baseband processor 1400 may control the first and second phase shifters PS1 and PS2 to perform beamforming for a second beam of the second array antenna 1100-2 while performing beamforming for a first beam of the first array antenna 1100-1.

Hereinafter, an antenna module having an alternating arrayed dual polarization antenna structure according to another aspect of the present disclosure will be described with reference to FIG. 5A to (b) of FIG. 16. An antenna module 1100 may include a first type antenna 1110, a second type antenna 1110*b*, a first feeding unit 1120, and a second feeding unit 1120*b*. The first type antenna 1110 and the second type antenna 1110*b* may be arbitrary antennas that operate as orthogonally polarized antennas to each other. The first type antenna 1110 and the second type antenna 1110*b* may be arbitrary antennas that operate as a horizontally polarized antenna and a vertically polarized antenna. The first type antenna 1110 may be any one of a dipole antenna, a monopole antenna, a bow-tie antenna that operate as the horizontally polarized antenna. The second type antenna 1110*b* may be any one of a slot antenna and a slot combination antenna that operate as the vertically polarized antenna. As one example, the first type antenna 1110 and the second type antenna 1110*b* may be a dipole antenna 1110 and a slot antenna 1110*b*.

The dipole antenna 1110 as the first type antenna may include a first metal pattern 1111 disposed in the display in the first axial direction, and a second metal pattern 1112 rotated by a predetermined angle from the first metal pattern 1111 to be disposed in the second axial direction. The slot antenna 1110*b* as the second type antenna may include a slot region 1112*b*, 1112*b*' within the ground pattern 1111*b*. The slot region 1112*b*, 1112*b*' may overlap the second metal pattern 1112 by a predetermined length in the second axial direction. The ground pattern 1111*b* may be formed to be spaced predetermined distances apart from an outer region of the first metal pattern 1111 and a lower region of the second metal pattern 1112.

The first feeding unit 1120 is electrically connected to the first metal pattern 1111 of the dipole antenna 1110 to apply a first signal to the dipole antenna 1110. The second feeding unit 1120*b* may be electrically connected to the ground pattern 1111*b* through the inside of the slot region 1112*b*, 1112*b*' of the slot antenna 1110*b*. Therefore, the second feeding unit 1120*b* is configured to apply a second signal to the slot antenna 1110*b*.

The dipole antenna may be implemented by a plurality of antenna elements, to configured an array antenna. In this regard, the dipole antenna 1110 may include a first dipole antenna 1110-1 and a second dipole antenna 1110-2 that are spaced apart from each other by a predetermined distance in the second axial direction to operate as horizontally polarized antennas.

On the other hand, for optimal space disposition while considering interference, the slot antenna 1110*b* may be disposed between the first dipole antenna 1110-1 and the second dipole antenna 1110-2. In this regard, the ground pattern 1111*b* and the slot region 1112*b*, 1112*b*' of the slot antenna 1110*b* may be disposed in a region between the first dipole antenna 1110-1 and the second dipole antenna 1110-2. Therefore, the slot antenna 1110*b* may operate as the vertically polarized antenna. Also, the slot antenna may be implemented by a plurality of antenna elements, to configured an array antenna.

The ground pattern 1111*b* of the slot antenna 1110*b* may be configured by a plurality of regions. The plurality of regions may include a first region defined as a region from one end portion of the ground pattern 1111*b* to one end portion of the slot region 1112*b*. The plurality of regions may include a second region R2 defined as a region from one end portion of the first region R1 to an end portion of the second metal pattern 1112-1 of the first dipole antenna 1110-1. The plurality of regions may include a third region R3 defined as a region from an end portion of the second metal pattern 1112-1 of the first dipole antenna 1110-1 to an end portion of the second metal pattern 1112-2 of the second dipole antenna 1110-2. The plurality of regions may include a fourth region R4 defined as a region from an end portion of the second metal pattern 1112-2 of the second dipole antenna 1110-2 to another end portion of the slot region 1112*b*. The plurality of regions may include a fifth region R5 defined as a region from another end portion of the slot region 1112*b* to another end portion of the ground pattern 1111*b*.

Accordingly, the first region R1 and the fifth region R5 may be defined as regions where the first dipole antenna 1110-1 and the second dipole antenna 1110-2 are disposed, respectively. The second region R2 and the fourth region R4 may be defined as regions where the first dipole antenna 1110-1 and the second dipole antenna 1110-2 are disposed to overlap the slot region 1112*b* on the second axis. On the other hand, the third region R3 may be defined as a slot region which does not overlap the first dipole antenna 1110-1 and the second dipole antenna 1110-2.

On the other hand, the dipole antenna and the slot antenna may be configured as array antennas using two or more antenna elements. As one example, the dipole antenna 1110 may be configured as a first array antenna 1100-1 by further including a third dipole antenna 1110-1 and a fourth dipole antenna 1110-4 that are spaced apart from each other by a predetermined distance in the second axial direction.

The slot antenna 1100*b* may be configured as a second array antenna 1100-2 by including the first slot antenna 1100*b*-1 and the second slot antenna 1100*b*-2. Also, the slot antenna 1100*b* may be configured as the second array antenna 1100-2 by including the first slot antenna 1100*b*-1 to the fourth slot antenna 1100*b*-4. The first slot antenna 1100*b*-1 may be disposed in a region at one side of the first dipole antenna 1110-1. The second slot antenna 1100*b*-2 may be disposed between the first dipole antenna 1110-1 and the second dipole antenna 1110-2. The third slot antenna 1100*b*-3 may be disposed between the second dipole antenna 1110-2 and the third dipole antenna 1110-3. The fourth slot antenna 1100*b*-4 may be disposed between the third dipole antenna 1110-3 and the fourth dipole antenna 1110-4.

Figure 17:
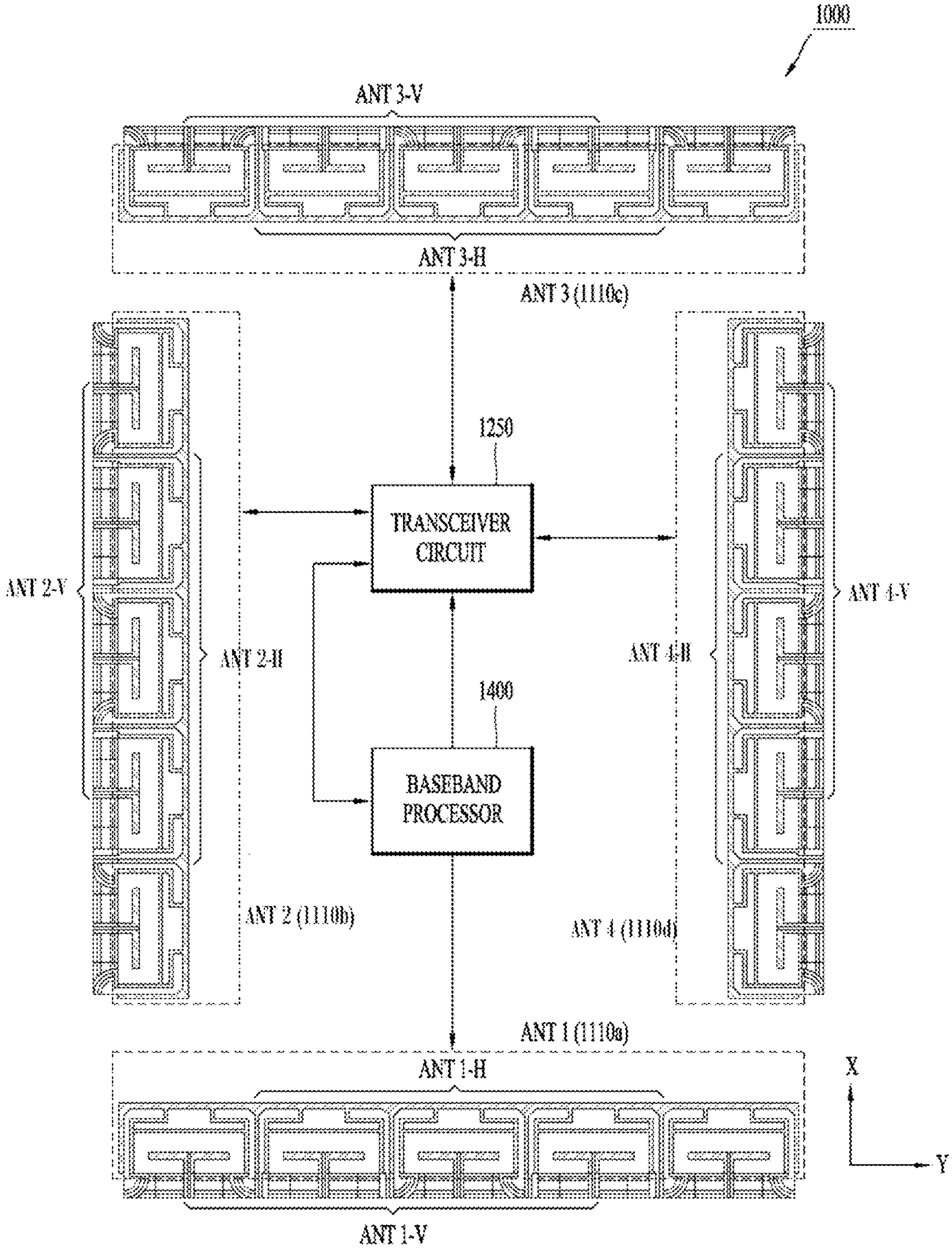
FIG. 17 illustrates an antenna module configured as array antennas including antenna elements in an alternating arrayed dual polarization antenna structure, and an electronic device including the antenna module, in accordance with one embodiment.

The alternating arrayed dual polarization antenna structure according to the present disclosure may be configured by a plurality of array antennas disposed at different positions of the electronic device. In this regard, FIG. 17 illustrates an antenna module configured as array antennas including antenna elements in an alternating arrayed dual polarization antenna structure, and an electronic device including the antenna module, in accordance with one embodiment. Referring to FIGS. 1 to 17, the antenna module 1100 may include the first array antenna 1100-1 having the first type antenna 1110 and the second array antenna 1100-2 having the second type antenna 1100*b*. The antenna module 1100 may include first to fourth antenna modules ANT1 to ANT4 disposed on different regions of the electronic device to perform beamforming. As one example, the plurality of antenna modules ANT1 to ANT4 may include a first array antenna (1100_a_) ANT1 to a fourth array antenna (1100_d_) ANT4, but are not limited thereto and may vary depending on applications.

In this regard, the antenna module (ANT) 1100 may include a plurality of antenna modules 1100_a_ to 1100_d_ disposed on different regions of the electronic device. In this regard, the electronic device may further include the transceiver circuit 1250 and the processor 1400. In this regard, the transceiver circuit 1250 and the processor 1400 may be disposed on a separate circuit board from the display with the antenna module (ANT) 1100 and the FPCB.

The processor 1400 may be operably coupled to the transceiver circuit 1250 and may be configured to control the transceiver circuit 1250. The processor 1400 may control the transceiver circuit 1250 to perform MIMO while performing beamforming in different directions through the plurality of antenna modules 1100_a_ to 1100_d_.

The first antenna module ANT1 to the fourth antenna module ANT4 may be operably coupled to a first front end module FEM1 to a fourth front end module FEM4. In this regard, each of the first front end module FEM1 to the fourth front end module FEM4 may include a phase controller, a power amplifier, and a reception amplifier. Each of the first front end module FEM1 to the fourth front end module FEM4 may include several components of the transceiver circuit 1250.

The processor 1400 may be operably coupled to the first front end module FEM1 to the fourth front end module FEM4. The processor 1400 may include several components of the transceiver circuit 1250 corresponding to the RFIC. The processor 1400 may include a baseband processor 1400 corresponding to a modem. The processor 1400 may be provided in a system on chip (SoC) form to include several components of the transceiver circuit 1250 corresponding to the RFIC and the baseband processor 1400 corresponding to the modem. However, the configuration of FIG. 12 is not limited thereto but may vary differently depending on applications.

The processor 1400 may control the first front end module FEM1 to the fourth front end module FEM4 to radiate signals through at least one of the first antenna module ANT1 to the fourth antenna module ANT4. In this regard, an optimal antenna may be selected based on quality of a signal received through each of the first antenna module ANT1 to the fourth antenna module ANT4.

The processor 1400 may control the first front end module FEM1 to the fourth front end module FEM4 to perform MIMO through two or more of the first antenna module ANT1 to the fourth antenna module ANT4. In this regard, an optimal antenna combination may be selected based on quality and interference level of a signal received through each of the first array antenna ANT1 to the fourth array antenna ANT4.

The processor 1400 may control the first front end module FEM1 to the fourth front end module FEM4 to perform carrier aggregation (CA) through at least one of the first antenna module ANT1 to the fourth antenna module ANT4. In this regard, when each of the first array antenna ANT1 to the fourth array antenna ANT4 dual-resonates at the first band and the second band, the CA may be performed through one array antenna.

The processor 1400 may determine signal qualities at the first band and the second band with respect to each of the antennas. The processor 1400 may perform CA through one antenna at the first band and another antenna at the second band on the basis of signal qualities at the first band and the second band.

The antenna module corresponding to the multi-layered substrate may include various numbers of array antennas. In this regard, the electronic device may include two or more array antennas. The electronic device may include two array antennas and perform beamforming and MIMO using the two array antennas. As another example, the electronic device may include four or more array antennas and perform beamforming and MIMO using some of the four or more array antennas.

The antenna module may include the first array antenna 1100-1 and the second array antenna 1100-2. In this regard, the first array antenna 1100-1 and the second array antenna 1100-2 may operate as different polarized antennas.

The first array antenna (1100_a_) ANT1 may include a first horizontally polarized antenna ANT1-H and a first vertically polarized antenna ANT1-V. The second array antenna (1100_b_) ANT2 may include a second horizontally polarized antenna ANT2-H and a second vertically polarized antenna ANT2-V. On the other hand, the third array antenna (1100_c_) ANT3 may include a third horizontally polarized antenna ANT3-H and a third vertically polarized antenna ANT3-V. The fourth array antenna (1100_d_) ANT4 may include a fourth horizontally polarized antenna ANT4-H and a fourth vertically polarized antenna ANT4-V.

In this regard, the first to fourth horizontally polarized antennas ANT1-H to ANT4-H may be first type array antennas operating as the horizontally polarized antennas, like the dipole antenna 1100. In this regard, the first to fourth vertically polarized antennas ANT1-V to ANT4-V may be second type array antennas operating as the vertically polarized antennas, like the slot antenna 1100_b_.

One antenna module may include therein different antennas having polarizations orthogonal to each other, so as to increase the number of MIMO streams by two times. The electronic device may perform maximum rank 8 MIMO through the first horizontally polarized antenna ANT1-H to the fourth horizontally polarized antenna ANT4-H and the first vertically polarized antenna ANT1-V to the fourth vertically polarized antenna ANT4-V. The electronic device may perform 8Tx UL-MIMO through the first horizontally polarized antenna ANT1-H to the fourth horizontally polarized antenna ANT4-H and the first vertically polarized antenna ANT1-V to the fourth vertically polarized antenna ANT4-V. The electronic device may perform 8Rx DL-MIMO through the first horizontally polarized antenna ANT1-H to the fourth horizontally polarized antenna ANT4-H and the first vertically polarized antenna ANT1-V to the fourth vertically polarized antenna ANT4-V.

Alternatively, one antenna module may include therein different antennas having polarizations orthogonal to each other, to suppress signal quality from being lowered due to rotation of the electronic device. In this regard, the first antenna ANT1 may simultaneously transmit and/or receive signals through the first horizontally polarized antenna ANT1-H and the first vertically polarized antenna ANT1-V. Accordingly, even if signal quality received through any one antenna is lowered due to the rotation of the electronic device, signal reception can be carried out through another antenna. Similarly, the fourth antenna ANT4 may simultaneously transmit and/or receive signals through the fourth horizontally polarized antenna ANT4-H and the fourth vertically polarized antenna ANT4-V. Accordingly, even if signal quality received through any one antenna is lowered due to the rotation of the electronic device, signal reception can be carried out through another antenna.

The processor 1400 may maintain dual connectivity state or perform a MIMO operation with different entities through the horizontally polarized antenna and the vertically polarized antenna. In this regard, the processor 1400 may control the transceiver circuit 1250 to maintain the dual connectivity state with a first entity and a second entity through the first array antenna (1100*a*) ANT1 and the fourth array antenna (1100*d*) ANT4. In this case, the first array antenna (1100*a*) ANT1 and the fourth array antenna (1100*d*) ANT4 may operate as the horizontally polarized antenna and the vertical polarized antenna, respectively. Therefore, the processor 1400 may perform dual connectivity or MIMO through antennas that are disposed at different positions in the antenna module of the electronic device to operate as polarized antennas orthogonal to each other. This can reduce interference between signals transmitted or received through different antennas during dual connectivity or MIMO.

As another example, the processor 1400 may control the transceiver circuit 1250 to maintain the dual connectivity state with a first entity and a second entity through the first array antenna (1100*b*) ANT2 and the fourth array antenna (1100*c*) ANT3, respectively. In this case, the second array antenna (1100*b*) ANT2 and the third array antenna (1100*c*) ANT3 may operate as the vertically polarized antenna and the horizontally polarized antenna, respectively. Therefore, the processor 1400 may perform dual connectivity or MIMO through antennas that are disposed at different positions in the antenna module of the electronic device to operate as polarized antennas orthogonal to each other. This can reduce interference between signals transmitted or received through different antennas during dual connectivity or MIMO.

It will be clearly understood by those skilled in the art that various changes and modifications to the aforementioned embodiments related to the array antenna operating at the mmWave band and the electronic device controlling the same are made without departing from the idea and scope of the present disclosure. Therefore, it should be understood that such various modifications and alternations for the embodiments fall within the scope of the appended claims.

The electronic device disclosed herein can transmit or receive information simultaneously to or from various entities, such as an adjacent electronic device, an external device, a base station, or the like. Referring to FIGS. 1 to 17, the electronic device may perform MIMO through the antenna module 1100 and the transceiver circuit 1250 and the baseband processor 1400 that control the antenna module 1100. By performing the MIMO, communication capacity can be increased and/or reliability of information transmission and reception can be improved. Accordingly, the electronic device can transmit or receive different information to or from various entities at the same time to improve a communication capacity. This can improve the communication capacity of the electronic device through the MIMO without a bandwidth extension.

Alternatively, the electronic device may simultaneously receive the same information from various entities, so as to improve reliability for surrounding information and reduce latency. Accordingly, URLLC (Ultra Reliable Low Latency Communication) can be performed in the electronic device and the electronic device can operate as a URLLC UE. To this end, a base station performing scheduling may preferentially allocate a time slot for the electronic device operating as the URLLC UE. For this, some of specific time-frequency resources already allocated to other UEs may be punctured.

As described above, the plurality of array antennas ANT1 to ANT4 may perform wideband (broadband) operation at a first frequency band and a second frequency band. The baseband processor 1400 can perform MIMO through some of the plurality of array antennas ANT1 to ANT4 at the first frequency band. Also, the baseband processor 1400 can perform MIMO through some of the plurality of array antennas ANT1 to ANT4 at the second frequency band. In this regard, the baseband processor 1400 can perform MIMO by using array antennas that are sufficiently spaced apart from each other and disposed by being rotated at a predetermined angle. This can improve isolation between first and second signals within the same band.

One or more array antennas of the first antenna ANT1 to the fourth antenna ANT4 within the electronic device may operate as a radiator at the first frequency band. On the other hand, one or more array antennas of the first antenna ANT1 to the fourth antenna ANT4 may operate as a radiator at the second frequency band.

According to one embodiment, the baseband processor 1400 may perform MIMO through two or more array antennas of the first antenna ANT1 to the fourth antenna ANT4 at the first frequency band. On the other hand, the baseband processor 1400 may perform MIMO through two or more array antennas of the first antenna ANT1 to the fourth antenna ANT4 at the second frequency band.

In this regard, the baseband processor 1400 may transmit a time/frequency resource request of the second frequency band to the base station when signal qualities of two or more array antennas are all lower than or equal to a threshold value at the first frequency band. Accordingly, when a time/frequency resource of the second frequency band is allocated, the baseband processor 1400 may perform MIMO through two or more array antennas of the first antenna ANT1 to the fourth antenna ANT4 using the corresponding resource.

Even when a resource of the second frequency band is allocated, the baseband processor 1400 may perform MIMO using the same two or more array antennas. This can suppress power consumption caused by turning on/off the corresponding front end module FEM again due to the change of the array antenna. This can also suppress performance deterioration according to a settling time of an electronic component, for example, an amplifier, which is caused when the corresponding front end module FEM is turned on/off again in response to the change of the array antenna.

On the other hand, when a resource of the second frequency band is allocated, at least one of the two array antennas may change and the baseband processor 1400 may perform MIMO through the at least one array antenna. Therefore, different array antennas can be used when it is determined that it is difficult to perform communication through the corresponding array antenna due to difference in propagation environment between the first and second frequency bands.

According to another embodiment, the baseband processor 1400 may control the transceiver circuit 1250 to receive the second signal of the second frequency band while receiving the first signal of the first frequency band through one of the first to fourth antennas ANT1 to ANT4. In this case, there is an advantage that the baseband processor 1400 can perform carrier aggregation (CA) through one antenna.

Therefore, the baseband processor 1400 can perform CA through a band in which the first frequency band and the second frequency band are combined with each other. When it is necessary to transmit or receive a large amount of data in the electronic device, a broadband reception can be allowed through the CA.

Accordingly, eMBB (Enhanced Mobile Broad Band) communication can be performed in the electronic device and the electronic device can operate as an eMBB UE. To this end, the base station that performs scheduling may allocate a broadband frequency resource to the electronic device that operates as the eMBB UE. For this, the CA may be performed on frequency bands that are available, except for frequency resources already allocated to other UEs.

It will be clearly understood by those skilled in the art that various changes and modifications to the aforementioned embodiments related to the array antenna operating at the mmWave band and the electronic device controlling the same are made without departing from the idea and scope of the present disclosure. Therefore, it should be understood that such various modifications and alternations for the embodiments fall within the scope of the appended claims.

So far, the antenna module disposed in the display to operate in the millimeter wave (mmwave) band and the electronic device including the configuration for controlling the same have been described. Hereinafter, technical effects of the antenna module disposed in the display operating in the millimeter wave (mmwave) band and the electronic device including the configuration for controlling the same will be described.

According to an embodiment, an antenna element operating in an mmWave band can be implemented in a metal mesh structure within a display, to communicate with another device in a front direction.

According to another aspect of the present disclosure, an antenna configuration capable of improving visibility of an antenna disposed in a display by using a dummy pattern while improving an electrical characteristic of the antenna can be provided.

According to another aspect of the present disclosure, an antenna module in which a slot antenna is disposed in an empty region between dipole antennas to implement a dual polarization characteristic within such limited region can provided.

According to another aspect of the present disclosure, an antenna module implemented in a display, capable of minimizing a spacing between antennas and minimizing a signal loss characteristic in an mmWave band through impedance matching in a transition region between a transparent antenna and a feeding line, can be provided.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art. In relation to the aforementioned disclosure, design and operations of an antenna operating in a mmWave band and an electronic device controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An antenna assembly comprising:

a dielectric substrate;

a first dipole antenna and a second dipole antenna having conductive patterns at both sides on a surface of the dielectric substrate;

a slot antenna having a slot region defined inside a ground pattern disposed between the first dipole antenna and the second dipole antenna;

a first feeding unit having a first co-planar wave guide (CPW) feeding line and a second CPW feeding line electrically connected on a same plane to the first dipole antenna and the second dipole antenna; and a second feeding unit electrically connected to the slot region on the same plane, and disposed between the first CPW feeding line and the second CPW feeding line, wherein first ground patterns are disposed at one side and another side of the first CPW feeding line, second ground patterns are disposed at one side and another side of the second CPW feeding line, and the second feeding unit is disposed between the first ground pattern disposed at the other side of the first CPW feeding line and the second ground pattern disposed at the one side of the second CPW feeding line.

2. The antenna assembly of claim 1, further comprising a dummy metal mesh pattern formed between the first dipole antenna and the second dipole antenna on a top of the ground pattern having the slot region.

3. The antenna assembly of claim 1, wherein the slot antenna includes a plurality of slot antennas, the antenna assembly further comprises a dummy dipole disposed adjacent to an outermost slot antenna of the plurality of slot antennas, and the dummy dipole has a conductive pattern formed at one side.

4. The antenna assembly of claim 1, wherein the first dipole antenna comprises a ground arm pattern connected to the first ground pattern, and a signal arm pattern connected to the first CPW feeding line, and the second dipole antenna comprises a ground arm pattern connected to the second ground pattern, and a signal arm pattern connected to the second CPW feeding line.

5. The antenna assembly of claim 4, wherein the ground arm pattern and the signal arm pattern of each of the first dipole antenna and the second dipole antenna comprise:

a first sub arm configured as a first metal pattern formed in a first axial direction on a surface of the dielectric substrate; and a second sub arm configured as a second metal pattern formed in a second axial direction, different from the first axial direction, on the surface of the dielectric substrate.

6. The antenna assembly of claim 5, wherein the first and second dipole antennas and the slot antenna are disposed in an antenna region formed inside a display having a multi-layered structure, each of the first feeding unit and the second feeding unit comprises:

a transition region having a CPW structure, in which the first and second ground patterns are disposed between a first feeding line of the first feeding unit and a first feeding line of the second feeding unit, to perform impedance matching between an antenna and the first feeding lines; and a signal line region in which the first feeding line of the first feeding unit and the first feeding line of the second feeding unit are disposed by predetermined lengths in the first axial direction, the first feeding lines disposed in the signal line region are disposed on a flexible printed circuit board (FPCB).

7. The antenna assembly of claim 1, wherein the slot region is formed in a first axial direction such that the slot antenna operates as a vertically polarized antenna in the first axial direction, the first dipole antenna and the second dipole antenna are spaced apart from each other by a predetermined distance in a second axial direction, to operate as horizontally polarized antennas in the second axial direction, and the ground pattern comprises:

a first region defined from one end portion of the ground pattern to one end portion of the slot region;

a second region defined from the one end portion of the slot region to an end portion of a second metal pattern of the first dipole antenna;

a third region defined from the end portion of the second metal pattern of the first dipole antenna to an end portion of a second metal pattern of the second dipole antenna;

a fourth region defined from the end portion of the second metal pattern of the second dipole antenna to another end portion of the slot region; and a fifth region defined from the other end portion of the slot region to another end portion of the ground pattern.

8. The antenna assembly of claim 7, wherein the second metal pattern of the first dipole antenna overlaps in parallel the slot region by a predetermined length in the second axial direction in the second region, and the second metal pattern of the second dipole antenna overlaps in parallel the slot region by a predetermined length in the second axial direction in the fourth region.

9. The antenna assembly of claim 7, wherein the slot region is spaced apart from the second metal pattern of the first dipole antenna by a preset distance in the first axial direction in the second region, and is spaced apart from the second metal pattern of the second dipole antenna by a predetermined distance in the first axial direction in the fourth region, such that a first interference level with the first dipole antenna and a second interference level with the second dipole antenna are equal to or lower than a threshold level.

10. The antenna assembly of claim 6, wherein the first metal pattern of each of the first and second dipole antennas comprises a first sub pattern and a second sub pattern spaced apart from each other by a predetermined distance to be in parallel in the first axial direction, the second metal pattern of each of the first and second dipole antennas comprises a third sub pattern and a fourth sub pattern extending in different directions on a second axis from end portions of the first sub pattern and the second sub pattern, any one of the first and second sub patterns of the first metal pattern is connected to a metal pattern having a different width in the transition region so as to perform impedance matching between the antenna region and the signal line region, and another one of the first and second sub patterns of the first metal pattern is connected to a lower ground through a via pattern to operate as a ground.

11. The antenna assembly of claim 2, wherein the dummy metal mesh pattern comprises:

a first dummy pattern disposed between an upper region of the ground pattern of the slot antenna and a lower region of the first and second dipole antennas; and a second dummy pattern coupled to the first dummy pattern and disposed between the first dipole antenna and the second dipole antenna, a first metal pattern and a second metal pattern of the first and second dipole antennas and the ground pattern of the slot antenna are configured in a closed mesh structure in which metal mesh patterns formed in different axial directions are connected, and the first and second dummy patterns are formed in an open mesh structure in which connection points of metal mesh patterns formed on the different axial directions are disconnected, so as to improve transparency of the antenna region.

12. The antenna assembly of claim 10, wherein a dipole antenna including the first and second dipole antennas is configured as a first array antenna by further comprising a third dipole antenna and a fourth dipole antenna spaced apart from each other by a predetermined distance in the second axial direction, the slot antenna is configured as a slot array antenna by comprising:

a first slot antenna disposed in one side region of the first dipole antenna;

a second slot antenna disposed between the first dipole antenna and the second dipole antenna;

a third slot antenna disposed between the second dipole antenna and the third dipole antenna; and a fourth slot antenna disposed between the third dipole antenna and one side region of the fourth dipole antenna.

13. The antenna assembly of claim 12, wherein the dipole antenna further comprises a dummy dipole configured as a first dummy dipole metal pattern and a second dummy dipole metal pattern on one side region of the first slot antenna or another side region of the fourth slot antenna, each of the first and second dipole antennas comprises the second metal pattern extending from the first metal pattern in different directions on the second axis, each of the third and fourth dipole antennas comprises a second metal pattern extending from a first metal pattern in different directions on the second axis, the dummy dipole comprises the second dummy dipole metal pattern extending from the first metal pattern in one direction on the second axis, and the first dummy dipole metal pattern of the dummy dipole is electrically connected to a lower ground through a via pattern.

14. The antenna assembly of claim 12, wherein the first sub pattern of the first dipole antenna and a first sub pattern of the third dipole antenna are connected to a lower ground through via patterns to operate as a ground, the second sub pattern of the second dipole antenna and a second sub pattern of the fourth dipole antenna are connected to a lower ground through via patterns to operate as a ground, so as to lower an interference level between adjacent dipole antennas of the first to fourth dipole antennas and an interference level between adjacent slot antennas of the first to fourth slot antennas.

15. The antenna assembly of claim 1, wherein each of the first and second dipole antennas comprises first and second metal patterns disposed in first and second axial directions, respectively, the second metal patterns of the first and second dipole antennas each comprises:

a first radiation portion perpendicularly connected to the first metal pattern at a first point; and a second radiation portion bent by a predetermined angle with respect to the first metal pattern at the first point, and disposed in parallel to the first radiation portion from a second point in an upper region of the first radiation portion.

16. The antenna assembly of claim 15, wherein the second radiation portion has a length shorter than a length of the first radiation portion, a slot region of the slot antenna is configured such that corner regions, facing each other, of rectangular slot regions formed in different directions on a second axis from an end of the second feeding unit are formed in a triangular shape, and the slot region is configured as a multi-slot region formed based on the corner regions having the triangular shape, such that the slot antenna operates as a broadband antenna.

17. The antenna assembly of claim 6, wherein the first feeding line, a second feeding line, a third feeding line and a fourth feeding line of the first feeding unit and the first feeding line, a second feeding line, a third feeding line and a fourth feeding line of the second feeding unit disposed on the FPCB are configured in a microstrip line structure, the first, second, third and fourth feeding lines of the first feeding unit and the first, second, third and fourth feeding lines of the second feeding unit are disposed on a transition region for transition from the microstrip line structure to a CPW structure, the transition region is formed as an anisotropic conductive film (ACF) bonding region for transition from the multi-layered structure of the FPCB to a single-layered structure of the antenna region of the display, and the antenna region is formed as a metal pattern on an optically clear adhesive (OCA) layer beneath a cover glass.

18. An electronic device having an antenna assembly disposed in a display, the electronic device comprising:

the display having a multi-layered structure and having a cover glass; and an antenna assembly formed as a metal mesh pattern on a dielectric substrate disposed inside the display to radiate a wireless signal through the cover glass, wherein the antenna assembly comprises:

a dielectric substrate;

a first dipole antenna and a second dipole antenna having conductive patterns at both sides on a surface of the dielectric substrate;

a slot antenna having a slot region defined inside a ground pattern disposed between the first dipole antenna and the second dipole antenna;

a first feeding unit having a first co-planar wave guide (CPW) feeding line and a second CPW feeding line electrically connected on a same plane to the first dipole antenna and the second dipole antenna; and a second feeding unit electrically connected to the slot region on the same plane, and disposed between the first CPW feeding line and the second CPW feeding line, first ground patterns are disposed at one side and another side of the first CPW feeding line, and second ground patterns are disposed at one side and another side of the second CPW feeding line, and the second feeding unit is disposed between the first ground pattern disposed at the other side of the first CPW feeding line and the second ground pattern disposed at the one side of the second CPW feeding line.

19. The electronic device of claim 18, further comprising a dummy metal mesh pattern formed between the first dipole antenna and the second dipole antenna on a top of the ground pattern having the slot region.

20. The electronic device of claim 18, wherein the slot antenna includes a plurality of slot antennas, and the antenna assembly further comprises a dummy dipole disposed adjacent to an outermost slot antenna of the plurality of slot antennas, and the dummy dipole has a conductive pattern formed at one side.

* * * * *